US011461435B2

(12) United States Patent
Mucciolo et al.

(10) Patent No.: US 11,461,435 B2
(45) Date of Patent: Oct. 4, 2022

(54) TECHNIQUES FOR SECURELY EXECUTING CODE THAT OPERATES ON ENCRYPTED DATA ON A PUBLIC COMPUTER

(71) Applicants: UNIVERSITY OF CENTRAL FLORIDA RESEARCH FOUNDATION, INC., Orlando, FL (US); TRUSTEES OF BOSTON UNIVERSITY, Boston, MA (US)

(72) Inventors: Eduardo Mucciolo, Orlando, FL (US); Claudio Chamon, Lexington, MA (US)

(73) Assignees: UNIVERSITY OF CENTRAL FLORIDA RESEARCH FOUNDATION, INC., Orlando, FL (US); TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/955,276

(22) PCT Filed: Dec. 17, 2018

(86) PCT No.: PCT/US2018/066019
§ 371 (c)(1),
(2) Date: Jun. 18, 2020

(87) PCT Pub. No.: WO2019/126044
PCT Pub. Date: Jun. 27, 2019

(65) Prior Publication Data
US 2020/0394287 A1 Dec. 17, 2020

Related U.S. Application Data
(60) Provisional application No. 62/607,185, filed on Dec. 18, 2017.

(51) Int. Cl.
*H04L 9/06* (2006.01)
*G06F 21/14* (2013.01)

(52) U.S. Cl.
CPC ............ *G06F 21/14* (2013.01); *H04L 9/0618* (2013.01); *H04L 9/0631* (2013.01); *G06F 2221/033* (2013.01); *H04L 2209/16* (2013.01)

(58) Field of Classification Search
CPC . G06F 21/14; G06F 2221/033; H04L 9/0618; H04L 9/0631; H04L 2209/16
See application file for complete search history.

(56) References Cited

U.S. PATENT DOCUMENTS 8,515,058 B1  8/2013  Gentry
8,565,435 B2  10/2013  Gentry et al.
(Continued)

OTHER PUBLICATIONS

PCT/US2018/066019; International Search Report and Written Opinion; dated May 14, 2019 12 pages.
Rivest, Ronald L. et al. "On Data Banks and Privacy Homomorphisms", Academic Press Inc., 1978, 11 pages.
Brickell, Ernest F. et al., "On Privacy Homomorphisms", D. Chaum and W.L. Pnce (Eds.): Advances in Cryptology—EUROCRYPT '87, LNCS 304, pp. 117-125, 1988.
(Continued)

*Primary Examiner* — Alexander Lagor
*Assistant Examiner* — D'Arcy Winston Straub
(74) *Attorney, Agent, or Firm* — Timothy H. Van Dyke; Wolter, Van Dyke, Davis, PLLC

(57) ABSTRACT

Techniques, for secure processing of encrypted data on public resources, include receiving first data indicating a sequence of reversible q-bit gates including a first segment for decrypting, a second segment for operating on the decrypted data, and a third segment for encrypting the resulting data. Second data indicates rules for replacing a first sequence of two gates operating on at least one shared bit of an input N-bit word with a different second sequence of one or more gates that produce the same output N-bit word. The second data is used to propagate: a gate from the first segment a distance into the second segment or beyond; and, a gate from the third segment a distance into the second segment or before. This produces an obfuscated sequence of reversible gates. Obfuscated instructions based on the obfuscated sequence of gates are sent to the public resources.

20 Claims, 33 Drawing Sheets

(56) References Cited

U.S. PATENT DOCUMENTS

| | | |
|---|---|---|
| 8,630,422 B2 | 1/2014 | Gentry |
| 9,281,941 B2 | 3/2016 | Gentry et al. |
| 9,306,738 B2 | 4/2016 | Loftus et al. |
| 9,313,028 B2 | 4/2016 | Tamayo-Rios |
| 9,350,543 B2 | 5/2016 | Kipnis et al. |
| 9,436,835 B1 | 9/2016 | Saldamli |
| 9,608,817 B2 | 3/2017 | Gentry et al. |
| 9,621,346 B2 | 4/2017 | Gentry et al. |
| 2004/0153633 A1 | 8/2004 | Folmsbee |
| 2005/0005157 A1 | 1/2005 | Folmsbee |
| 2010/0208885 A1 | 8/2010 | Murphy |
| 2010/0287374 A1 | 11/2010 | Roy et al. |
| 2011/0142242 A1* | 6/2011 | Tanaka .............. H04L 9/0852 380/282 |
| 2017/0147303 A1* | 5/2017 | Amy .................... G06F 8/44 |
| 2021/0081589 A1* | 3/2021 | Roetteler ............ G06F 30/327 |

OTHER PUBLICATIONS

Gentry, Craig, "Fully Homomorphic Encryption Using Ideal Lattices", STOC'09, May 31-Jun. 2, 2009, Bethesda, Maryland, 10 pages.

Lauter, Kristin et al., "Can Homomorphic Encryption be Practical?", 2011, 11 pages.

Coppersmith, Don et al., "Generators for Certain Alternating Groups With Applications to Cryptography", Siam j. Appl. Math, Dec. 1975, vol. 29, No. 4, 5 pages.

Parent, Alex et al., "Improved reversible and quantum circuits for Karatsuba-based integer multiplication", Jun. 11, 2017, 16 pages.

Cuccaro, Steven A. "A new quantum ripple-carry addition circuit", Feb. 1, 2008, 9 pages.

Iwama, Kazuo et al., "Transformation Rules for Designing CNOT-based Quantum Circuits", DAC 2002, Jun. 10-14, 2002, New Orleans, Louisiana, 6 pages.

* cited by examiner

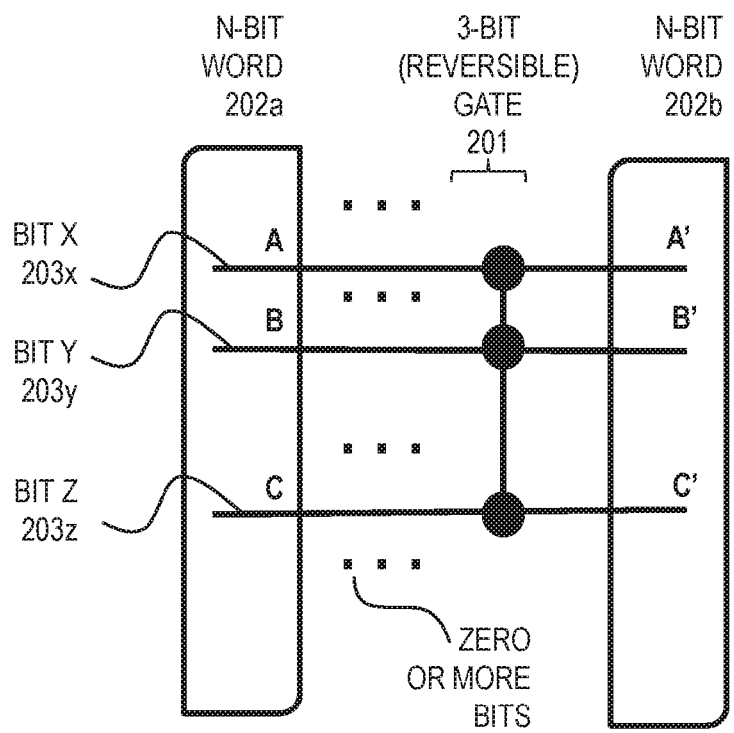
FIG. 2A
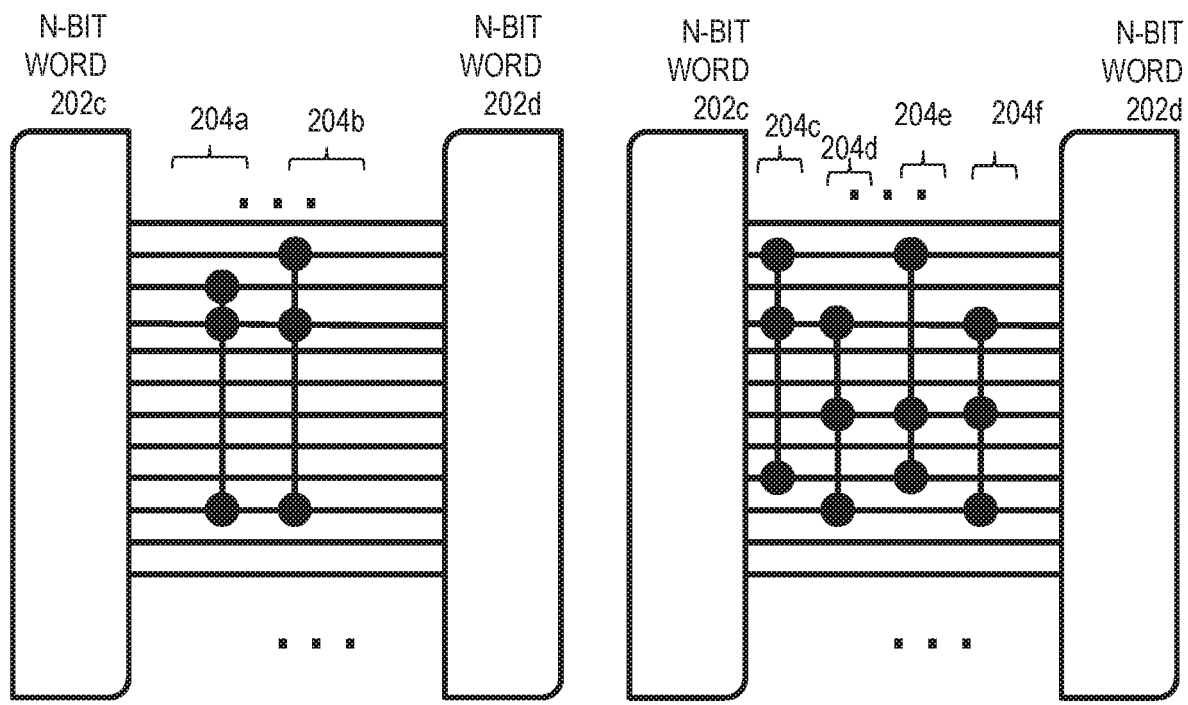
FIG. 2B
FIG. 2C

Table 1                    Table 2                    Table 3

Table 4                    Table 5                    Table 6 a

| $x_2$ $x_1$ $x_0$ | $y_2$ $y_1$ $y_0$ |
|---|---|
| 0 0 0 → | 1 0 0 |
| 0 0 1 → | 0 0 0 |
| 0 1 0 → | 0 1 0 |
| 0 1 1 → | 1 1 1 |
| 1 0 0 → | 0 1 1 |
| 1 0 1 → | 0 0 1 |
| 1 1 0 → | 1 1 0 |
| 1 1 1 → | 1 0 1 | b

| $x_2$ $x_1$ $x_0$ | $y_2$ $y_1$ $y_0$ |
|---|---|
| 0 0 0 → | 0 1 0 |
| 0 0 1 → | 1 1 1 |
| 0 1 0 → | 0 0 0 |
| 0 1 1 → | 1 1 0 |
| 1 0 0 → | 1 0 1 |
| 1 0 1 → | 1 0 0 |
| 1 1 0 → | 0 1 1 |
| 1 1 1 → | 0 0 1 |

$c^{(1)}$

| $x_2$ $x_1$ $x_0$ | $y_2$ $y_1$ $y_0$ |
|---|---|
| 0 0 0 → | 1 0 0 |
| 0 0 1 → | 1 0 1 |
| 0 1 0 → | 0 0 0 |
| 0 1 1 → | 0 1 1 |
| 1 0 0 → | 0 1 0 |
| 1 0 1 → | 0 0 1 |
| 1 1 0 → | 1 1 0 |
| 1 1 1 → | 1 1 1 |

$d^{(1)}$

| $x_2$ $x_1$ $x_0$ | $y_2$ $y_1$ $y_0$ |
|---|---|
| 0 0 0 → | 1 1 1 |
| 0 0 1 → | 0 0 0 |
| 0 1 0 → | 1 0 1 |
| 0 1 1 → | 0 1 0 |
| 1 0 0 → | 0 1 1 |
| 1 0 1 → | 1 0 0 |
| 1 1 0 → | 1 1 0 |
| 1 1 1 → | 0 0 1 |

$e^{(1)}$

| $x_2$ $x_1$ $x_0$ | $y_2$ $y_1$ $y_0$ |
|---|---|
| 0 0 0 → | 0 0 1 |
| 0 0 1 → | 0 1 0 |
| 0 1 0 → | 1 0 0 |
| 0 1 1 → | 1 1 1 |
| 1 0 0 → | 0 1 1 |
| 1 0 1 → | 1 0 1 |
| 1 1 0 → | 1 1 0 |
| 1 1 1 → | 0 0 0 |

$f^{(1)}$

| $x_2$ $x_1$ $x_0$ | $y_2$ $y_1$ $y_0$ |
|---|---|
| 0 0 0 → | 0 1 0 |
| 0 0 1 → | 0 0 0 |
| 0 1 0 → | 1 0 1 |
| 0 1 1 → | 0 0 1 |
| 1 0 0 → | 0 1 1 |
| 1 0 1 → | 1 1 0 |
| 1 1 0 → | 1 1 0 |
| 1 1 1 → | 1 1 1 |

$c^{(2)}$

| $x_2$ $x_1$ $x_0$ | $y_2$ $y_1$ $y_0$ |
|---|---|
| 0 0 0 → | 1 0 0 |
| 0 0 1 → | 0 1 1 |
| 0 1 0 → | 0 0 0 |
| 0 1 1 → | 0 1 0 |
| 1 0 0 → | 0 0 1 |
| 1 0 1 → | 1 1 0 |
| 1 1 0 → | 1 0 1 |
| 1 1 1 → | 1 1 1 |

$d^{(2)}$

| $x_2$ $x_1$ $x_0$ | $y_2$ $y_1$ $y_0$ |
|---|---|
| 0 0 0 → | 1 1 1 |
| 0 0 1 → | 0 0 1 |
| 0 1 0 → | 0 0 0 |
| 0 1 1 → | 1 0 1 |
| 1 0 0 → | 0 1 0 |
| 1 0 1 → | 0 1 1 |
| 1 1 0 → | 1 0 0 |
| 1 1 1 → | 1 1 0 |

$e^{(2)}$

| $x_2$ $x_1$ $x_0$ | $y_2$ $y_1$ $y_0$ |
|---|---|
| 0 0 0 → | 0 0 1 |
| 0 0 1 → | 0 0 0 |
| 0 1 0 → | 1 0 1 |
| 0 1 1 → | 0 1 0 |
| 1 0 0 → | 1 1 0 |
| 1 0 1 → | 1 1 1 |
| 1 1 0 → | 0 1 1 |
| 1 1 1 → | 1 0 0 |

$f^{(2)}$

| $x_2$ $x_1$ $x_0$ | $y_2$ $y_1$ $y_0$ |
|---|---|
| 0 0 0 → | 1 0 1 |
| 0 0 1 → | 1 1 0 |
| 0 1 0 → | 1 0 0 |
| 0 1 1 → | 0 0 0 |
| 1 0 0 → | 0 0 1 |
| 1 0 1 → | 0 1 0 |
| 1 1 0 → | 0 1 1 |
| 1 1 1 → | 1 1 1 |

$c^{(3)}$

| $x_2$ $x_1$ $x_0$ | $y_2$ $y_1$ $y_0$ |
|---|---|
| 0 0 0 → | 1 0 1 |
| 0 0 1 → | 0 0 1 |
| 0 1 0 → | 0 0 0 |
| 0 1 1 → | 1 0 0 |
| 1 0 0 → | 1 1 0 |
| 1 0 1 → | 0 1 0 |
| 1 1 0 → | 0 1 1 |
| 1 1 1 → | 1 1 1 |

$d^{(3)}$

| $x_2$ $x_1$ $x_0$ | $y_2$ $y_1$ $y_0$ |
|---|---|
| 0 0 0 → | 0 1 0 |
| 0 0 1 → | 0 0 1 |
| 0 1 0 → | 0 0 0 |
| 0 1 1 → | 0 1 1 |
| 1 0 0 → | 1 0 0 |
| 1 0 1 → | 1 0 1 |
| 1 1 0 → | 1 1 1 |
| 1 1 1 → | 1 1 0 |

$e^{(3)}$

| $x_2$ $x_1$ $x_0$ | $y_2$ $y_1$ $y_0$ |
|---|---|
| 0 0 0 → | 1 1 1 |
| 0 0 1 → | 0 0 0 |
| 0 1 0 → | 1 1 0 |
| 0 1 1 → | 1 0 0 |
| 1 0 0 → | 1 0 1 |
| 1 0 1 → | 0 1 0 |
| 1 1 0 → | 0 1 1 |
| 1 1 1 → | 0 0 1 |

$f^{(3)}$

| $x_2$ $x_1$ $x_0$ | $y_2$ $y_1$ $y_0$ |
|---|---|
| 0 0 0 → | 1 0 1 |
| 0 0 1 → | 1 0 0 |
| 0 1 0 → | 0 0 1 |
| 0 1 1 → | 0 0 0 |
| 1 0 0 → | 0 1 1 |
| 1 0 1 → | 0 1 0 |
| 1 1 0 → | 1 1 0 |
| 1 1 1 → | 1 1 1 |

FIG. 13B

Move leftmost gate in $B_r$ all the way across $A_r$

Move leftmost gate in $B_r^{(1)}$ all the way across $A_r^{(1)}$, stopping at $\Delta l$ gates before end

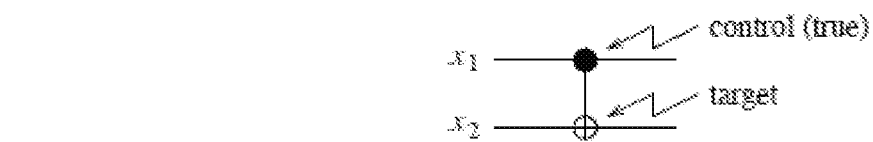
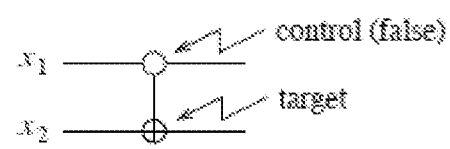
FIG. 24A  FIG. 24B
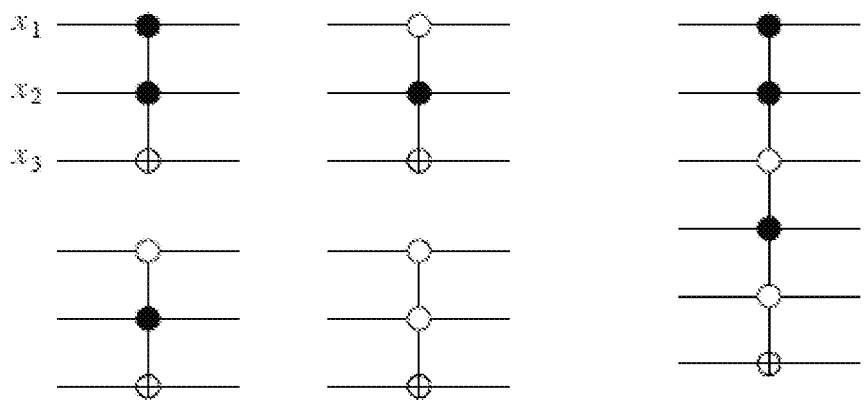
FIG. 24C  FIG. 24D
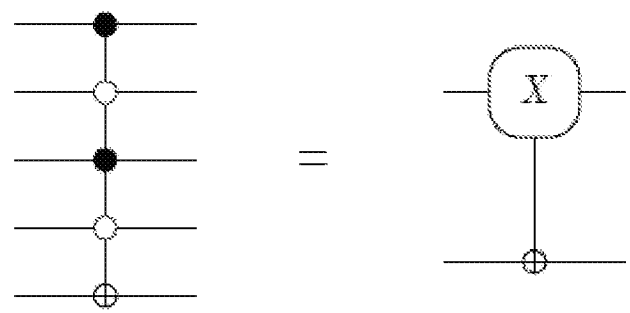
FIG. 25

TECHNIQUES FOR SECURELY EXECUTING CODE THAT OPERATES ON ENCRYPTED DATA ON A PUBLIC COMPUTER

BACKGROUND

It is often convenient to keep data confidential from the public by encrypting the data and storing the encrypted data using powerful public resources such as cloud data storage and cloud computing. However, when the amount of data so stored is very large, e.g. on the order of Terabits (Tb, 1 Tb=$10^{12}$ bits), some efficiency is lost if a large fraction of the encrypted data has to be returned to a local secure processor for processing. Similarly, if the operation involves tremendous computational resources, even on relatively little data, it would be advantageous to run on powerful public resources, such as cloud processors, rather than on a secure computer of relatively limited computing power. Yet, to decrypt the data, a processor on the powerful public resources exposes the encryption method and reveals the underlying data.

SUMMARY

Techniques are provided for secure processing of encrypted data on unsecured but potentially powerful public resources.

In a first set of embodiments, a method executing on a first (e.g., local and secure) processor includes receiving first data indicating a sequence of reversible q-bit gates including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data. The method also includes storing on a computer-readable medium second data that indicates rules for replacing a first sequence of two q-bit gates operating on at least one shared bit of an input N-bit word with a different second sequence of one or more q-bit gates that produce the same output N-bit word. Still further the method includes using the second data to propagate at least one q-bit gate from the first segment to a number J of gates distance into the q-bit gates for the second segment or beyond and at least one q-bit gate from the third segment to a number K of gates distance into the q-bit gates for the second segment or before, to produce an obfuscated sequence of reversible q-bit gates. The method yet further includes sending obfuscated instructions based on the obfuscated sequence of reversible q-bit gates to a second processor (e.g., an unsecured or cloud processor or a processor partition with different access) for execution.

In some embodiments of the first set, the method also includes storing on a computer-readable medium third data relating each code instruction in a form executable by the second processor to one or more reversible q-bit gates operating on an N-bit word. In these embodiments the method also includes using the third data to convert the obfuscated sequence of reversible q-bit gates to obfuscated code instructions in a form executable by the second processor. Then, sending obfuscated instructions includes sending obfuscated code instructions in a form executable by the second processor.

In some embodiments of the first set, the method also includes storing on a computer-readable medium third data relating each code instruction in a form executable by the second processor to one or more reversible q-bit gates operating on an N-bit word. In these embodiments, receiving first data includes: receiving code instructions in a form executable by the second processor for operating on the encrypted data to produce one or more resulting decrypted data; and, using the third data to convert the code instructions in a form executable by the second processor for operating on the encrypted data to produce one or more resulting decrypted data to the sequence of reversible q-bit gates for operating on the encrypted data to produce one or more resulting decrypted data.

In some embodiments of the first set, the method also includes storing on a computer-readable medium fusion data that indicates rules for replacing each of one or more sequences of reversible q-bit gates operating on an input N-bit word to produce an output N-bit word, with one or more k-bit gates (wherein 3<k≤N) that produce a same output N-bit word. In these embodiments, the method further includes using the fusion data to replace a particular sequence of one or more reversible q-bit gates of the obfuscated sequence of reversible q-bit gates with a k-bit gate that can replace the particular sequence.

In some of these embodiments, the method also includes storing on a computer-readable medium third data relating each code instruction in a form executable by the second processor to one or more reversible q-bit gates operating on an N-bit word. In these embodiments, the method further includes storing, on a computer-readable medium, fusion code data that relates each of the one or more k-bit gates with one or more code instructions for the second processor. In these embodiments, the method still further includes: using the fusion code data to convert the k-bit gate to at least part of obfuscated code instructions; and using the third data to convert any remaining reversible q-bit gates of the obfuscated sequence of reversible q-bit gates to any remaining part of the obfuscated code instructions. In these embodiments, sending obfuscated instructions further comprises sending obfuscated code instructions in a form executable by the second processor.

In some embodiments of the first set each of J and K is greater than N.

In some embodiments of the first set, each reversible q-bit gate is a control gate including a single target bit and q−1 control bits that determine a value for the single target bit based on values at the q−1 control bits and values input to the q−1 control bits.

In some embodiments of the first set, q∈{1, 2, 3}).

In some embodiments of the first set, the second processor is different from the first processor. In some embodiments of the first set, access to the second processor is different from access to the first processor.

In other sets of embodiments, a computer readable medium or a system is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates an example 3-bit gate operating on an N-bit word, according to an embodiment;

FIG. 2B is a block diagram that illustrates an example pair of 3-bit gates operating on an N-bit word, according to an embodiment;

FIG. 2C is a block diagram that illustrates an example series of 3-bit gates that produce a result equivalent to the result produced by the 3-bit gates in FIG. 2B, according to an embodiment;

FIG. 13B is a table that illustrates an example set of truth tables for debris gates c, d, e and f when 3-bit gates collide at two bits, according to an embodiment;

FIG. 24A through FIG. 24C are block diagrams that illustrate example control gates used instead of 3-bit gates, according to an embodiment;

FIG. 24D is block diagram that illustrates an example 6-bit control gate resulting from fusion or collisions, according to an embodiment;

FIG. 25 is a block diagram that illustrates an example abbreviated schematic representation of a control gate used instead of 3-bit gates, according to an embodiment;

DETAILED DESCRIPTION

A method and system are described for securely processing encrypted data on public resources, e.g., to take advantage of superior processing power, efficiency or resilience, or some combination, on the public resources, such as the cloud. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of certain example functions and example 3-bit gates and example options for replacing a pair of three bit gates. However, the invention is not limited to this context. In other embodiments other functions and q-bit gates and replacement strategies are employed that follow the methods described herein.

1. Overview

Figure 1:
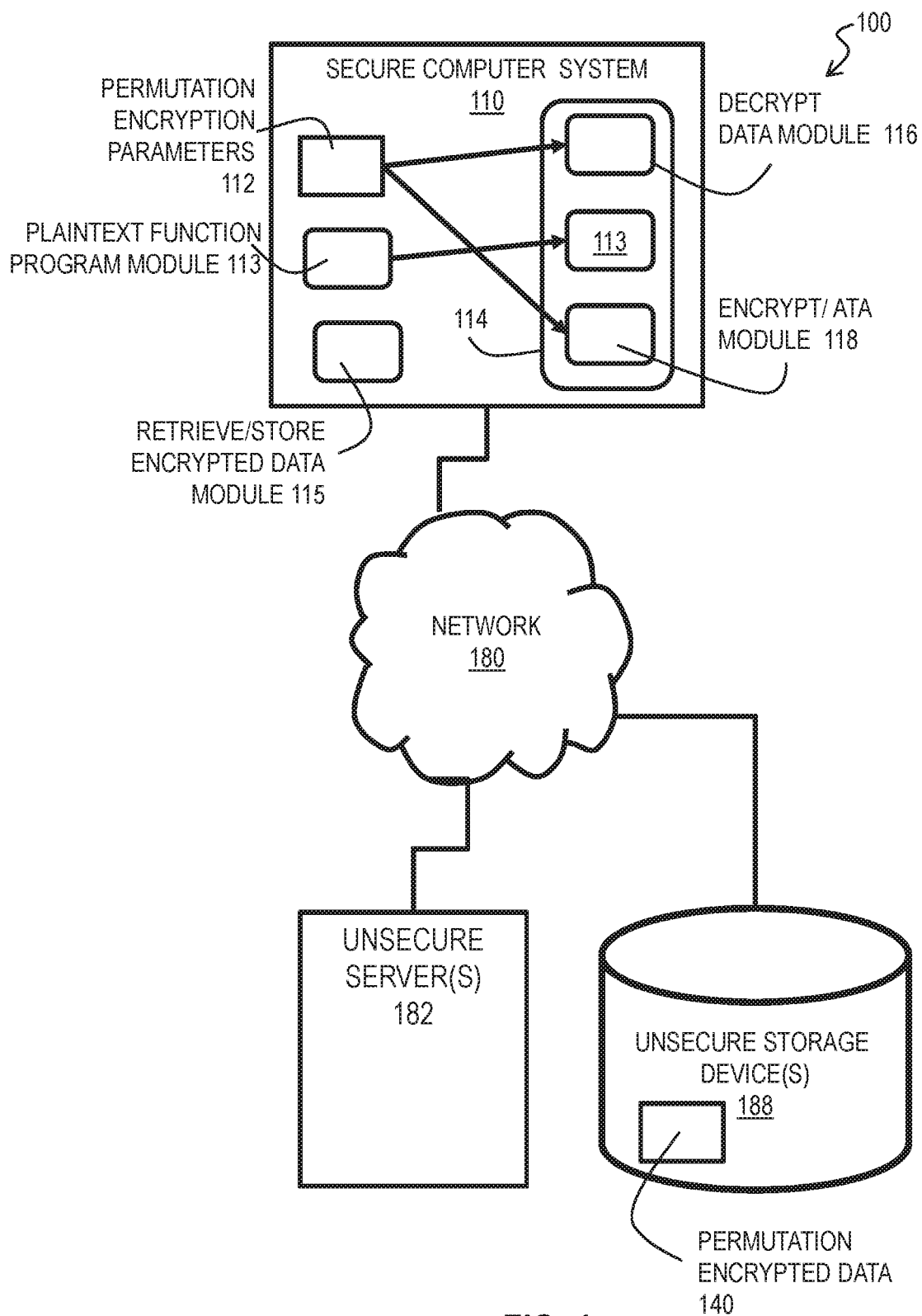
FIG. 1 is a block diagram that illustrates an example system for using encrypted data that is stored on a public resource.

FIG. 1 is a block diagram that illustrates an example system for using encrypted data that is stored on a public resource. Encrypted data 140 is stored on one or more unsecure storage devices 188. In the illustrated embodiments, the encrypted data 140 is encrypted using permutation encryption. In permutation encryption, a plaintext N-bit word is changed to an ciphertext N-bit word by changing the positions and values of the bits from the plaintext to the positions and values in ciphertext in a prescribed manner called the permutation key. The ciphertext is the permutation encrypted data 140. Each N-bit plaintext word is directed to an N-bit ciphertext word. No two different N-bit plaintext words end up as the same N-bit ciphertext word. By knowing the permutation key, the ciphertext can be converted back to the plaintext and used in computations. The number of possible permutations is $2^N!$, so, the larger the number of bits N in each N-bit ciphertext, the more secure is the encrypted data 140.

One or more unsecure servers 182 may have access to the unsecure storage device 188, either directly or through unsecure communications network 180. Without access to the permutation key, these servers 182 and devices in network 180 do not have access to the plaintext. A secure computing system 110 may also have access to the unsecure storage device 188, e.g., through any method known in the art, such as a firewall (not shown). The secure computer system 110 is subject to physical and communication control of an authorized user of the plaintext corresponding to the ciphertext in encrypted data 140. The permutation key, comprising one or more permutation encryption parameters in data 112, is known to the users of secure computer system 110.

While there may be more computational power or efficiency if the encrypted data were to be used in processing on one or more unsecure servers 182, current methods are not known to avoid disclosing the permutation key comprising data 112 to any process operating on the unsecure server 182 or network 180. Thus a user of encrypted data 140 is generally constrained to retrieve some or all the encrypted data 140 from the unsecure storage device 188 through the network 180 for at least temporary local storage on the secure system 110. This retrieval process is performed by the retrieve/store encrypted data module 115 and takes care of identifying which encrypted data to retrieve. If the retrieval criteria depends on information stored as ciphertext, then much data is transmitted and stored locally that is not needed for the function to be performed.

The function to be performed on the plaintext is represented by the plaintext function program module 113. A different module 114 performs the processes of decrypting the ciphertext (using module 116), operating on the plaintext (using module 113), and encrypting the result using module 118. Both module 116 and module 118 depend on the encryption parameters 112. The module 115 then stores the result back on the unsecure storage device 188. If the storage location depends on information stored as ciphertext, then much data that is not changed by the plaintext function of module 113 is transmitted over the network 180 and stored on the unsecure device 188. For example if you want to retrieve persons who have social security numbers (SSNs) beginning with "123", then you have to decrypt the SSN before you can determine if you want to operate on the data. Since you can't do that on the non-secure device, you have to bring all the data to the local device, decrypt at least the SSN of all, and then operate on the desired data, a small subset of the data you downloaded.

It is here observed that: 1) permutation encryption can be implemented by a sequence of one or more q-bit gates ($q\in\{1, 2, 3\}$); 2) functions that map inputs one-to-one to outputs can also be implemented by a sequence of one or more q-bit gates (for purposes of illustration, it is assumed that function program module 113 implements such a bijective function); and, 3) because there is more than one set of q-bit gates that produce the same output for the same input, the decryption, plaintext function and encryption q-bit gates can be replaced by a difference sequence of gates that do not correspond directly to the decryption, plaintext function and encryption operations. Thus those operations are obfuscated. Obfuscated code to implement the different sequence of gates can be generated that does not reveal those operations. Thus, the obfuscated code can be sent for operation on the unsecure servers 182. Such code can take advantage of any computing power or efficiencies or resilience of the unsecure servers 182 and unsecure devices 188 without divulging the permutation key. A series of gates is also called a circuit herein and in the Examples Section. Thus, a program that performs an intended function on the data is converted into a description in terms of gates, as in the circuit model of computation. The logic gates are then expressed in terms of q-bit reversible gates, such as the 3-bit Tofolli gate.

FIG. 2A is a block diagram that illustrates an example 3-bit gate 201 operating on an N-bit word, according to an embodiment. Three bit locations from an input N-bit word 202a, represented by bit X 203x, bit Y 203y and bit Z 203z, separated or preceded or followed by zero or more bit locations represented by ellipses, are passed into the reversible 3-bit gate 201. The results are passed to the output N-bit word 202b in the same three bit locations. But the contents at those 3 locations may have been permutated. For example, 8 values A,B,C (e.g., 000, 001, 010, 011, 100, 101, 110, 111) at the three locations X,Y,Z of N-bit word 202a are changed to a permutation of the 8 values A',B',C' (e.g., 110, 111, 100, 101, 000, 001, 011, 010, respectively) in the N-bit word 202b. In other 3-bit gates, other permutations of the 8 values are generated. For any three locations (X,Y,Z), there are $2^3!=40,320$ possible 3-bit gates. In the Examples section, 3-bit gates are represented similarly to FIG. 2A with solid dots on the lines corresponding to bit locations on which the gate may operate.

FIG. 2B is a block diagram that illustrates an example pair of 3-bit gates (204a, 204b) operating on an N-bit word, according to an embodiment. The figure depicts input N-bit word 202c, 3-bit gate 204a, 3-bit gate 204b and output N-bit word 202d. Twelve contiguous bit locations are indicated by horizontal line segments, preceded and followed by zero or more other bit locations indicated by ellipses. If it is desired to move 3-bit gate 204a past 3-bit gate 204b, e.g., in order to obfuscate 3-bit gates associated with decryption from 3-bit gates associated with the plaintext function, then the gates are said to move. If the two gates 204a and 204b, share at least one bit, then movement causes the gates to produce a set of one or more different gates, called "debris" gates, none recognizable as the original gates 204a and 204b. In this case the gates are said to "collide." Rules for determining how to resolve such "collisions" are described below in general terms and in the Examples Section with greater detail. In general, collisions can be resolved at the cost of possibly adding to the total number of 3-bit gates. This broad concept is represented by FIG. 2C.

FIG. 2C is a block diagram that illustrates an example series of 3-bit gates that produce a result equivalent to the result produced by the two 3-bit gates 204a and 204b in FIG. 2B, according to an embodiment. This is not an actual solution that applies to particular 3-bit gates 204a and 204b, but just indicates that gates 204a and 204b are consumed in the solution, and replaced by four different "debris" 3-bit gates 202c, 204d, 204e and 204f.

As used herein, gate Ga is said to have moved past gate Gb. For example, in forward movement, when a gate Ga on the left is to be moved past a gate Gb on the right, a collision must occur whenever gates Ga and Gb act on one or two common bit lines. In the case when gates Ga and Gb do not share bit lines, motion of gate Ga past gate Gb is achieved by swapping their order. In the case when they share all three bit lines, they first merge into a single gate, and this gate continues the motion intended for gate Ga. In a collision, the original gates Ga and Gb are replaced by an equivalent sequence of debris gates, with the number of debris gates depending on the number of bit lines shared: at most four debris gates when two bit lines are shared, and at most seven debris gates when only one bit line is shared. We call the "descendant" of gate Ga the right most gate resulting from the motion of gate Ga past gate Gb, including the right most debris gate resulting from a collision. If the original intent was to move gate Ga past other gates to the right of gate Gb, the descendant of gate Ga or some other debris gate from the collision has to move past the gate immediately to the right of the original gate Gb, say Gc. If further motion to the right is intended, the process is repeated until gate Ga or at least one of its descendant moves past a pre-established number of gates on their right. When a gate Gb on the right is to be moved past a gate Ga to the left or beyond, in backward movement, one follows the same procedure as described above, but with the direction of motion inverted.

In various embodiments, the concept of moving gates is used in an amalgamation process to obfuscated code by moving gates associated with decryption or encryption past gates associated with the plaintext function.

Figure 2D:
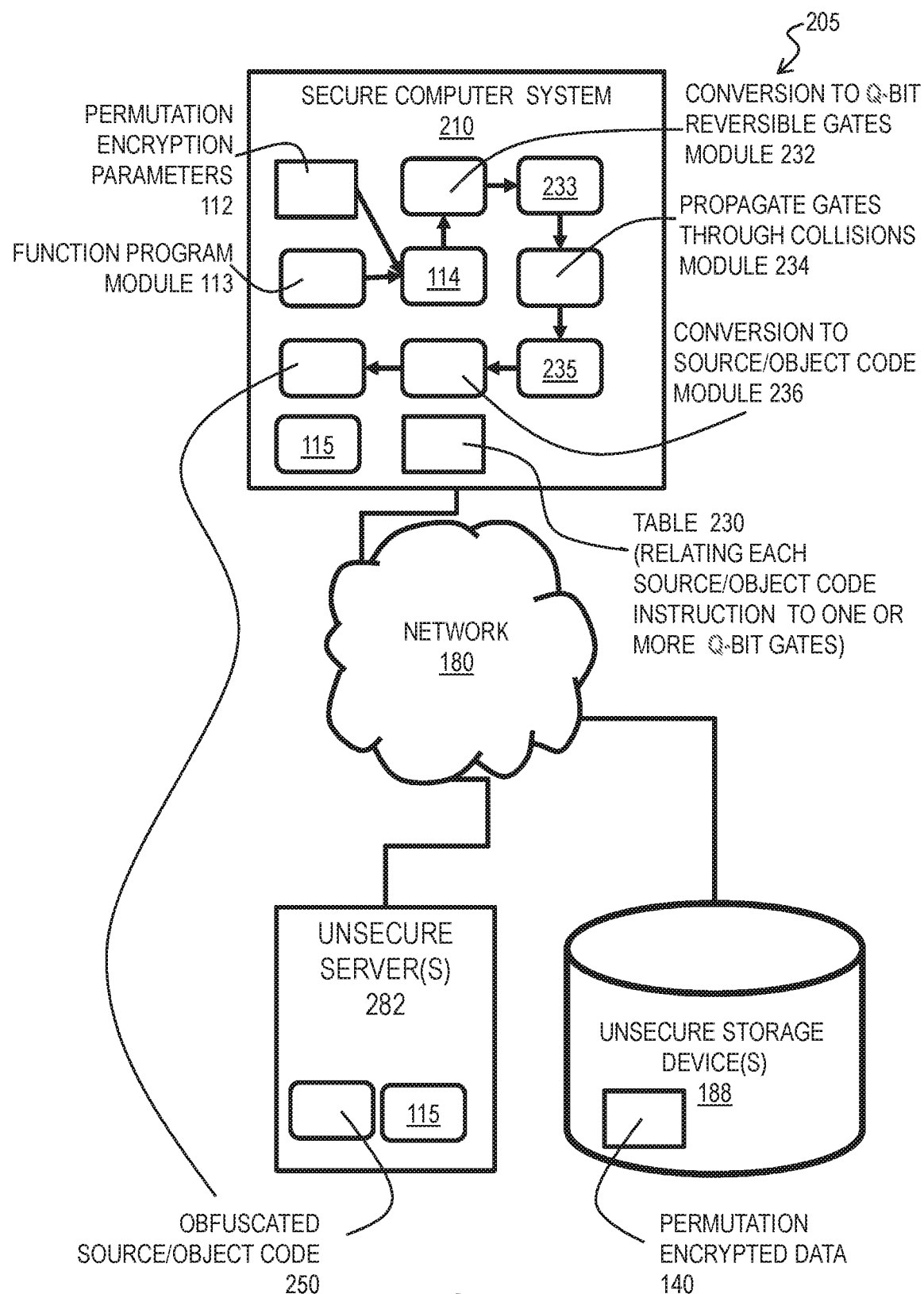
FIG. 2D is a block diagram that illustrates an example system for securely processing on a public resource encrypted data stored on a public resource, according to an embodiment.

FIG. 2D is a block diagram that illustrates an example system for securely processing on a public resource encrypted data stored on a public resource, according to an embodiment. The network 180, unsecure storage devices 188; permutation encrypted data 140, permutation encryption parameters data 112, plaintext function program module 113, module 114, and retrieve/restore encrypted data module 115 are as described above for FIG. 1.

The secure computer system 210 is different from system 110 because system 210 now contains table 230, module 232, module 233, module 234, module 235, module 236 and module 250. Table 230 associates each source code or object code instruction in a form to be executed by the unsecure servers 282 with a sequence of one or more q-bit gates that produce the same output one or more N-bit words from the same input one or more N-bit words as the source or object code instruction.

Figure 4A:
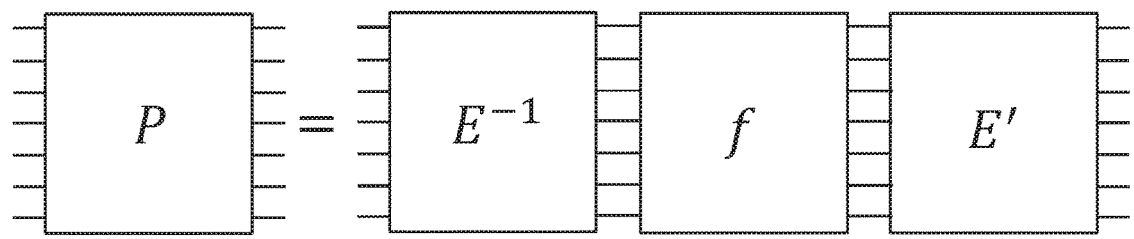
FIG. 4A through FIG. 4C are block diagrams that illustrates an example program to be obfuscated as a series of gates operating on 7-bit words to produce a particular output word y given a particular input word x, according to an embodiment.
Figure 4B:
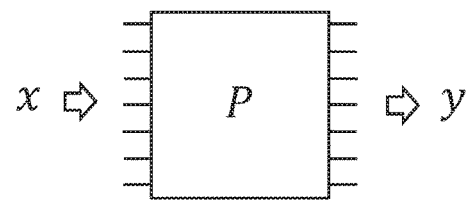
Figure 4C:
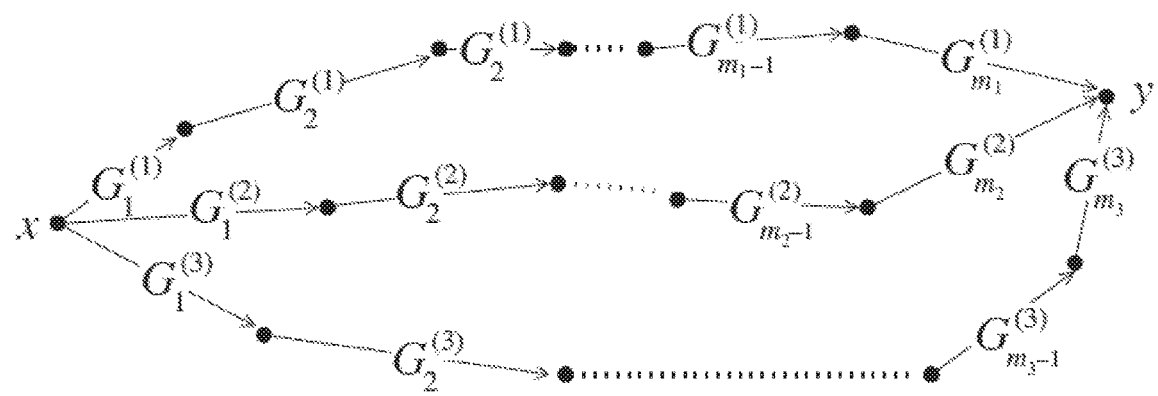

FIG. 4A through FIG. 4C are block diagrams that illustrates an example program to be obfuscated as a series of gates operating on 7 bit words to produce a particular output word y given a particular input word x, according to an embodiment. In FIG. 4A, program P comprising a decryption module $E^{-1}$, a function module f, and an encryption module $E^1$ acts on a word made up of a number of bits (e.g., 7 bits). All data encrypted in the database is encrypted using a scheme based on permutations constructed using reversible logic gates, such as the 3-bit Toffoli gate. Reversible computing ensures that the result from the total circuit is a permutation that takes an n-bit input x (herein, n and N are used interchangeably) and returns an n-bit output y=P(x), where P(x) is a permutation acting on the space of the $2^n$ possible n-bit input x. The permutations on the $2^n$-dimensional bit space are generated from simple permutations using reversible q-bit gates. Because the program E(x) that encrypts the plaintext data x' into cyphertext x is expressed using reversible gates, one can obtain the program $E^{-1}$ that decrypts the data by reversing the computation, using the inverse of each of the gates in the program, read in the reversed order. This reversed operation yields the inverse of the permutation, $x'=E^{-1}(x)$, which decrypts the data. In addition, the program f that performs the intended task on the plaintext data x' is converted into a description in terms of gates, as in the circuit model of computation, or produced by compilers for a central processing unit (CPU) or field programmable gate arrays. The logic gates are then expressed in terms of q-bit reversible gates. In some embodiments, the final circuit, e.g., the amalgamated/obfuscated $E^{-1} \cdot f \cdot E$, is programmed into a FPGA. This implementation has an advantage in that the action of the circuit on the input data runs faster, since it is implemented in hardware. In other embodiments E and $E^{-1}$ are defined using other encryption schemes, such as Advanced Encryption Standard (AES), as long as these schemes are formulated in terms of reversible gates.

As depicted in FIG. 4B, a reversible program P is then constructed by piping together three stages of programs: a module $E^{-1}$ to decrypt the data, a module f to perform the intended task, and a module $E^1$ to encrypt back the data.

Because each of the modules have been expressed in terms of reversible q-bit gates, the combined program P as a whole is composed of reversible q-bit gates. The combined reversible program is a permutation that takes an n-bit ciphertext word x as input and outputs a ciphertext word y=P(x), where P(x) is a permutation acting on the space of the $2^n$ possible n-bit input x, as depicted in FIG. 4B.

In some embodiments, it is preferable to associate each object code instruction with one or more q-bit gates, because object code tends to comprise a reduced number of commands so a total number of entries in the table can be smaller than for a table relating to higher level compound source code instructions. Also, the object code tends to operate on the level of the processing chip registers so the N-bits can be matched easily to the number of bits in the registers, simplifying the mapping. Source code can be written in any language and then compiled using the appropriate existing compiler for the unsecured servers to produce the object code that is mapped to the sequences of q-bit gates.

The description of the full program (or permutation) P in terms of 3-bit reversible gates is not unique. There are other sequences of 3-bit gates that yield the same final result P(x) for an input x, but the intermediate states of the machine are all different. FIG. 4C is a block diagram that illustrates example different intermediate states that can be achieved for any program P(x), according to an embodiment. In the illustrated embodiment, the original program P produces a sequence of $m_1$ q-bit gates $G_a^{(1)}$, each acting on up to three bits designated $(x_{ia}, x_{ja}, x_{ka})$ for $\alpha=1, \ldots m_1$, and subscripts i, j, k each indicating a different one of the n bits in a word for each a, and each subscripted x indicating the value of the indicated bit. There are other programs $P^{(p)}(x)$ of $m_p$ q-bit gates $G_b^{(p)}$, each acting on up to three bits designated $(x_{i\beta}, x_{j\beta}, x_{k\beta})$ for $\beta=1, \ldots m_p$ that each produce the same output y given the same input x. FIG. 4C depicts two alternative programs for p=2 and 3; but others are also allowed.

Given any one program $P^{(p)}$ it is not possible to tell which is the original program $P^{(1)}$. Selecting a program $P^{(o)}$ that shares few gate sequences with the original program $P^{(1)}$ provides an obfuscated program $P^{(o)}$ in which it not possible to determine the steps associated with decrypting or encrypting the data. Thus the obfuscated program $p^{(o)}$ can be run on a shared, public computer without giving away the key to decrypting the ciphertext stored on the public storage. In order to find a new sequence of gates yielding $P^{(o)}$, the three segments $E^{-1}$, f, and $E^1$ are advantageously amalgamated such that one can no longer distinguish them. The amalgamation includes moving gates from one segment across the boundary with another segment. But simply moving the gates is not enough; the gates pass each other, as to penetrate deep into the bulk of another segment.

It is the program $P^{(o)}$ that is sent to the server for execution. The cloud service provider is able to perform the computation requested, reading data from the encrypted database, and outputting encrypted data. But the cloud provider is not able to discern what is being done throughout the computation, for although the final output is the same, the intermediate steps yield different results at most or all steps of the calculation. For example, a client wants to search the database for all entries that satisfy a Boolean expression, a query. The server runs the obfuscated code, reading from the encrypted database and writing the successful queries into the encrypted output file, which is sent back to the client. The client then decrypts the answer on the secure computer.

In some embodiments, described in more detail below, several q-bit gates are fused into one k-bit gate ($3<k\leq N$). In such embodiments, table 230 includes entries or instructions that associate each source code or object code instruction with one or more k-bit gates that produce the same output one or more N-bit words from the same input one or more N-bit words as the source or object code instruction. In some of these embodiments, table 230 also includes entries that relate each k-bit gate with a sequence of one or more q-bit gates. Thus, if that sequence of q-bit gates is ever observed, the corresponding k-bit gate can be substituted, as desired. For example, table 230 includes rules or instructions to convert a series of q-bit gates into a k-bit gate, which is a straightforward process for a person of ordinary skill in the art without undue experimentation. In some embodiments, q-bit gates are successively combined until a k-bit gate is produced.

Module 232 is configured to convert source code or object code to sequences of q-bit reversible gates. Module 232 uses at least some of the data in table 230 and labels each q-bit gate as belonging to decryption or the plaintext function or encryption. In some embodiments, as described in more detail below, the module 232 breaks plaintext function into a series of segments, and an encryption process is added after each segment and a corresponding decryption process added before the next segment. This segmentation of the plaintext function can be done either before or after the conversion of source/object code to sequences of q-bit gates. In some of these segmented plaintext function embodiments, each q-bit gate is labeled as associated with the plaintext function or with an encryption/decryption process. In some embodiments, encryption q-bit gates are labeled to distinguish them from decryption q-bit gates. The output of module 232 is module 233 comprising a sequence of q-bit reversible gates equivalent to module 114. In some embodiments, the decryption process or encryption process or both are defined in terms of q-bit gates (e.g., the permutation encryption parameters 112 includes a series of q-bit gates that perform decryption or a series of q-bit gates that perform encryption or both). In these embodiments module 232 need not convert any source or object decryption code or encryption code or both to q-bit gates. In some embodiments, encryption is accomplished simply by reversing the order of the q-bit gates that perform decryption and parameters 112 only includes one series, for either decryption or encryption.

Module 234 is configured to move q-bit gates from one or more encryption or decryption processes to positions among the q-bit gates of a plaintext function segment or beyond. This is called an amalgamation process herein. In some embodiments, the amalgamation process consists of three steps. In the first step, gates involved in the decryption segment are propagated forward past gates involved in the plaintext function segment, resulting in a first-stage amalgamated segment. In the second step, gates involved in the encryption segment are propagated backward past gates resulting from the first step, resulting in a second-step amalgamated sequence of gates. In the third step, a number of q-bit gates of this sequence are fused into k-bit gates (k>3). Gate propagation consists of the motion of a gate past gates located on its right or left side, depending on whether the propagation is forward or backward, respectively.

Step one begins by propagating the right-most gate (e.g., Gz) in the decryption segment in the forward direction past J gates into the plaintext function segment or beyond. J is called the propagation distance. Recall, as defined above, motion past J gates means the Gz descendent (either the "moving" gate Gz or its farthest collision debris gate) has moved past the original J gates to the right of Gz. The process continues by propagating the second right-most gate in the decryption segment (e.g., Gy) past J' gates in the plaintext function segment or beyond. In this propagation, the second right-most gate (Gy) also moves past debris gates, if any, left over from the propagation of the first right-most gate (Gz). Each of the leftover gates counts as 1 toward the target J' that can be less than, equal to, or greater than J. An advantage of being equal or less than J is to accomplish obfuscation efficiently with fewer computations. An advantage of being greater than J is more complete obfuscation. In some embodiments J' is selected randomly to be vary about the value of J, to make it even more difficult to reverse the obfuscation process. The process is repeated until all gates in the decryption segment are propagated at least partway into the plaintext function segment or beyond, resulting in the amalgamation of the decryption segment with the plaintext function segment.

In step two, the encryption segment is amalgamated with the sequence of gates resulting from the previous amalgamation of the decryption and plaintext function segments. The process is analogous to the one described for step one, but in the backward direction. It starts with the left-most gate (e.g., Ga) involved in the encryption segment moving backward past K gates in the decryption-plaintext function amalgamated segment. Recall, as defined above, motion past K gates means either the Ga descendent (either the "moving" gate Ga or its farthest collision debris gate) has moved past the original K gates to the left of Ga. It continues with the motion of the second left-most gate (e.g., Gb) in the encryption segment past K' gates to the left, which includes also moving past gates left over from the propagation of the first left-most gate (Ga). Each of the leftover gates counts as 1 toward the target K' that can be less than, equal to, or greater than K. As above for J' and J, an advantage of being equal or less than K is to accomplish obfuscation efficiently with fewer computations. An advantage of being greater than K is more complete obfuscation. In some embodiments K' is selected randomly to be vary about the value of K, to make it even more difficult to reverse the obfuscation process. Step two ends when all gates in the encryption segment are propagated at least partway into the amalgamated decryption/function gates to the left.

In some embodiments, the method is modified to alternate between bringing the left-most gate of the right-hand side into the left-hand side (R→L) with bringing the right-most gate of the left-hand side into the right-hand side (L→R). Optional step three to combine several q-bit gates into a k-bit gate is described in more detail below.

Figure 26:
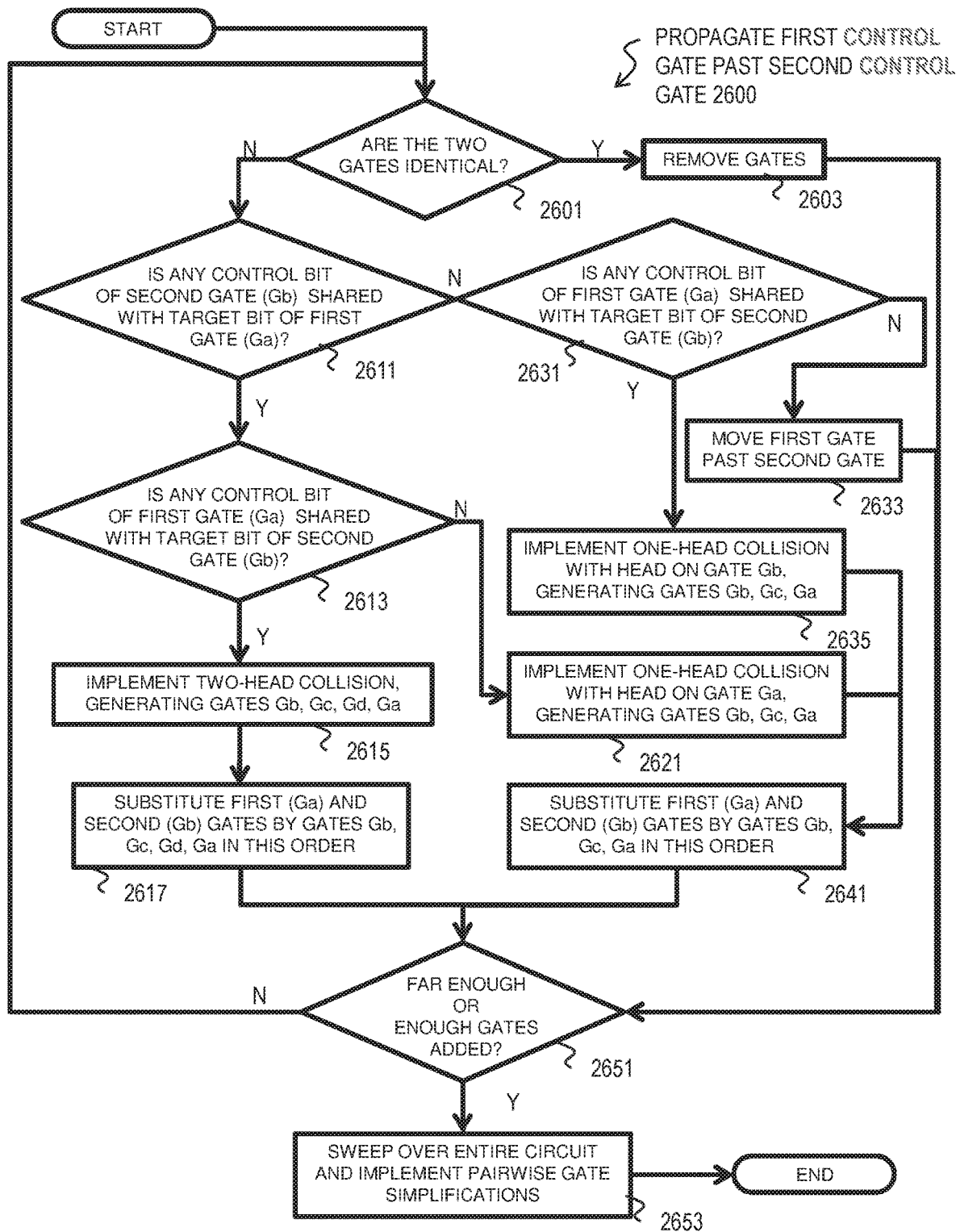
FIG. 26 is a flow diagram that illustrates an example method for propagating a first control q-bit gate past a second control q-bit gate, such as used in a step of the method of FIG. 3, according to an embodiment.

Automated propagation and collision procedures are described in more detail below with reference to FIG. 5 and FIG. 26, described in more detail in the Examples Section. The output of module 234 is module 235 comprising an obfuscated sequence of q-bit reversible gates (and zero or more k-bit gates) equivalent to module 114 but in which it is impractical to infer the original decryption or final encryption process, and thus impractical to determine the encryption parameter values in data 112.

Module 236 is configured to convert obfuscated sequences of q-bit reversible gates to obfuscated source code or object code. Module 236 uses at least some of the data in table 230. In some embodiments, as described in more detail below, the module 236 first fuses at least some q-bit gates into a k-bit gate based on a straightforward computation or based on the associations stored in table 230. The k-bit gates are converted to source code or object code using associations stored or coded in table 230 between k-bit gates and source code or object code instructions. In some embodiments the translation of a k-bit gate into one or more source or object code instructions is straightforward for a person of ordinary skill in the art without undue experimentation based on rules or one or more instructions. The output of module 236 is module 250 comprising obfuscated source or object code equivalent to module 114. This module 250 can be sent safely to unsecure servers 282 with module 115, as shown, to operate on the encrypted data 140 using the power or efficiency or resilience of those servers 282.

Although processes, equipment, and data structures are depicted in FIG. 1 and FIG. 2D as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 3:
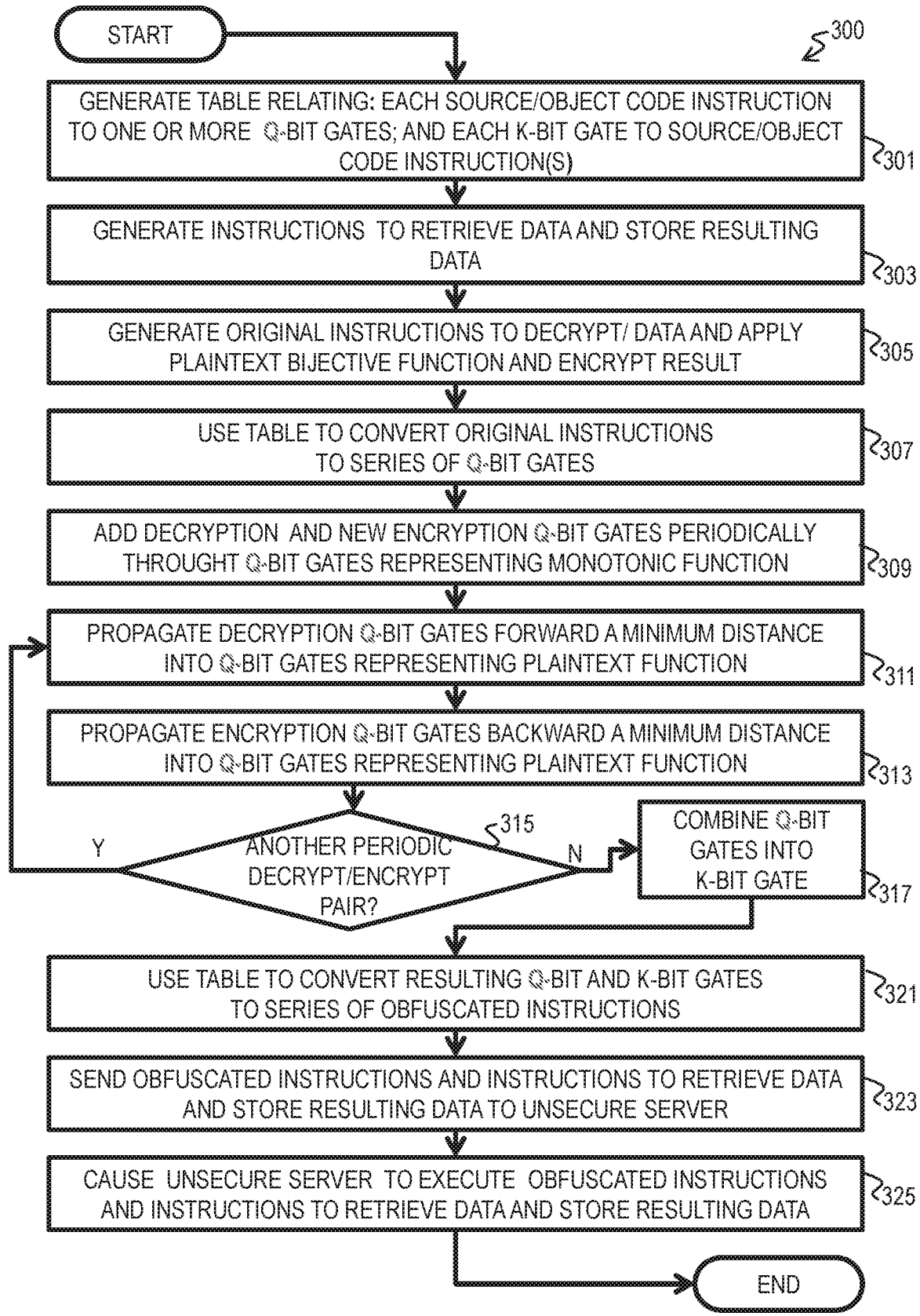
FIG. 3 is a flow chart that illustrates an example method for securely processing on a public resource encrypted data stored on a public resource, according to an embodiment.

FIG. 3 is a flow chart that illustrates an example method 300 for securely processing, on a public resource, encrypted data stored on a public resource, according to an embodiment. Although steps are depicted in FIG. 3, and in subsequent flowchart FIG. 5 and FIG. 26, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, table 230 is generated. This can be done manually or automatically, but when completed the results are stored as table 230 on a computer-readable medium. The entries in table 230 associate at least each source code or object code instruction with one or more q-bit gates. In some embodiments the source code or object code are instructions for a field programmable gate array (FPGA). In some embodiments, different associations are used going forward from source/object code to sequence of q-bit gate than used going backward. For example in the forward direction each object code instruction in a reduced instruction set processor (RISP) is converted to the fewest q-bit gates, while going backward each q-bit gate is converted to the most efficient RISP instructions, such as SHIFT functions, to execute a single q-bit gate.

In some embodiments using fusion, entries are included in table 230 to convert from each of one or more source code or object code instructions to a k-bit gate (3<k≤N). Translating q-bit or k-bit gates into source/object code instructions is straightforward for a person of ordinary skill in the art without undue experimentation. In the least efficient way, it requires passing $(2^3)$ and $(2^k)$ instructions, respectively. In embodiments not using fusion, these entries involving k-bit gates can be omitted from table 230.

In step 303, instructions are generated for module 115 to retrieve input ciphertext from encrypted data structure 140 and store resulting ciphertext in data structure 140. This can be done manually or automatically, e.g., based on an SQL query.

In step 305, instructions are generated for module 114 to decrypt the ciphertext, apply the plaintext function, and encrypt the resulting plaintext to produce result ciphertext for storage. In some embodiments, step 305 includes breaking the function into several function segments and adding new encryption instructions after each segment and adding corresponding decryption instructions before the next segment. In some embodiments that convert object code back and forth to q-bit gates, step 305 includes compiling source code that performs the function (segment), and optionally the leading decryption and following encryption segments, to generate the object code that is then converted to q-bit gates in step 307.

In step 307, table 230 is used to convert the instructions produced in step 305 to a sequence of q-bit gates. In some embodiments, a table is not used, and instead a gate compiler, that can be produced by a skilled programmer, is operated to convert source/object code to q-bit gates. In some embodiments, a combination of a compiler and a table 230 is used. In some embodiments a complier for a FPGA is used or the gates are implemented on a FPGA, or both. In some embodiments, step 307 is performed by module 232. The output of step 307 is module 233 of q-bit gates.

In step 309, the q-bit gates corresponding to the plaintext function is broken up into several segments and encryption and decryption gates are added between segments. In some embodiments, step 309 includes determining a number of gates to include in each segment, and is related to the depth of propagation determined for step 311, as described below. The depth of penetration (e.g., J, J', K or K', or some combination) is determined as a tradeoff because the greater the depth the more collisions and the more collision the more gates are generated. Increased depth is desirable for increased obfuscation, but too many resulting gates makes the resulting code excessively long and inefficient. To determine the number of segments, it is advantageous to achieve a good enough obfuscation of the function without incurring an excessive number of gates resulting from the collisions. A single segment would achieve maximum obfuscation, but would result in an exponentially large series of gates if all gates from the decryption and encryption segments were moved across the function segment. Breaking the function into too many segments (say, one for each gate in the function segment) would result in a weak obfuscation. A good balance is when the number of segments is of the order of (represented by the symbol $\sigma(\ )$) the number of bits in the N-bit word. But the optimal number of segments will depend on the type of function. For example, it is common for functions to have many gates, say $\sigma(N^2)$, e.g., multiplication does; but it is not always true. Some functions may have fewer gates, say $\sigma(N)$, like addition, in which case one need not break F(x) into segments to accomplish pretty good amalgamation without exponential growth. In fact, this is the reason why it is proposed to break F(x) into segments, each segment with $\sigma(N)$ gates. Then, the amalgamation can be performed locally without incurring exponential growth of the circuit length. For an F(x) function with $\sigma(N^2)$ gates, one would use about $\sigma(N)$ segments. An example for determining this number of gates per segment is described in the Examples Section. To further confound reversing the obfuscation, it is advantageous to add a random element to either or both the segment length and to the depths of penetration.

If this segmenting of the plaintext function had been done at the source/object code level in step 305, then step 309 is omitted. For example, steps 307 and 309 are performed by module 232 in FIG. 2D. In some embodiments, encryption/decryption segments already written as sequences of q-bit gates are employed (instead of using encryption/decryption segments written in source/object code level).

In step 311, q-bit gates involved in decryption are propagated forward past q-bit gates involved in the plaintext function or current segment thereof. A distance to move into the plaintext function is based on a tradeoff between the penetration obtained and the increase in the number of gates resulting from the collisions. A distance J (e.g., J number of gates) is defined for moving decryption q-bit gates forward into the plaintext function (segment) or beyond. Example methods to determine this distance is described in the Examples section. Collisions with existing reversible q-bit gates are resolved using the specific procedures described below with reference to FIG. 5 for generic reversible 3-bit gates and with reference to FIG. 26 for control gates, and provided in greater detail in the Examples section.

In step 313, q-bit gates involved in encryption are propagated backward past q-bit gates involved in the plaintext function or current segment thereof. A penetration distance to move into the plaintext function is based on a tradeoff between the depth obtained and increasing the number of gates for each collision. A distance K (e.g., K number of gates) is defined for moving encryption q-bit gates backward into the plaintext function (segment) or beyond. An example method to determine this distance is described in the Examples section, with K=J. Collisions with existing q-bit gates are resolved using the specific procedures described below with reference to FIG. 5 for generic reversible 3-bit gates and with reference to FIG. 26 for control gates, and provided in greater detail in the Examples section.

In the, some embodiments, other groupings are used. For example, decryption and function segments are lumped into one group (group A), and then gates are moved from the encryption segment (group B) into group A, resulting in group C.

In step 315 it is determined if there is another decryption-plaintext function segment-encryption sequence of q-bit gates. If so, obfuscated q-bit sequences of module 235 have been produced; and, control passes back to step 311. If not, control passes to step 317. For example, the loop described by steps 311, 313 and 315 is performed by module 234 in FIG. 2D.

In step 317, a sequence of q-bit gates in the obfuscated q-bit gate module 235 is replaced with (combined into) one or more k-bit gates. It is relatively simple to fuse q-bit gates into a k-bit gate, with k>3. For example, a program generates the k-bit gate given the sequence of q-bit gates. In these embodiments, table 230 relates source/object code instructions to q-bit gates (both ways) and k-bit gates to source/object instructions (one way). In some embodiments, fusion is not used; and, step 317 is omitted.

In step 321, the q-bit gates, and k-bit gates, of the obfuscated code are converted to source code or object code using table 230 to produce obfuscated source/object code module 250. For example, steps 317 and 321 are performed by module 236 in FIG. 2D. In some embodiments, module 236 could be implemented on the unsecure server, provided that the fusion takes place before sending out the sequence of gates in module 235. That would take advantage of the computational power available on the cloud In step 323, the obfuscated code 250 and data retrieval and result storage module 115 are sent to the unsecure servers 182. In step 325, the unsecure server is caused to execute the retrieval/storage module 115 and obfuscated code 250. For example a command to execute those modules is sent in a message to the unsecure server.

2. EXAMPLE EMBODIMENTS 2.1 Generic 3-Bit Gates

Figure 5:
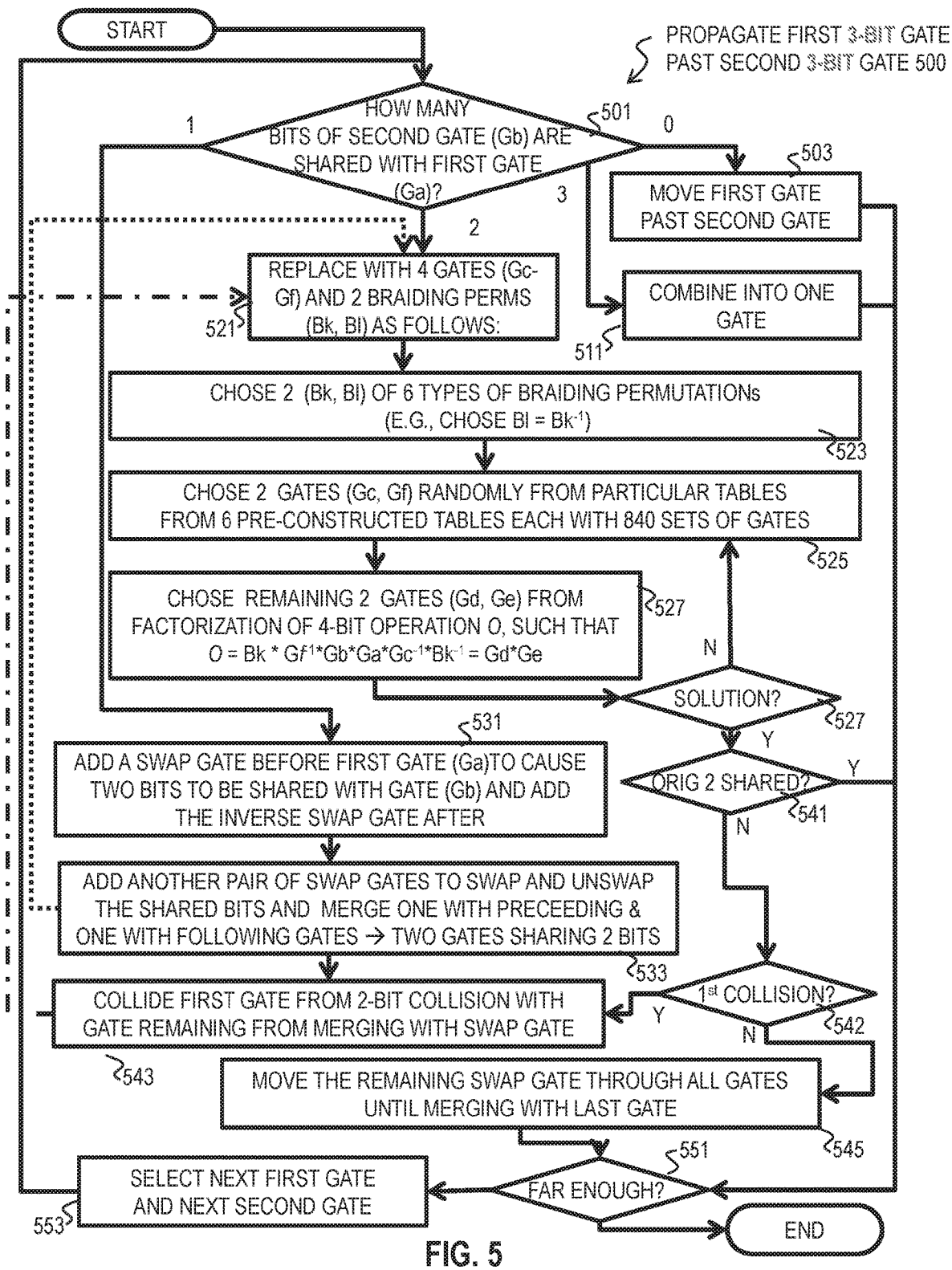
FIG. 5 is a flow diagram that illustrates an example method for propagating a first 3-bit gate past a second 3 bit gate, such as used in a step of the method of FIG. 3, according to an embodiment.

FIG. 5 is a flow diagram that illustrates an example method 500 for propagating a first 3-bit gate past a second 3 bit gate, such as used in step 311 or step 313 of the method of FIG. 3, according to an embodiment. The notation is used herein that the gate g acting on 3 bits, $b_1$, $b_2$, $b_3$ is written as G acting on the n-bit string with non-trivial action only on the 3 bits $b_1$, $b_2$, $b_3$. A three gate program P acting on n-bit word x can be expressed as $P(x)=G_3(G_2(G_3(x)))$ or alternatively as $P=G_3 \cdot G_2 \cdot G_1$. Thus, more generally form 3-bit gates, $P=G_m \cdot G_{m-1} \cdot G_{m-2} \ldots G_3 \cdot G_2 \cdot G_1$. In addition the program P can be considered an ordered list of lines, l, $$P = \begin{cases} \text{order} & \text{instruction (bit triple; gate)} \\ 1: & (x_{i_1}, x_{j_1}, x_{k_1}; g_1) \\ 2: & (x_{i_2}, x_{j_2}, x_{k_2}; g_2) \\ 3: & (x_{i_3}, x_{j_3}, x_{k_3}; g_3) \\ \vdots & \\ m: & (x_{i_m}, x_{j_m}, x_{k_m}; g_m) \end{cases}$$

So doing, the program P becomes a set of instructions, each instruction having a order number given by line number l and the triple of bits indicated by $x_{il}$, $x_{jl}$, $x_{kl}$ and the permutation $g_l$ on the specified 3 bits. For each line there are $n(n-1)(n-2)\times 8!$ possible instruction, some of which lead to the same result (because one can reorder the 3 bits and choose a corresponding permutation g). One way to remove this degeneracy to obtain the number of different instructions is to choose $x_{il} < x_{jl} < x_{kl}$, hence giving $$\binom{n}{3} \times 8!$$

non-degenerate instructions, where the notation $$\binom{a}{b} = \frac{a!}{b!(a-b)!}$$

and reads the number of combinations of a items taken b at a time.

COLLISION RULES. To illustrate gate motion, consider the simplest case, when two consecutive gates act on different sets of three bit, and, therefore, commute, i.e., $G_l \cdot G_{l-1} = G_{l-1} \cdot G_l$. In terms of program lines, if two consecutive gates do not share any common bits, i.e., If $\{x_{il}, x_{jl}, x_{kl}\} \cap \{x_{i(l+1)}, x_{j(l+1)}, x_{k(l+1)}\} = 0$, then lines l and l+1 can be exchanged in the list of instructions. One can continue with the commutation of consecutive gates only up to a point when the consecutive gates collide, that is, when the consecutive gates share one, two or three bits.

The probability of a collision can be estimated as follows. For a random distribution of gates, the probabilities that two consecutive gates have zero, one, two or three bits in common, designated $p_0$, $p_1$, $p_2$, $p_3$, are given by the following unnumbered equations.

$$p_0 = \frac{\binom{3}{0}\binom{n-3}{3}}{\binom{n}{3}}$$

$$p_1 = \frac{\binom{3}{1}\binom{n-2}{2}}{\binom{n}{3}}$$

$$p_2 = \frac{\binom{3}{2}\binom{n-1}{1}}{\binom{n}{3}}$$

$$p_3 = \frac{\binom{3}{3}\binom{n-0}{0}}{\binom{n}{3}}$$

Notice that for large n, $p_1 \approx 9/n$, $p_2 \approx 18/n^2$, $p_3 \approx 6/n^3$, and $p_0 = 1-p_1-p_2-p_3 \approx 1-9/n$. The probability that a gate can be commuted through l gates is $p_0^l = (1-9/n)^l \approx e^{-9l/n}$, or equivalently, the average penetration depth without resorting to collisions is approximately $l_0 = n/9$.

To sufficiently encrypt n-bit words involves on the order of n gates or more. Thus, the penetration depth without collisions is a fraction of the encryption segment of the program; and, therefore insufficient in general to obfuscate the decryption or encryption segments. Therefore, to push gates further into adjoining segments one should include approaches to handle collisions, e.g., to mix information before the collision into multiple gates past the pair of colliding gates. The steps of FIG. 5 describe an approach to move information past colliding gates for generic 3-bit gates. Here two gates that are colliding are termed a first 3-bit gate and a second 3-bit gate, or gates Ga and Gb.

In step 501, the number of bit locations shared by the first 3-bit gate and the second 3-bit gate is determined. If there is no shared bit location, then control passes to step 503. In step 503, the first 3-bit gate can be moved past the second 3-bit gate with no collision and no additional gates are generated. Control then passes to step 551.

In step 551 it is determined if the first gate has been propagated far enough, e.g., a number of gates indicated by a target number of gates (e.g., J or K). Step 551 includes incrementing the distance so far propagated (e.g., adding 1 to the distance propagated). If the distance propagated is less than the target number of gates, then control passes to step 553; otherwise, the process ends.

In step 553 the next first gate and next second gate are determined. For example, after one has generated a number of gates Gc through Gf to move Gb past Ga in a 2-bit collision, one asks "HAS Ga GONE PAST J (OR K) GATES?" Notice that, in a collision with two shared bits, when Ga is being moved past Gb, Ga is supplanted by descendant gate Gf, which can then move past with the next gate in the circuit. Similarly for a collision with just one shared bit, except that in these collision, there are 7 debris gates (say, Ge, Gd, Ge, Gf, Gg, Gh, Gi). In this case, descendant gate Gi supplants Ga for further movement. Of course, if the penetration is going in the opposite direction (Gb moving past Ga), then it is descendent gate Gc that supplants Gb in both types of collisions (two-bit shared and 1-bit shared). Then control passes back to step 501 to see the number of bit locations shared by the next first gate and second gate.

Figure 6:
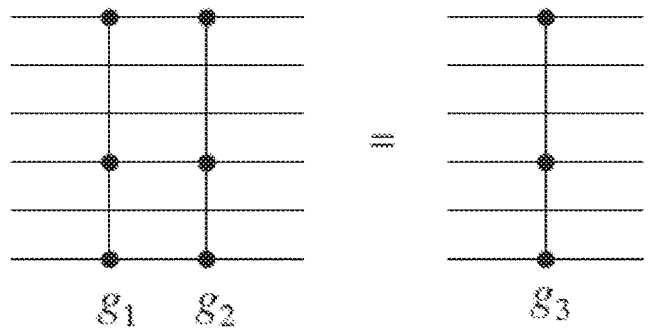
FIG. 6 is a block diagram that illustrates an example pair of 3-bit gates that collide at all three bits, according to an embodiment.

If it is determined in step 501 that all three bit locations are shared, then control passes to step 511. In step 511, the two 3-bit gates can replaced with (combined into) a different 3-bit gate that achieves the same result. FIG. 6 is a block diagram that illustrates an example pair of 3-bit gates that collide at all three bits, according to an embodiment. The result is a single 3-bit gate. In this case the number of 3-bit gates is reduced after the collision; but the propagation distance is still incremented by 1. Notice that there are 8! ways to deconvolve the resulting 3-bit gate into two 3-bits gates acting on the same bits. Thus it is difficult to undo the amalgamation resulting form this collision because a tree of possibilities is generated. Control then passes to step 551, and following, described above.

Figure 7:
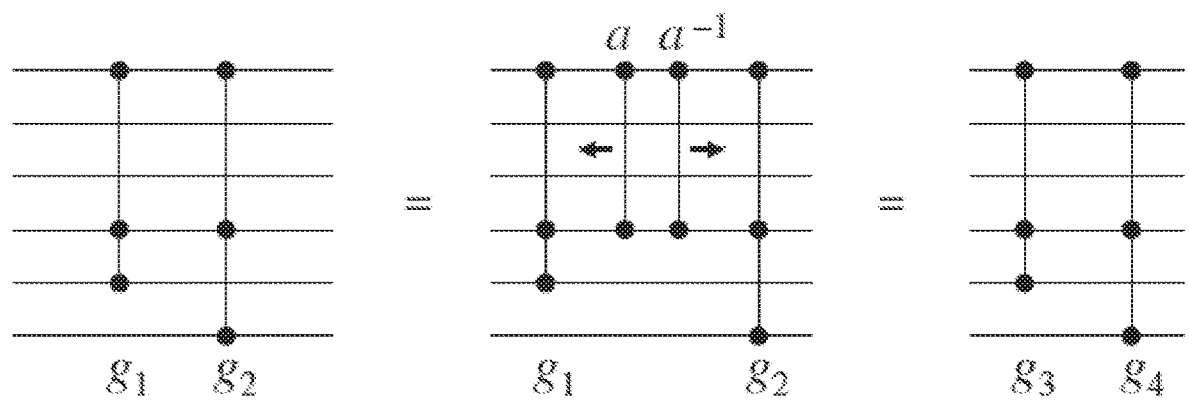
FIG. 7 is a block diagram that illustrates an example pair of 3-bit gates that collide at two bits, according to an embodiment.

If it is determined in step 501 that two bit locations are shared, then control passes to step 521. There are trivial ways to change gates Ga and Gb into Gc and Gd that do not obfuscate. One of them is to insert gauge transformations in the two bits between the two gates. FIG. 7 is a block diagram that illustrates an example pair of 3-bit gates Gg1 and Gg2 that collide at two bits, according to an embodiment. This procedure is not effective because 1) it does not change the topology of the circuit and 2) it only affects the step between the two gates, as the Ga, Ga$^{-1}$ pairs in any preceding sequence of gates will be canceled out (Ga appears multiplying Ga$^{-1}$). Instead, the process depicted in steps 521 through 541 provides greater obfuscation.

In step 521, a process begins to replace the two 3-bit gates (designated Ga and Gb for the first and second, respectively) with four 3-bit gates, designated Gc, Gd, Ge, Gf and two braiding gates designated Bk and Bl. Braiding gates are 5-bit gates; but, once determined can be converted to two or more 3-bit gates that are easily determined; and provided below. The replacement gates are arranged as in Equation 1 and depicted in FIG. 8.

$$Gb \cdot Ga = Gf \cdot Bl \cdot Ge \cdot Gd \cdot Bk \cdot Gc \tag{1}$$

Figure 8:
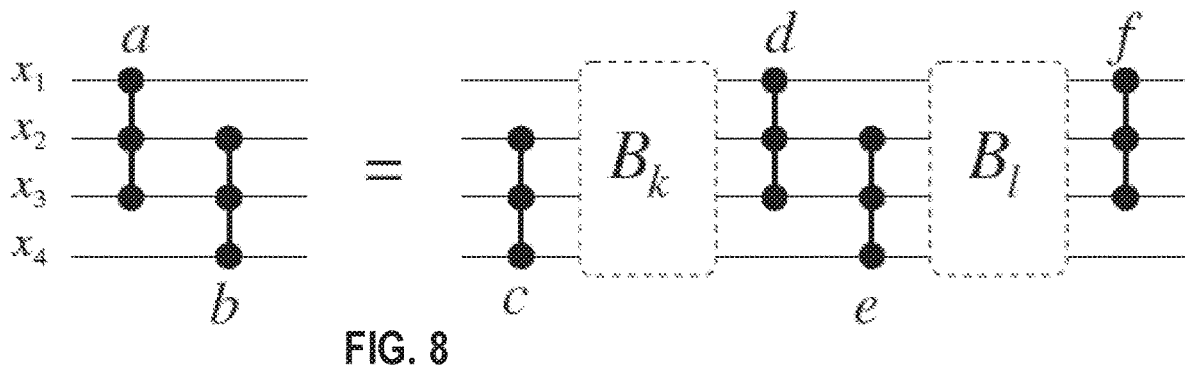
FIG. 8 is a block diagram that illustrates an example pair of 3-bit gates that collide at two bits, according to an embodiment.

FIG. 8 is a block diagram that illustrates an example pair of 3-bit gates that collide at two bits, according to an embodiment.

Figure 9:
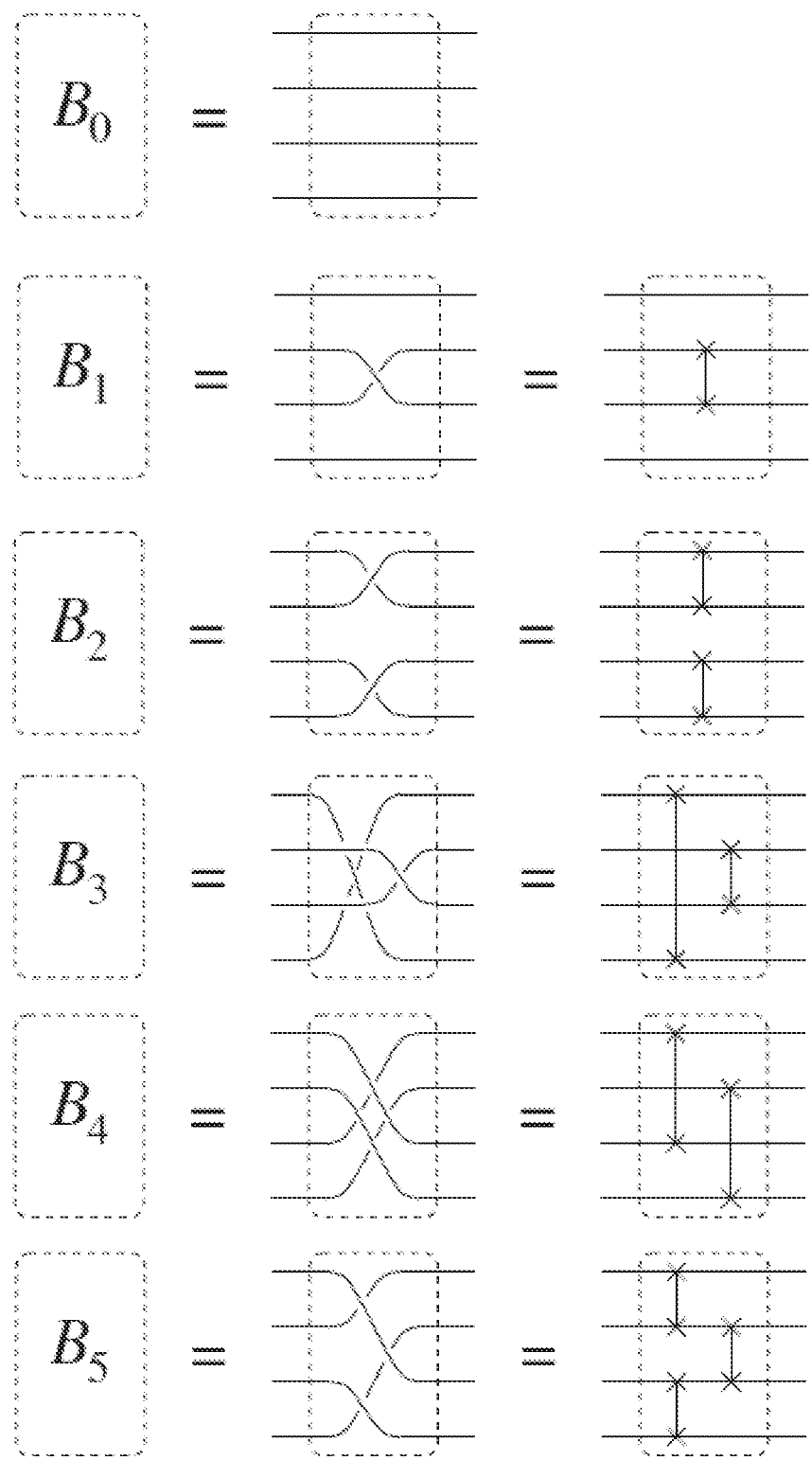
FIG. 9 is a block diagram that illustrates an example set of braiding permutations useful in producing debris gates when 3-bit gates collide at two bits, according to an embodiment.
Figure 10:
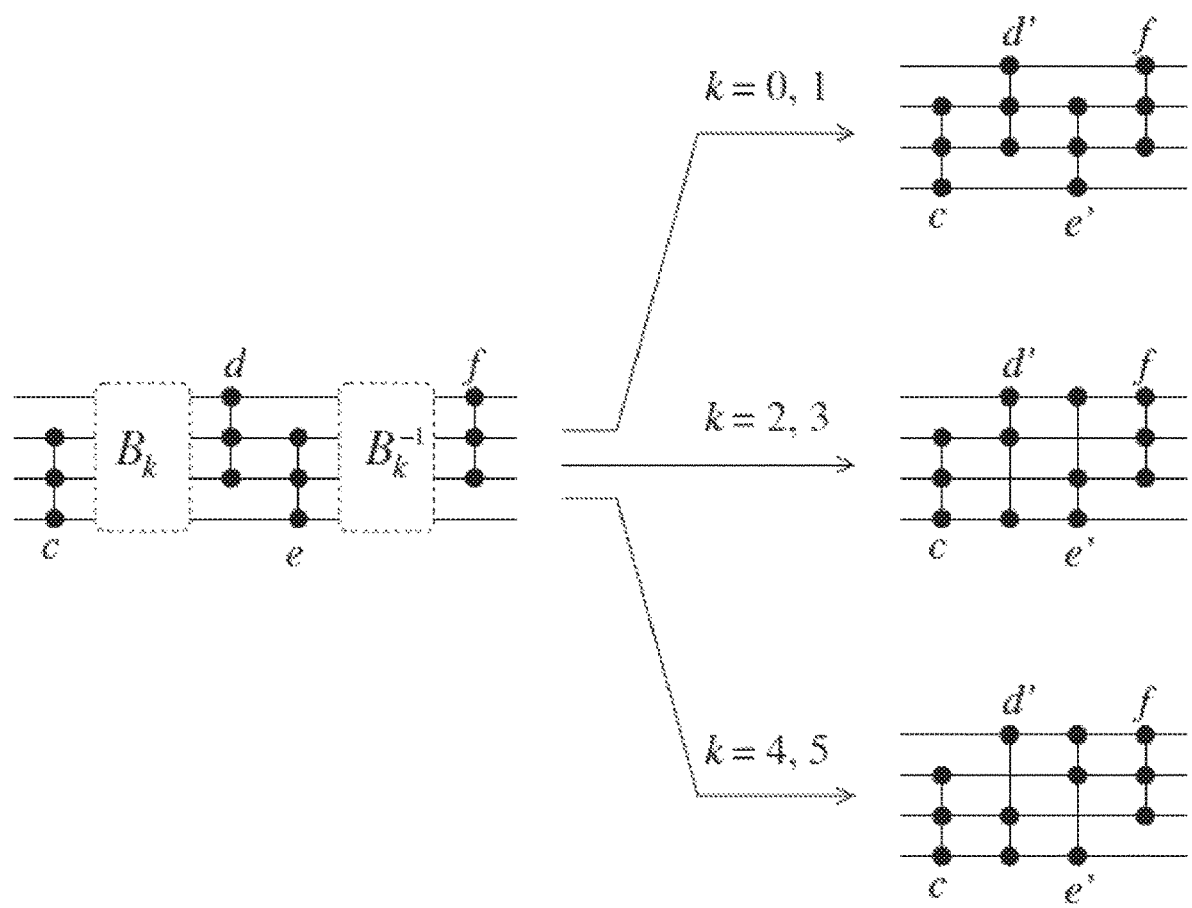
FIG. 10 is a block diagram that illustrates an example set of debris gates produced when 3-bit gates collide at two bits, according to an embodiment.

In step 523, choose Bl and Bk from among 6 types of Braiding permutations depicted in FIG. 9. FIG. 9 is a block diagram that illustrates an example set of braiding permutations useful in producing debris gates when 3-bit gates collide at two bits, according to an embodiment. B0, B1, and B2 are their own inverses, but that is not the case for B3, B4, and B5. Both Bk and Bl can be arbitrarily chosen among these six and their inverses. For convenience, to determine the collision debris, one can choose k and l in FIG. 8 such that Bl=Bk$^{-1}$ (superscript −1 indicates running through a gate in the reverse direction), in which case there are only three possible configurations for gates Gd' and Ge' resulting from moving the permutations past gates Gd and Ge. FIG. 10 is a block diagram that illustrates an example set of debris gates produced when 3-bit gates collide at two bits, according to an embodiment choosing Bl=Bk$^{-1}$.

Figure 11:
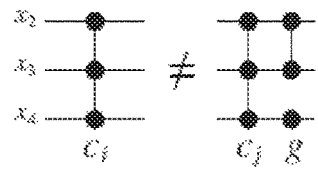
FIG. 11 is a block diagram that illustrates example conditions for building tables useful in producing debris gates when 3-bit gates collide at two bits, according to an embodiment.
Figure 11:
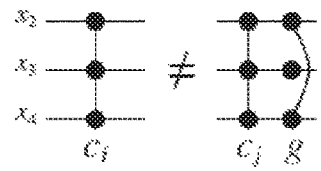
Figure 11:
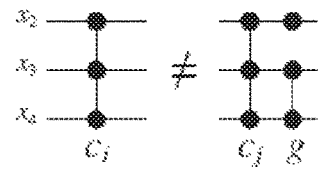
Figure 11:
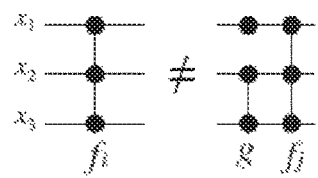
Figure 11:
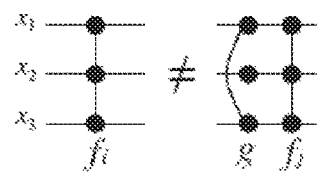
Figure 11:
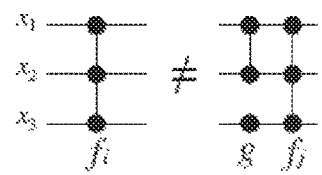

In step 525, two bounding 3-bit gates Gc and Gf are chosen randomly from a particular table of 6 predetermined tables each with 840 sets of gates. Once a braiding gate Bk is chosen, in order to determine the gates Gc, Gd, Ge, and Gf, we start by choosing gates Gc and Gf randomly from pre-constructed tables. This random selection is an advantage in preventing reverse engineering the original gates from the resulting gates. There are six such tables and each contains 8!/(2! 4!)=840 distinct types of 3-bit reversible gates. The purpose of these tables is to restrict the possible set of gates (Gc, Gd, Ge, Gf) to non-equivalent ones and to facilitate the search for gates Gd and Ge. The condition that the gates obey for membership in each of 6 predetermined tables are listed below. FIG. 11 is a block diagram that illustrates example conditions for selecting tables useful in producing debris gates when 3-bit gates collide at two bits, according to an embodiment.

Tables 1 to 3 comprise gates {Gci} acting on bits x2, X3, X4, such that Gci≠Gcj·g, for all i, j=1, . . . , 840. For Table 1, g is the product of a permutation on bit $x_4$ and a 2-bit gate acting on bits $x_2$ and $x_3$. For Table 2, g is the product of a permutation on bit $x_3$ and a 2-bit gate acting on bits $x_2$ and $x_4$. For Table 3, g is the product of a permutation on bit $x_2$ and a 2-bit gate acting on bits $x_3$ and $x_4$. Tables 4 to 6 comprise gates {Gfi} acting on bits $x_1$, $x_2$, $x_3$, such that Gfi≈g·Gfj, for all i, j=1, . . . , 840. For Table 4, g is the product of a permutation on bit $x_1$ and a 2-bit gate acting on bits $x_2$ and $x_3$. For Table 5, g is the product of a permutation on bit $x_2$ and a 2-bit gate acting on bits $x_1$ and $x_3$. For Table 6, g is the product of a permutation on bit $x_3$ and a 2-bit gate acting on bits $x_1$ and $x_2$. The tables can be generated in any manner. For example, in some embodiments, the tables are generated by trial-and-error, namely, by running through all 3-bit gates (8! gates), and for each gate eliminating all those that are equivalent to the product of a 2-bit gate (there 4!=24 possibilities) and a 1-bit gate (2!=2 possibilities). So, overall, one would need to check 8!×4!×2!=1,935,360 cases for each table. It is certainly doable in a current processor (say, it would take less than an hour per table).

The correspondence between the braiding gate type selection and the table selected is as follows. For B0 and B1, gate Gc is chosen at random from Table 1 and gate Gf at random from Table 4. For B2 and B3, gate Gc is chosen at random from Table 2 and gate Gf at random from Table 5. For B4 and B5, gate Gc is chosen at random from Table 3 and gate Gf at random from Table 6.

In step 527 the remaining two 3-bit gates Gd and Ge are chosen to solve Equation 2.

$$Ge \cdot Gd = O = Bk \cdot Gf^1 \cdot Gb \cdot Ga \cdot Gc^{-1} \cdot Bk^{-1} \tag{2}$$

Figure 12:
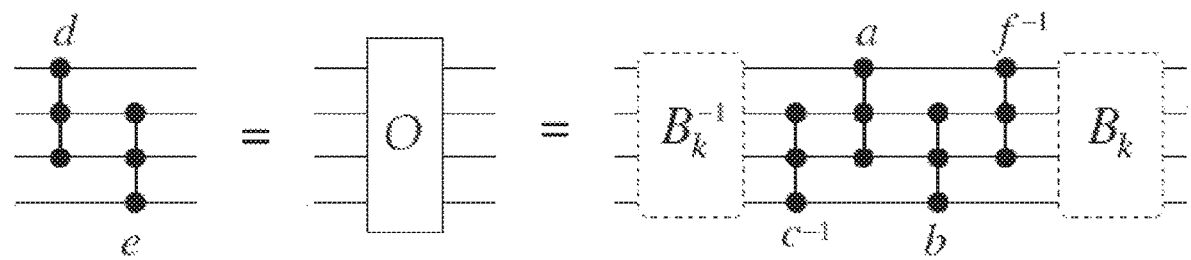
FIG. 12 is a block diagram that illustrates an example 4-bit operator decomposed to determine some debris gates when 3-bit gates collide at two bits, according to an embodiment.

Note that the product Ge·Gd with only two overlapping bits corresponds to a 4-bit operator gate designated O. FIG. 12 is a block diagram that illustrates an example 4-bit operator O decomposed to determine some debris gates Gd and Ge when 3-bit gates collide at two bits, according to an embodiment. In step 527, it is determined whether a solution to Equation 2 could be found. If not, control passes back to step 525 to randomly select a different two bounding gates Gc and Gf, and repeat the attempt in step 527 to solve for the remaining gates Gd and Ge. If a solution is found, then control passes to step 541. Many pairs of gates Gd and Ge are often found. Empirically, starting from 2500 arbitrary gates Ga and Gb, we found that 1.25% had one (Gc, Gd, Ge, Gf) solution, 31.80% had 2 to 10 solutions, 49.16% had 11 to 100 solutions, 11.76% had 101 to 1000 solutions, and 6.04% has more than 1000 solutions. We note that not all (8!)2 pairs of Ga and Gb gates need to be tested because of the gauge symmetry Gb·Ga=Gb·g·g$^{-1}$·Ga, where g is a gate containing a two-bit permutation acting on the bits shared by Ga and Gb and a one-bit permutation acting on an unshared bit from Ga or Gb.

Figure 13A:
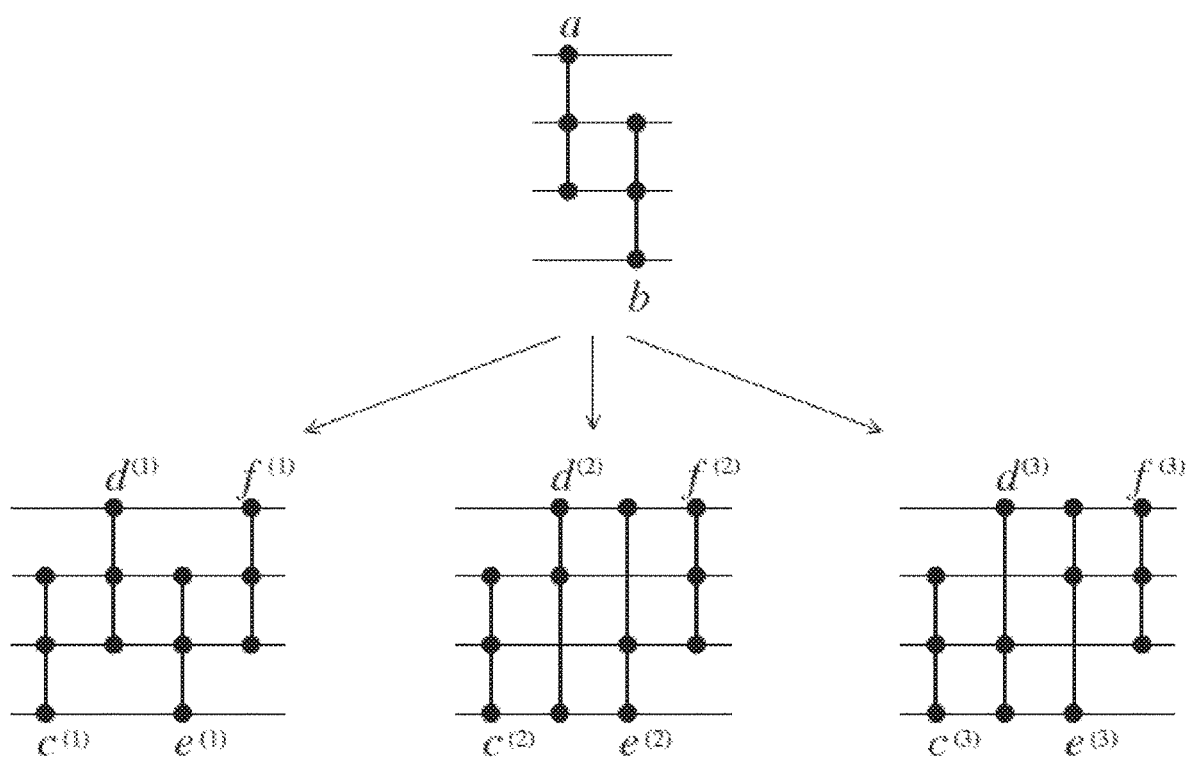
FIG. 13A is a block diagram that illustrates example sets of debris gates c, d, e and f when 3-bit gates collide at two bits, according to an embodiment.

To further illustrate the operations of steps 521 to 527, consider gates Ga and Gb in FIG. 13A. FIG. 13A is a block diagram that illustrates example sets of debris gates Gc, Gd, Ge and Gf when 3-bit gates Ga and Gb collide at two bits, according to an embodiment. The corresponding truth tables for gates Ga through Gf are given in FIG. 13B, labeled by their subscripts. FIG. 13B is a table that illustrates an example set of truth tables for debris gates Gc, Gd, Ge and Gf when particular 3-bit gates Ga and Gb collide at two bits, according to an embodiment In step 541 it is determined whether step 521 was entered from step 501 based on two shared bit locations, as described here. If so, then the collision is resolved and control passes to step 551, described above, to see if further propagation is desired. Otherwise control passes to step 542, described below.

If it is determined in step 501 that only one bit location is shared, then control passes to step 531 and following to take advantage of the solution above for gates with 2 shared bit locations. In step 531, a swap gate S1 is added before the first gate (Ga) to cause two bits to be shared with the second gate (Gb). A swap gate is a 2-bit gate that swaps the locations of two bits without changing the value and can be implemented with a degenerate 3-bit gate that does not change the value or location of one bit. The inverse swap gate $S1^{-1}$ is added after gate Ga and before gate Gb. Note that $S1^{-1}=S1$. The resulting gates are given by Equation 3a $$Gb \cdot Ga = Gb \cdot S1^{-1} \cdot S1 \cdot Ga = Gb \cdot S1^{-1} \cdot Ga' \cdot S1 = Gb \cdot S2 \cdot Ga' \cdot S1 \quad (3a)$$

Where Ga' is a gate based on Ga but with two bits that overlap Gb as a result of the swap gate S1. Ga' is formed by moving S1 before gate Ga. One SWAP gate stays in the internal part of the circuit and is named S2; the other moves to the outer part and is named S1; but both swap the same two bits. Ga' can be obtained from Ga by swapping bits in the gate definition. For a chosen gate, there are four ways to make the SWAP insertions, depending on which bits are swapped and how they are swapped. Therefore, in total, there are eight ways to proceed with the collision.

Figure 14:
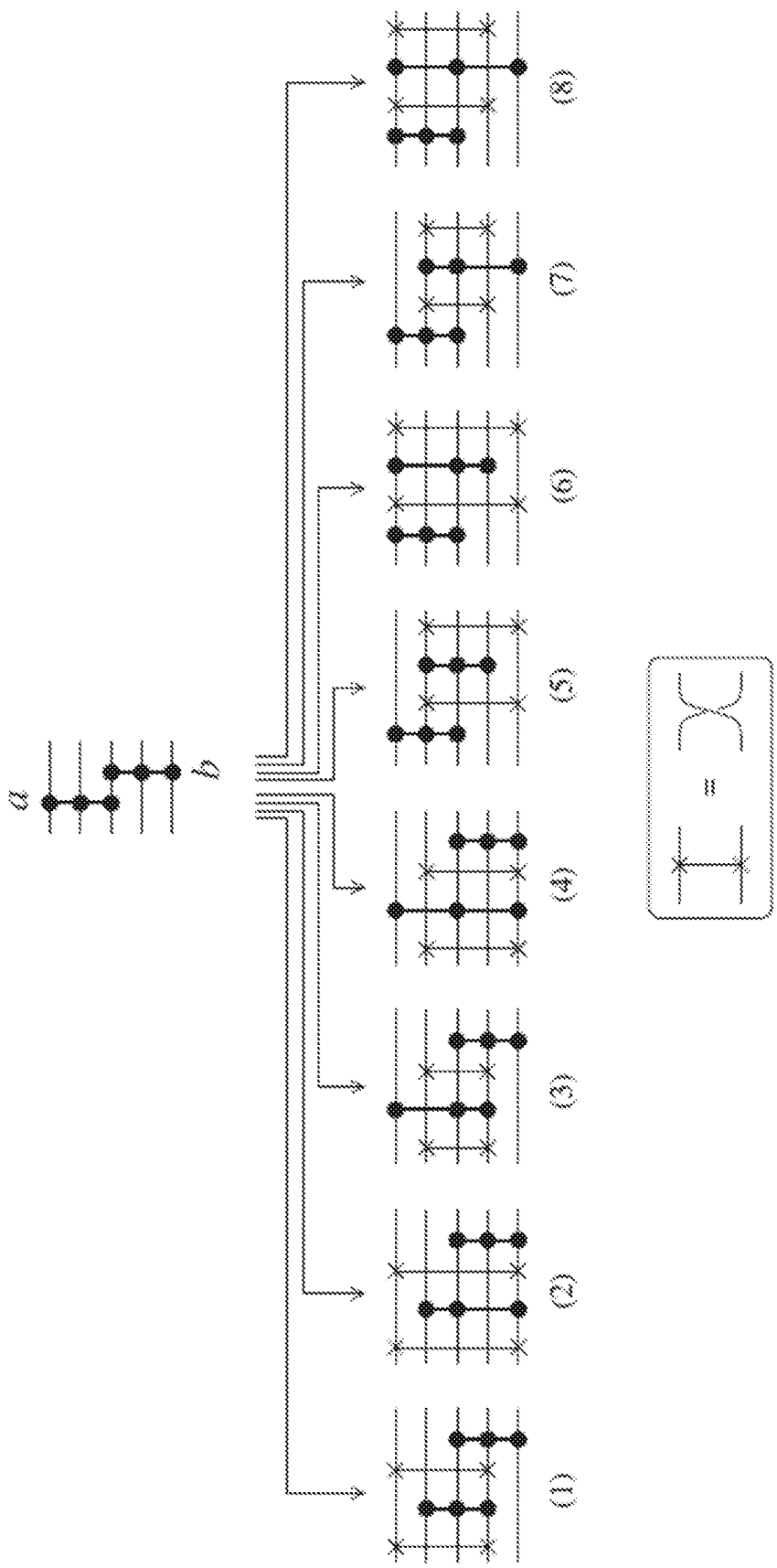
FIG. 14 is a block diagram that illustrates eight example ways to introduce swap gates when 3-bit gates collide at one bit, according to an embodiment.
Figure 15:
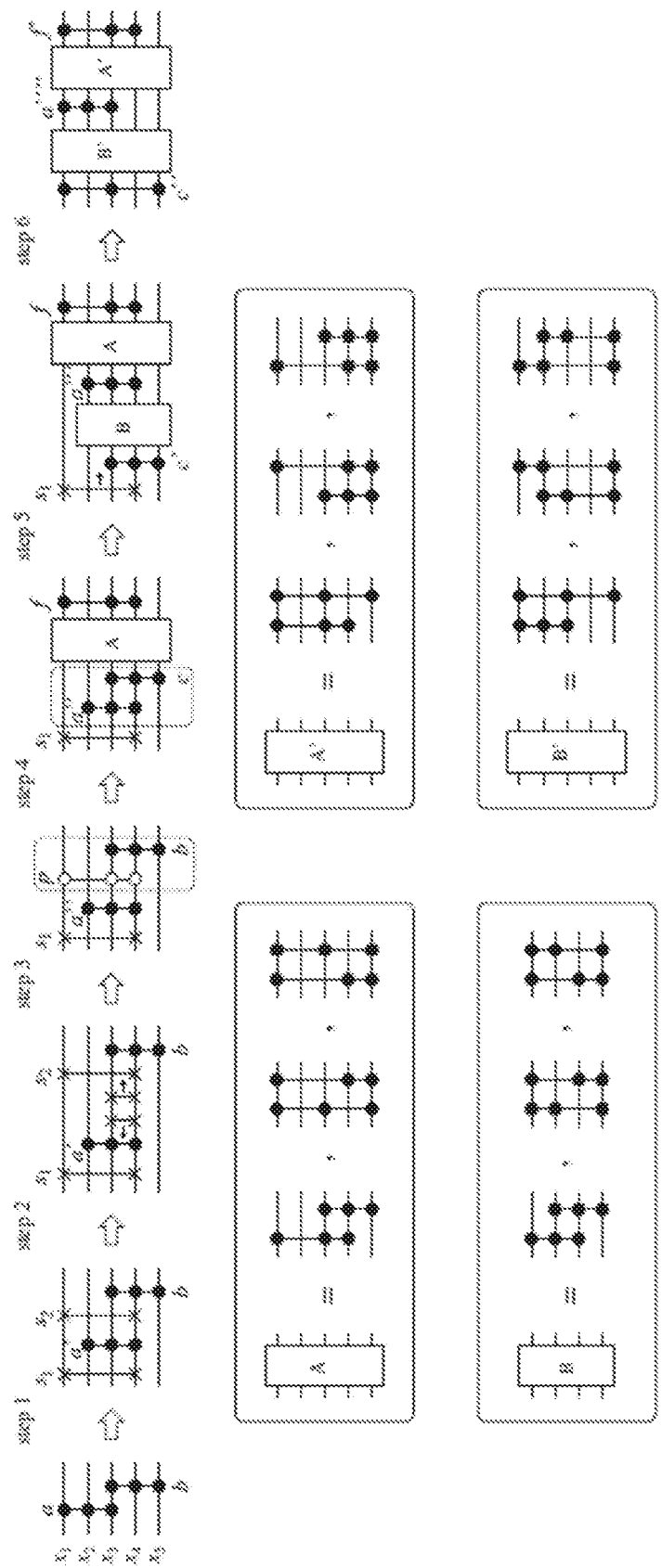
FIG. 15 is a block diagram that illustrates an example set of steps to produce nontrivial debris gates when 3-bit gates collide at one bit, according to an embodiment.

FIG. 14 is a block diagram that illustrates eight example ways to introduce swap gates when 3-bit gates collide at one bit, according to an embodiment. In the illustrated embodiment, Gate Ga acts on bits $x_1$, $x_2$, $x_3$ and gate Gb acts on bits $x_3$, $x_4$, $x_5$, thus there is a collision on one bit, $x_3$. (The bits do not need to be adjacent to each other.) In the following, only the first way is further developed, when one gate Ga is chosen and its first bit is swapped with the second bit on gate Gb; the process can be easily adapted for the other seven ways. FIG. 15 is a block diagram that illustrates an example set of steps to produce nontrivial debris gates when 3-bit gates collide at one bit, according to an embodiment. The first option depicted in FIG. 14 produces the result of step 1 depicted in FIG. 15 for the illustrated example using S1=S2 that swap the first and fourth bits.

In step 533, another pair of swap gates S3 and $S4=S3^{-1}$ are added between Ga' and the inverse swap gate S2. The two swap gates swap and un-swap the two colliding bits. The result is expressed in Equation 3b.

$$Gb \cdot Ga = Gb \cdot S2 \cdot S4 \cdot S3 \cdot Ga' \cdot S1 \quad (3b)$$

This step is depicted for the illustrated embodiment as step 2 in FIG. 15. The first, S3, of the two is merged with Ga' to form Ga" and the second, S4, is merged with the inverse swap gate, S2, to form Gp.

$$Gb \cdot Ga = Gb \cdot Gp \cdot G_a'' \cdot S1 \quad (3c)$$

where Ga"=S3·Ga' and Gp=S2 S4
The result includes three gates Ga", Gp and Gb that each share two bit locations. This step is depicted for the illustrated embodiment as step 3 in FIG. 15.

Then control passes to step 521 to replace the artificially generated gate Gp and original gate Gb with four gates and 2 braiding gates, as described above for two bit collisions to provide Equation 4a and 4b.

$$Gb \cdot Ga = Gb \cdot Gp \cdot G_a'' \cdot S1$$

$$= Gf \cdot A \cdot Gc \cdot Ga'' \cdot S1 \quad (4a)$$

where $A = Bl \cdot Ge \cdot Gd \cdot Bk$ (4b)

This step is depicted for the illustrated embodiment as step 4 in FIG. 15.

This time, however, when a solution Gd·A·Gc Gf is found in step 527 and control passes to step 541, the answer to the test is "No," the original gates Ga and Gb did not share 2 locations; and, control passes to step 542.

In step 542, it is determined whether the two-bit collision is the first collision generated by the original one-bit collision, e.g., Gp and Gb. If so, control passes to step 543.

In step 543, the first gate Gc resulting from the first resolved two-bit collision is made to collide with the gate Ga" remaining from merging the swapped original gate Ga' with the swap gate S3. The result is four more gates and two Braiding gates as described above for two bit collisions to provide Equation 5a and 5b. For convenience the outer gate is called Ga'" instead of Gf to reflect the deepest penetration of the information introduced by gate Ga.

$$Gb \cdot Ga = Gf \cdot A \cdot Gc \cdot Ga'' \cdot S1$$

$$= Gf \cdot A \cdot Ga''' \cdot Bl' \cdot Ge' \cdot Gd' \cdot Bk' \cdot Gc' \cdot S1$$

$$= Gf \cdot A \cdot Ga''' \cdot B \cdot Gc' \cdot S1 \quad (5a)$$

where $B = Bl' \cdot Ge' \cdot Gd' \cdot Bk'$ (5b)

This step is depicted for the illustrated embodiment as step 5 in FIG. 15.

If, in step 542, it is determined that the two-bit collision is not the first two-bit collision generated by the original one-bit collision, then control passes to step 545 to deal with the result Equation 5a from step 543.

In step 545, the remaining swap gate S1 collides with the gates A·Ga'"·B·Gc' until the collisions affects the outer gate Gf resulting from the collision in step 543 to Equation 6. The collision of a two bit swap gate S1 with a three bit gate Gc' can be treated as a degenerate 3-bit gate G1 with a two-bit overlap with Gc' so the two-bit collision method can be used. It turns out that for this kind of collision, the result is straightforward: the swap gate S1 "moves through" the 3-bit gate, and just literally swaps bit lines. Swap gate S1 moves through the gates, modifying each until it hits gate Gf. By construction, gates S1 and Gf share two bit lines. Therefore, S1 can be absorbed by Gf, turning the latter into Gf', which acts on the same bit lines as Gf.]

$$Gb \cdot Ga = Gf' \cdot A' \cdot Ga'''' \cdot B' \cdot Gc'' \quad (6)$$

Notice that for both permutations A and B, and A' and B', there are three possible configurations of their two 3-bit gates (depicted for the illustrated example embodiment as inserts in FIG. 15), depending on the random choices made during the implementation of the two-bit collisions. The final result of this process is to establish a sequence of seven 3-bit gates that is equivalent to the original gates Ga and Gb.

Control then passes to step 551, described above, to see if further propagation is desired.

In some embodiments, the obfuscated code that operates on encrypted data is part of an overall program that does not need to be obfuscated. In some of these embodiments, the obfuscated code is embedded among instructions that are not obfuscated.

Figure 16:
FIG. 16 and FIG. 17 are block diagrams that illustrate the introduction of intermediate encryption and decryption steps to further obfuscate a program by colliding gates, according to an embodiment.
Figure 17:

MULTIPLE ENCRYPTION. In step 309 described above, before colliding gates, decryption and encryption gates are added intermittently or periodically throughout the gates representing the function f. Using 3-bit gates, this step and the resulting obfuscation is described here. If the encryption is performed using on the order of n (expressed as σ(n)) gates (acting generically on bits $i_a, j_a, k_a$ for gate Ga), then the following method is advantageous. One breaks up the function f as a product, f=$f_p \cdot f_{p-1} \ldots f_2 \cdot f$ as shown in FIG. 16. FIG. 16 and FIG. 17 are block diagrams that illustrate the introduction of intermediate encryption and decryption steps to further obfuscate a program by colliding gates, according to an embodiment. For a periodic introduction of encryption, if f has $n_g$ gates, then each of the functions $f_r$ for r=1, . . . , p−1 is chosen to have $n_g/p$ gates, with $f_p$ containing all the remaining gates. One then expresses the periodic encryption as given by Equation 7.

$$E' \cdot f \cdot E^{-1} = (E' \cdot f_p \cdot E_{p-1}^{-1}) \ldots (E_r \cdot f_r \cdot E_{r-1}^{-1}) \ldots (E_2 \cdot f_2 \cdot E_1^{-1}) \cdot (E_1 \cdot f_1 \cdot E^{-1}) \quad (7)$$

as shown in FIG. 17, where one is free to choose different encryption/decryption permutations $E_r$, $E_r^{-1}$ for each r=1, . . . p−1.

Notice that each block $(E_r \cdot f_r \cdot E_{r-1}^{-1})$ is itself an example of a computation that decrypts-computes-encrypts on data. If each of these blocks is obfuscated, so is their product. That each block is obfuscated means that even if one looks at the outputs of each block, one cannot infer either the encryption/decryption pieces nor the computation $f_r$.

Figure 18:
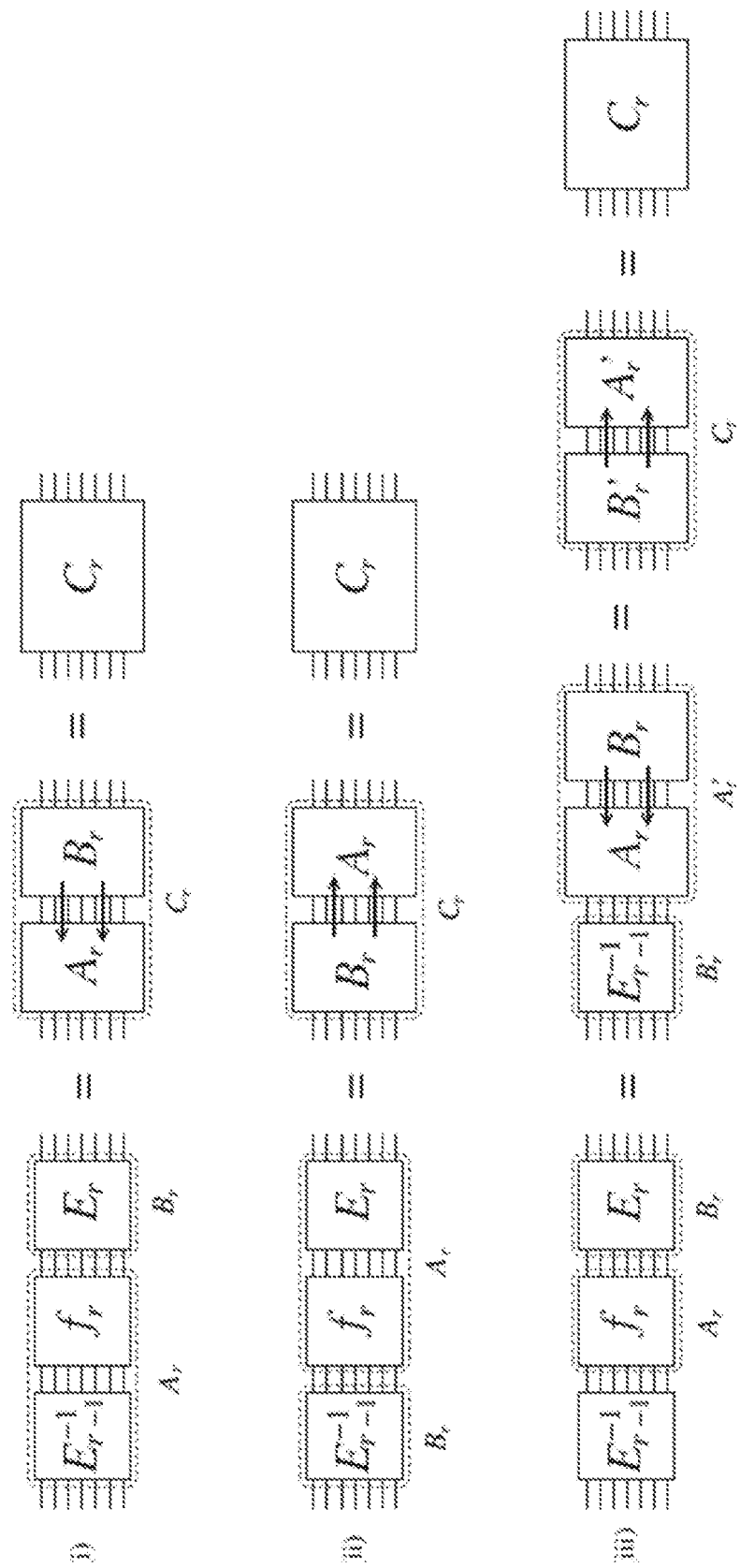
FIG. 18 is a block diagram that illustrates three example sets of steps to produce an obfuscated program, according to an embodiment.

There are several ways to obfuscate a block $(E_r \cdot f_r \cdot E_{r-1}^{-1})$ where $E_{r-1}^{-1}$ and $E_r$ each contain a n gates. Here a is a constant $\sigma(1)$ (a=3 or 4 is sufficient for many security purposes) and $f_r$ is assumed to contain b $n \sim n_g/p$ gates. FIG. 18 is a block diagram that illustrates three example sets of steps to produce an obfuscated program, according to an embodiment. FIG. 18 shows steps for amalgamation of the expression $E_r \cdot f_r \cdot E_{r-1}^{-1}$ into an obfuscated circuit $C_r$: (i) merging $E_{r-1}^{-1}$ and $f_r$ into a block $A_r$ and moving gates from $E_r$ as block $B_r$ through that block $A_r$ (corresponding to step 313 in FIG. 3); (ii) merging $f_r$ and $E_r$ into a block $A_r$ and moving gates from $E_{r-1}^{-1}$ as block $B_r$ through that block $A_r$ (corresponding to step 311 in FIG. 3); or (iii) moving gates from $E_r$ as block $B_r$ through $f_r$ as $A_r$, resulting into an amalgamated block $A_r'$ and then moving gates from $E_{r-1}^{-1}$ as block $B_r'$ through that block $A_r'$ (corresponding to both steps 311 and 313 in FIG. 3).

Figure 23A:
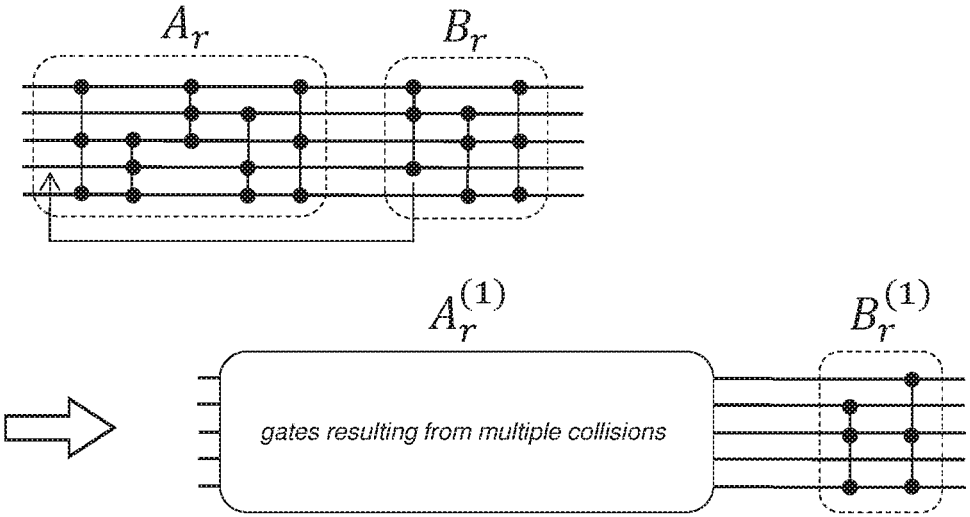
FIG. 23A through FIG. 23C are block diagrams that illustrate example distances of movement of encryption/decryption gates into function code, according to an embodiment.
Figure 23B:
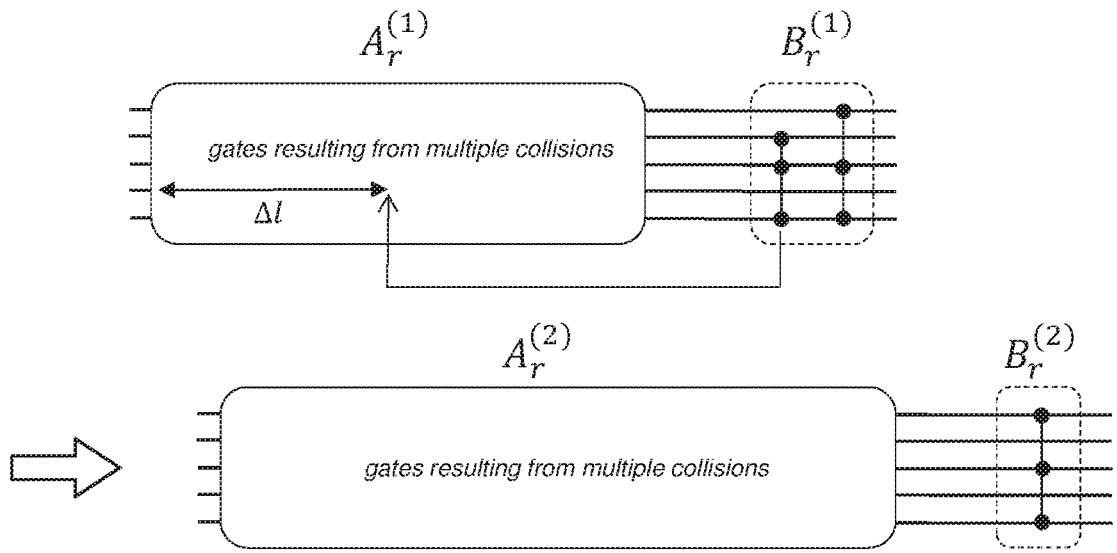
Figure 23C:
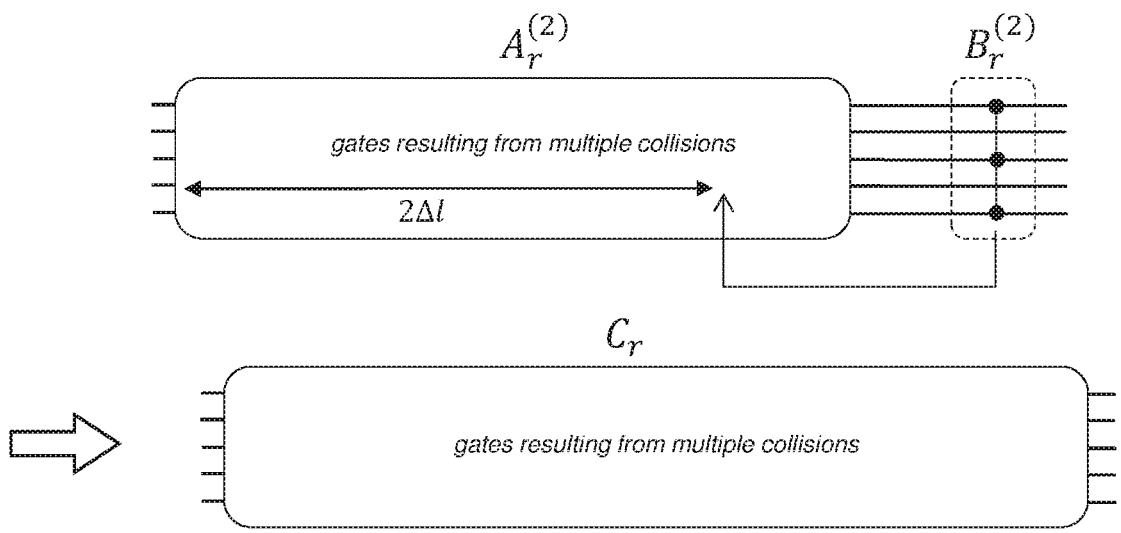

Here is explained in detail scheme (i) with reference to FIG. 23a through FIG. 23C. FIG. 23A through FIG. 23C are block diagrams that illustrate example distances of movement of encryption/decryption gates into function code, according to an embodiment of cheme (i.). The extension of this explanation to the other schemes is straightforward.

Following scheme (i), the system can be reorganized as $E_r \cdot (f_r \cdot E_1^{-1})$ with a n gates in $E_r$ and (a+b) n gates in $(f_r \cdot E_{r-1}^{-1})$. The obfuscation is done by amalgamation of $(f_r \cdot E_{r-1}^{-1})$, call it side $A_r$, and $E_r$, call it side $B_r$. The number of gates or length of $A_r$ is given by Equation 8a $$l(A_r) = (a+b)n. \quad (8a)$$

In this example, as illustrated in FIG. 23A, each gate in $B_r$, labeled $Gb_i$, for i=1, 2, . . . , an, is pushed into $A_r$, as follows. Take the gate in $B_r$ that is the closest to the interface between $A_r$ and $B_r$, which in the first step of the iteration is gate $Gb_1$, and push it into $A_r$, all the way to the beginning of the $A_r$ circuit (opposite side of $A_r$ from the interface, e.g., until the move affects the first gate in $A_r$). The result (after all of the collisions) is a circuit $A_r^{(1)}$ on one side and a circuit $B_r^{(1)}$, containing gates $Gb_2$, . . . , $Gb_{an}$, on the other. As gate $Gb_1$ is pushed into the far side of $A_r$, there are gate collisions that increase the size $l(A_r)$ of side $A_r$ to the size $l(A_r^{(1)})$ of $A_r^{(1)}$.

The length increase $l(A_r^{(1)}) - l(A_r)$ is estimated as follows. The collision free penetration depth, derived above, is $l_0 = n/9$, so there will be $$O\left(\frac{l(A_r)}{l_0}\right)$$

collisions. Each collision adds (δ−1) gates to the circuit, where δ=6 for one-bit collisions and δ=3 for two-bit collisions. (δ=0 for three bit collisions, since two colliding gates merge into a single gate.) One-bit collisions are the more probably ones, since $p_1$ is larger than $p_2$ by a factor of order n, as derived above, and $p_2$ is larger then $p_3$ by a factor of n as well. Hence, for large enough n, the length of side $A_r$ is incremented as given by Equation 8b.

$$l(A_r^{(1)}) - l(A_r) = \Delta l \equiv \left(\frac{l(A_r)}{l_0}\right)(\delta - 1) \quad (8b)$$

When K is preset to a value larger than the circuit length, $l(A_r)$, then the colliding gate is moved through the entire circuit, thus causing the total length of the circuit to increase to $l(A_r^{(1)})$. This is repeated for other gates until the total length $l(A_r^{(m)})$ becomes equal or larger than K for the m-th gate. Then, the remaining unmoved gates are only moved a fixed length K. With this procedure, it is certain that the length of the circuit does not increase exponentially with the size of the register N(=n).

After propagating $Gb_1$, one takes gate $Gb_2$ and pushes it into $A_r^{(1)}$, but not all the way to its end, like one did for $Gb_1$. Here one stops a distance $$K = \Delta l \equiv \left(\frac{l(A_r)}{l_0}\right)(\delta - 1)$$

from the end of $A_r^{(1)}$, as illustrated in FIG. 23B. In this way, gate $Gb_2$ is pushed into $A_r^{(1)}$ through the same number of gates in as gate $Gb_1$ was pushed through $A_r$ in the first step. The result is a circuit $A_r^{(2)}$ with length satisfying Equation 8c $$l(A_r^{(2)}) - l(A_r^{(1)}) = \Delta l \equiv \left(\frac{l(A_r)}{l_0}\right)(\delta - 1). \quad (8c)$$

The process iterates over all the gates in B. One pushes the gate $Gb_i$ into the circuit $A_r^{(i-1)}$, stopping a distance (i−1) $\Delta l$ from its end, obtaining a circuit $A_r^{(i)}$, with length satisfying Equation 8d.

$$l(A_r^{(i)}) - l(A_r^{(i-1)}) = \Delta l \equiv \left(\frac{l(A_r)}{l_0}\right)(\delta - 1). \quad (8d)$$

At the end of the procedure in step 313, one is done pushing all of the a n gates inside $B_r$ into side $A_r$, amalgamating the two circuits into a circuit $C_r$, as illustrated in FIG. 23C. The final length of the amalgamated circuit is obtained from the recursion of Equation 8d and results in Equation 8e.

$$(A_r^{(an)}) = l(A_r) + an \, \Delta l \quad (8e)$$

Since the list of gates in side $B_r$ have been emptied into the A side, or equivalently, $l(B_r^{(an)}) = 0$, the total length of the amalgamated circuit $C_r$ is given by Equation 8e. Substituting (a+b)n for the length of $A_r$ as defined above, and the definition of $\Delta l$ from Equation 8b or 8c or 8d, one obtains the length of the amalgamated circuit $C_r$ for the current segment as Equation 8f.

$$l(C_r) = (a+b)\{1 + 9a(\delta - 1)\}n \quad (8f)$$

Notice that, since the locations of the final stops of the collided Gb's are spaced $\Delta l=K$ apart from each other, the gates in $B_r$ are uniformly sprinkled along the amalgamated circuit C.

In loop 311 through 315 of FIG. 3, the above amalgamation is performed for all segments, r=1, . . . p. This notation extends to the first decryption and last encryption by noting that $E_0^{-1}=E^{-1}$ and $E_p=E'$. One can now compute the length of the complete obfuscated circuit equivalent to $E' \cdot f \cdot E^{-1}$. It is observed that each of the $(E_r \cdot f_r \cdot E_{r-1}^{-1})$ blocks produce an obfuscated circuit $C_r$ of length given by Equation 8f. Recall that f has $n_g$ gates and each $f_r$ is assumed to contain b n~$n_g$/p gates. There are thus $$O\left(\frac{n_g}{bn}\right)$$

blocks. So the length of the full obfuscated circuit l(obfuscate), is the length of $C_r$ given by Equation 8f times the factor $$\left(\frac{n_g}{bn}\right).$$

Because the encryption and decryption portions of the original circuit are of size an and the original function f is of size $n_g$, the full length of the original circuit is $2an+n_g$. An expansion factor Z by which the length of the circuit has been expanded is given by Equation 9a.

$$Z = \frac{l(\text{obfuscate})}{l(\text{orginal})} = \frac{\left(\frac{n_g}{bn}\right)(a+b)\{1 + 9a(\delta - 1)\}n}{(2an + n_g)} \quad (9a)$$

Assuming $n_g \gg 2an$ so this latter term can be neglected in the expression ($2an+n_g$) then the remaining term $n_g$ factors out. Thus Equation 9a reduces to Equation 9b.

$$Z = \frac{\left(\frac{n_g}{bn}\right)(a+b)\{1 + 9a(\delta - 1)\}n}{n_g} = \frac{(a+b)}{b}\{1 + 9a(\delta - 1)\} \quad (9b)$$

For representative values of a~3, b~1, and $\delta$~1~5, the expansion factor is z~544. Thus, in this example embodiment, amalgamation of $E' \cdot f \cdot E^{-1}$ into a single, indistinguishable set of 3-bit reversible gates, incurs an overhead factor of about 500. Although high, this overhead is far less than those of other homomorphic methodologies recently proposed. For many important applications, an overhead factor of 500 is reasonable and acceptable.

FUSION. In step 317, described above, multiple 3-bit gates are combined into at least one k-bit gate, k>3. After using the gate collision rules, one can further obfuscate the circuit by combining a plurality of 3-bit gates into each of one or more larger k-bit gates. The product of several 3-bit gates acting on an ensemble of k bit lines can be efficiently determined, yielding a permutation operation on the possible $2^k$ input states. However, the inverse problem, namely, factoring a permutation on $2^k$ inputs into a product of smaller permutations generated by 3-bit gates acting on a set of k-lines, is a hard problem. Herein, tan example process of multiplying 3-bit gates to form a k-bit gate whose internal components are hard to determine is called the process of "gate fusion."

The collection of multiple 3-bit gates to be fused together can be gathered in different ways. One example is that of accretion, which proceed as follows. One chooses a 3-bit gate somewhere in the circuit, starting (or seeding) a cluster of gates. Next, one takes this gate and searches for the first neighbor, to either its left or its right, that shares at least one bit with it. This second gate is added to the cluster. The number of bit lines used by the two gates in the cluster is at most 5, the initial 3 bit lines of the first gate and the at most 2 bit lines that are not used by the first gate but that are used by the second gate. The process of growing the cluster (accretion) continues by seeking a third gate to the left or right of the gates already in the cluster that share at least one bit with them. The cluster, with the addition of the third gate, now spans at most 7 bit lines. The process is repeated until the cluster spans k bit lines. An example of the fusion process is provided in FIG. 19.

Figure 19:
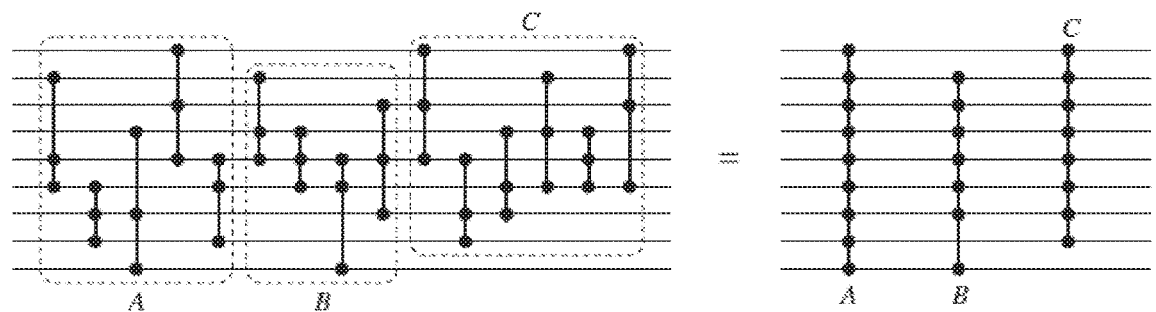
FIG. 19 is a block diagram that illustrates an example fusion of 3-bit gates into multiple gates of more bits to further obfuscate a program, according to an embodiment.

FIG. 19 is a block diagram that illustrates an example fusion of 3-bit gates into multiple gates of more bits to further obfuscate a program, according to an embodiment. FIG. 19 shows the fusion of fifteen adjacent 3-bit gates into three adjacent gates A, B, and C, where A is a 9-bit gate, and B and C are 8-bit gates. The minimum number of 3-bit gates in the k-bit gate cluster is $h_{min}=(k-1)/2$. The product of all elementary 3-bit gates in the cluster is a permutation P acting on the space of the $2^k$ states of k bits. This product can be calculated and stored as a list of $2^k$ numbers P(z), for z=0, . . . , $2^k-1$.

Reverting, or factoring, the permutation P into a product of elementary 3-bit permutations is a hard problem. Exhaustively searching for all possible combination of 3-bit gates that multiply to yield a k-bit permutation P requires at least a number S of steps given by Equation 10.

$$S = \frac{k!}{3}(8!)^{(k-1)/2} \frac{(k-1)!}{2^{k-1}[(k-1)/2]!} \quad (10)$$

when k is an odd number. For example, for k=11 bits, one can store the permutation P with a list of $2^{11}$ words with at most 11 bits each, e.g., using less than 5 kilobytes of memory. (It is note that fusing the 3-bit gates has the added advantage of passing to the server the preprocessed action of multiple gates, storing in memory the result of products of multiple 3-bit gates.) Factoring the permutation P, however, would require rather heavy computational effort. Exhaustive factorization of the permutation into the original 3-bit components would require order $10^{32}$ steps. For k=21 bits, one can store the permutation P using less than 7 megabytes of memory, and yet it would take as many as $10^{71}$ steps to exhaustively search for the elementary 3-bit gates that factorize P.

It is further noted that a k-bit gate or permutation on $2^k$ states can have different factorizations as product of 3-bit operations. Even if one finds a factorization, it does not mean that one made progress in reverting the obfuscation; if one finds a permutation other than precisely the one that was used in the above scheme, one is actually further obfuscating the computation.

Figure 20:
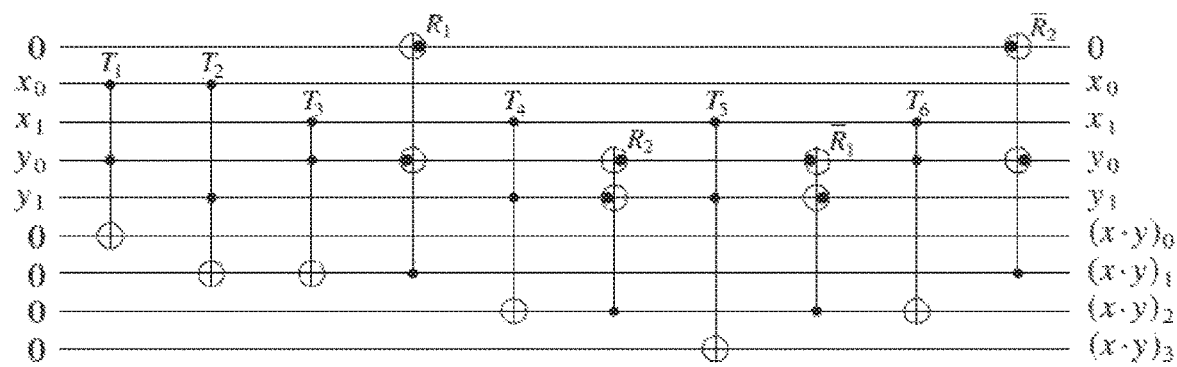
FIG. 20 is a block diagram that illustrates an example sequence of 3-bit gates for a 2-bit multiply function f, according to an embodiment.
Figure 20:
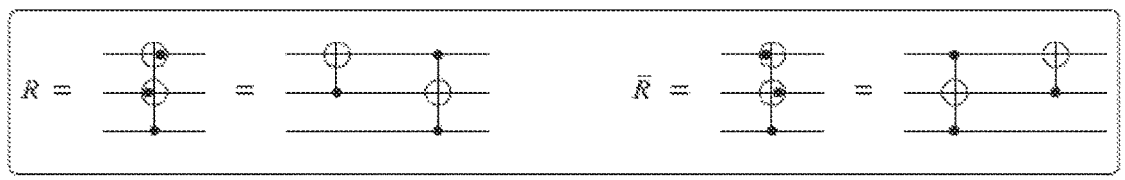

MULTIPLICATION EXAMPLE. Consider a function f that multiplies two numbers x and y, producing as a result x·y. The implementation of this function with reversible gates requires the use of ancilla bits. FIG. 20 is a block diagram that illustrates an example sequence of 3-bit gates for a 2-bit multiply function f, according to an embodiment. The 2-bit multiplication circuit is based on a controlled ripple adder that makes use of six Toffoli T and four R, $\bar{R}$ 3-bit reversible gates. The inset shows the decomposition of the R and R gates into CNOT and Toffoli gates. FIG. 20 employs five ancilla bits. When x and y are taken as input, the ancilla bits are set to zero and the circuit produces as output x, x·y, and one ancilla bit set to zero.

Figure 21:
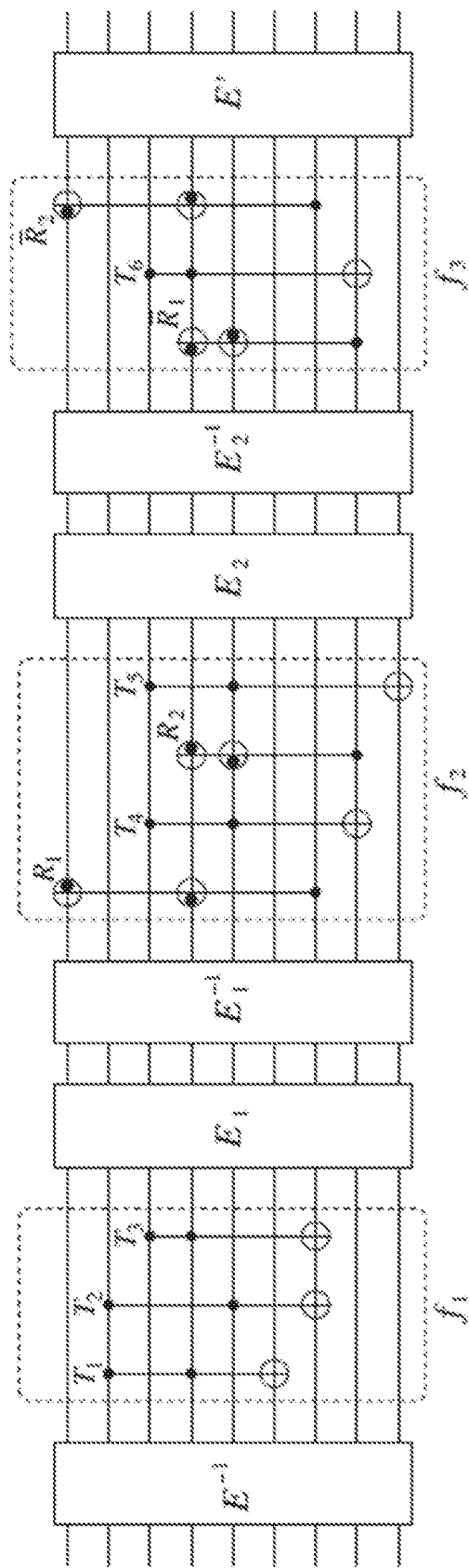
FIG. 21 is a block diagram that illustrates an example insertion of intermediate encryption and decryption blocks into the function f of FIG. 20, according to an embodiment.

For encrypting the data and the computation, encryption functions E and E' each containing about thirty 3-bit reversible gates. The function f is decomposed into three blocks of partial functions $f_1$, $f_2$, and $f_3$, each one a subset of the circuit defining f, and insert between each pair of consecutive partial functions an encryption and decryption block, namely, $E_1$ and $E_1^{-1}$ between $f_1$ and $f_2$ and $E_2$ and $E_2^{-1}$ between $f_2$ and $f_3$. FIG. 21 is a block diagram that illustrates an example insertion of intermediate encryption and decryption blocks into the function f of FIG. 20, according to an embodiment.

Figure 22:
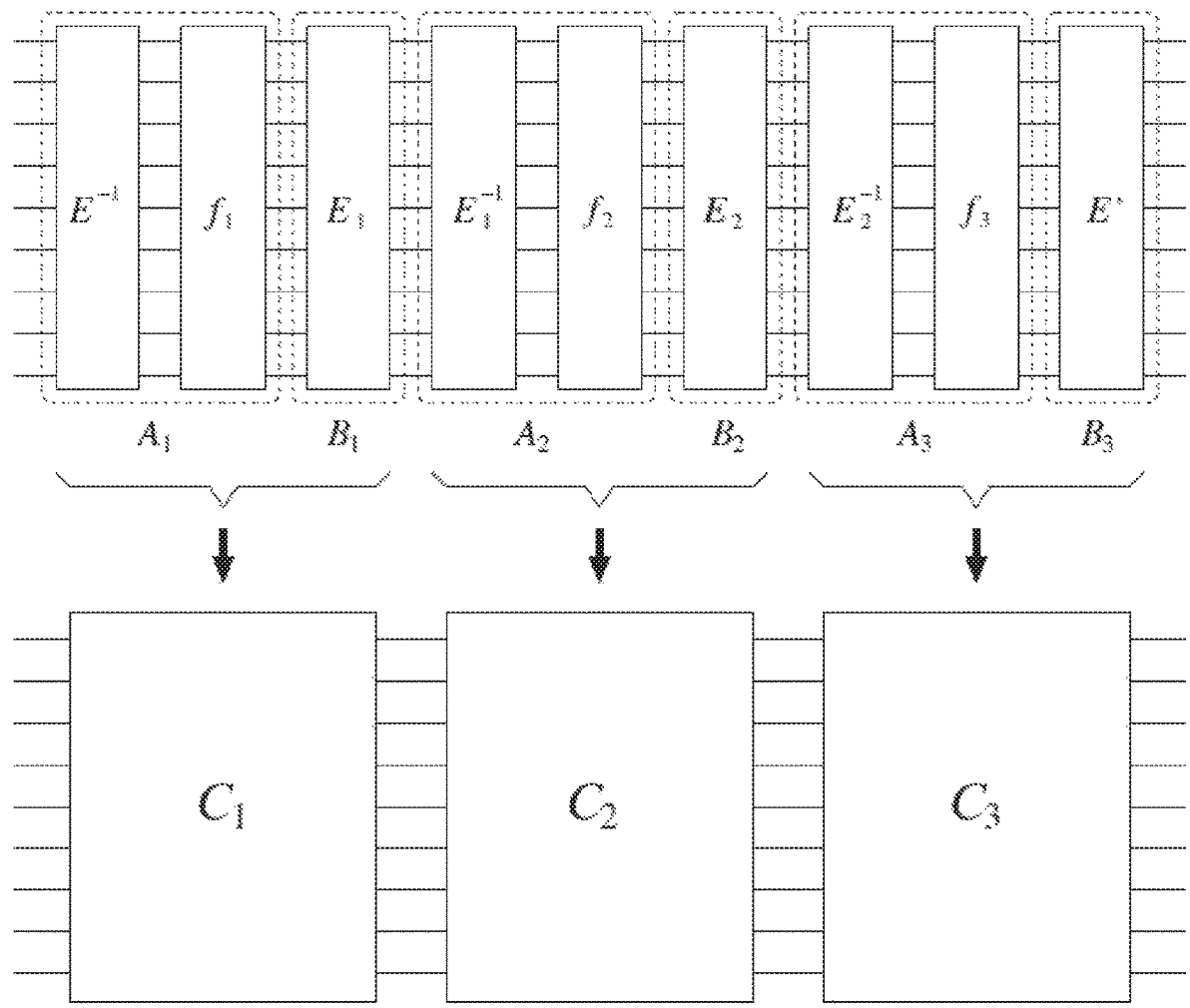
FIG. 22 is a block diagram that illustrates example steps for obfuscation of the 2-bit multiply function f with multiple intermediate encryption of FIG. 21, according to an embodiment.

One then proceeds to amalgamate the blocks. FIG. 22. The final step consists of fusing sets of neighboring 3-bit gates into k-bit gates, with k large enough to make reversing the collisions impracticable. FIG. 22 is a block diagram that illustrates example steps for obfuscation of the 2-bit multiply function f with multiple intermediate encryption of FIG. 21, according to an embodiment. One amalgamates the blocks $A_1=f_1 \cdot E^{-1}$ with $B_1=E_1$, generating the circuit $C_1$. Similarly, one amalgamates blocks $A_2=f_2 \cdot E_1^{-1}$ with $B_2=E_2$ and $A_3=f_3 \cdot E_2^{-1}$ with $B_3=E1$, generating circuits $C_2$ and $C_3$, respectively. Combining the circuits $C_3 \cdot C_2 \cdot C_1=P$, the obfuscated circuit, is produced.

2.2 Control Gates

In some embodiments, control gates, such as CNOT gates with q−1 control bits are used, where q∈{1,2,3, . . . }. As the term is used herein a control gate means a gate in which the value of a single target bit, also called a head bit, or simply the head of the gate, is a function of the values of zero or more control bits, also called tail bits, and collectively called the tail of the gate. The tail bits indicate the logic that is applied to the head bit based on the binary input to the control bits. The binary input to any tail bit is not changed, but is simply passed on to the next gate. Use of control q-bit gates offers the advantage of a simpler set of collision rules. Any expression that can be represented by a set of reversible 3-bit gates can be recast as a set of gates made up only of control gates. Thus in step 301 of the overall method 300 in FIG. 3, in some embodiments, each source/object code instruction is related in a table to one or more control gates. It is well known how most basic functions can be written in terms of control gates.

FIG. 24A through FIG. 24C are block diagrams that illustrate example control q-bit gates used instead of generic reversible 3-bit gates, according to an embodiment. The single target bit is indicated by a circle with a vertical cross inside. A control bit can be of the "true" type logic (solid fill circle) or "false" type logic (open circle). A false type logic signifies that the control is activated only if the value of the corresponding bit is 0. The simplest control gate is the NOT gate (see FIG. 24A), which acts on only one bit: $x_1 \rightarrow x_1'$, namely, it flips the state of the target bit. (Here, the apostrophe indicates negation of the bit value.) Notice that there is no control bit in the NOT gate. The CNOT is a control gate with one control bit and one target bit, as shown in FIG. 24B. For the "true" type logic, $x_1 \rightarrow x_1$ (the output is the same as the input, which is true for all tail bits) and $x_2 \rightarrow x_1 \oplus x_2$, while for the "false" type logic, $x1 \rightarrow x1$ as is the case for all tail bits, and $x_2 \rightarrow x_1' \oplus x_2$. The symbol $\oplus$ indicates the exclusive OR (XOR) operation. The expression $x_1 \oplus x_2$ is true when either $x_1$ or $x_2$, but not both, are true. The Toffoli gate has two control bits in the tail and one target bit in the head and it comes in four varieties depicted in FIG. 24C. For example, in one variety, when both control bits are of the "true" type logic, then $x_1 \rightarrow x_1$ and $x_2 \rightarrow x_2$, as is the case for all tail bits, and $x_3 \rightarrow x_3 \oplus x_1 \cdot x_2$, i.e., $x_3$ is XORed with the product of $x_1$ and $x_2$. If any control bit is of the false type logic, then the value at that bit is negated in the XOR and multiply operations. Note that reversible control gates use the XOR function to define the new head bit value. All other logic operations can be obtained by a combination of gates in a set of XOR control gates.

FIG. 24D is block diagram that illustrates an example 6-bit control gate, such as a gate resulting from fusion or gate collisions, according to an embodiment. In the illustrated example, the 6-bit control gate has five tail bits (three "true" and two "false"). The logic executed on the head bit is an XOR of the value input to the head bit with a product of the values arriving at the tail bits, negated as indicated by the open circles. Hereafter in this section 2.2, control-target type of gates will be called just gates, unless otherwise clear from the context. FIG. 25 is a block diagram that illustrates an example abbreviated schematic representation of a control gate used instead of generic 3-bit gates, according to an embodiment. FIG. 25 introduces a simplified graphic representation of a control gate, with all the control bits of the tail replaced by a box. Sometimes, one or more control bits are pulled out of the box and shown explicitly for the sake of differentiating gate collisions.

Each control gate g can be labeled by a list containing the head (controlled bit address) and a tail, which is a list of bit addresses with associated true or false logic, called beads hereinafter for simplicity. Each bead b corresponds to a pair (i(b),σ(b)) containing the control bit address i(b) and whether the control is negated (σ(b)=1 corresponding to an open circle) or not (σ(b)=0, corresponding to a filled circle). For example, [3, [(1, 0), (2, 0)]] is a Toffoli gate acting on bit 3 controlled by bits 1 and 2 without negation: $x_1 \rightarrow x_1$, $x_2 \rightarrow x_2$, and $x_3 \rightarrow x_3 \oplus x_1 \cdot x_2$. As another example, [2, [(1, 1)]] is a CNOT acting on bit 2 if bit 1 is false, so the value of bit 1 is negated: $x_1 \rightarrow x_1$, $x_2 \rightarrow x_2 \oplus x_1'$. A NOT gate on bit 1 is simply noted as a [1, [ ]], with an empty tail, i.e., no tail bits. Adopting h(g) and t(g) to denote the head and tail of gate g, with (again) (i(b),σ(b)) denoting the bit address and type of control of the bead bδt(g), respectively. One can write the logic function of the gate g on the controlled bit as Equation 11.

$$x_{h(g)} \rightarrow x_{h(g)} \oplus \Pi_{b \epsilon t(g)}(x_{i(b)} \oplus \sigma(b)) \quad (11)$$

COLLISIONS. FIG. 26 is a flow diagram that illustrates an example method 2600 for propagating a first control q-bit gate past a second control q-bit gate, such as used in a step of the method 300 of FIG. 3, according to an embodiment. Unlike previous rules for combining control gates when optimizing quantum circuits, these rules implemented in method 2600 do not require that all control bits be of the true type logic. The method starts with two adjacent gates Ga and Gb that are to be moved past each other, e.g., during step 311 or step 313, or both, of method 300 in FIG. 3.

Figure 27A:
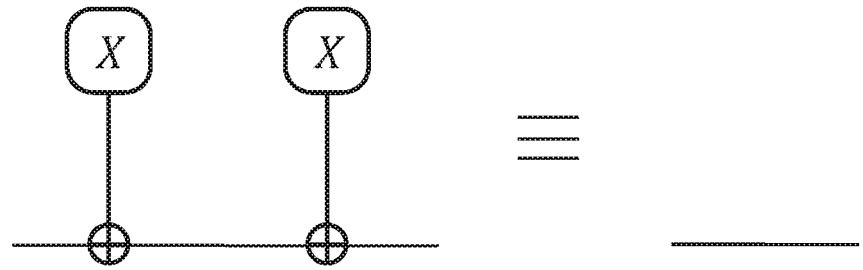
FIG. 27A through FIG. 27D are block diagrams that illustrate example collisions of control gates with shared target or control bits, according to an embodiment.
Figure 27B:
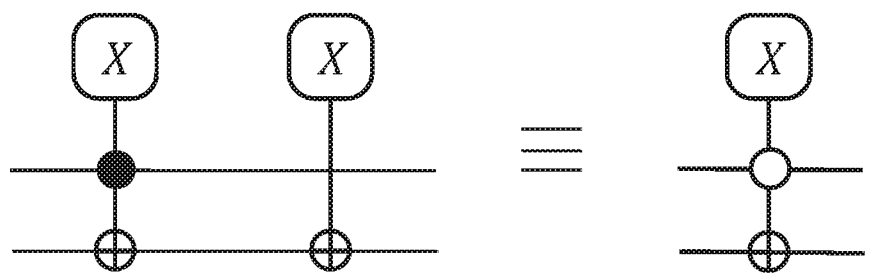
Figure 27C:
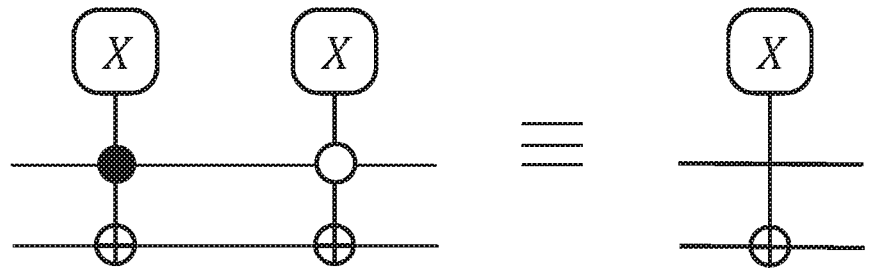
Figure 27D:
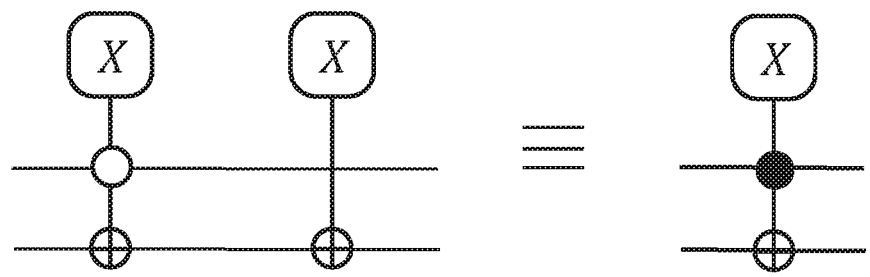
Figure 28A:
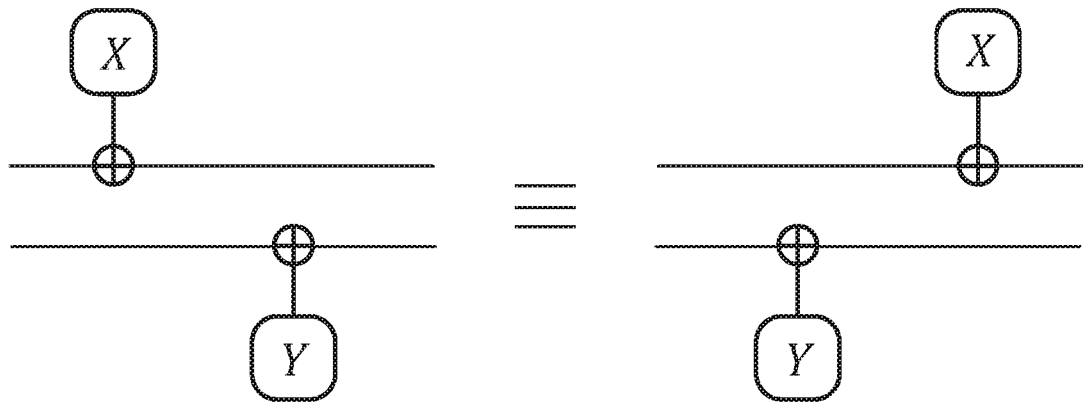
FIG. 28A and FIG. 28B are block diagrams that illustrate example collisions of control gates with different non-overlapping control bits, according to an embodiment.
Figure 28B:
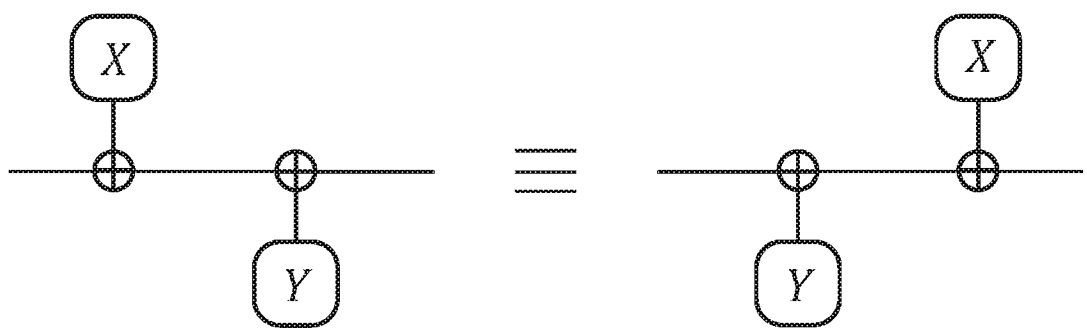

FIG. 27A through FIG. 27D are block diagrams that illustrate example collisions of control gates with shared target or control bits, according to an embodiment. FIG. 28A and FIG. 28B are block diagrams that illustrate example collisions of control gates with different non-overlapping control bits, according to an embodiment. FIG. 29A through FIG. 29D are block diagrams that illustrate example collisions of control gates where one bit in head of one gate overlaps one bit in tail of other gate, according to an embodiment. These types of collisions are called one-headed collisions FIG. 30A through FIG. 30D are block diagrams that illustrate example collisions of control gates where one bit in head of both gates overlaps one bit in tail of other gates, according to an embodiment. These types of collisions are called two-headed collisions. The X and Y in the figures represent the Boolean functions on the control bits of the two colliding gates Ga and Gb that do not take part in the collision; these are control bits that do not overlap with any controlled bit of the other gate. Recall that only the controlled bit can change its value.

In step 2601, it is determined whether the two gates Ga and Gb are identical, i.e., have the same tail acting on the same bits and the same target bit. This is illustrated in FIG. 27A. Note that both tails are labeled X, indicating that the tails are identical. This can happen as the result of debris gates produced by other collisions. Logically, this always results in the second gate undoing the action of the first gate; and, the net result of the combination is no action at all. Thus, if it is determined in step 2601 that the two gates are identical, then, in step 2603, both gates are removed from the circuit, as illustrated in FIG. 27A. This kind of collision that results in the reduction of the number of gate, such as the example in FIG. 27A, is called simplification. Control then passes to step 2651.

In some embodiments, step 2601 includes determining whether one or more other conditions for simplification occur, such as for adjacent gates with the same head bit and tail bits that are identical except for one tail bit. Such circumstances are illustrated in FIG. 27B, FIG. 27C and FIG. 27D. FIG. 27B and FIG. 27D show that the first gate Ga is identical to the second gate Gb except that the first gate Ga has an additional tail bit of either the true logic type (FIG. 27B) or the false logic type (FIG. 27D). In either case the collision (simplification) rule is that the two gates Ga and Gb are replaced by a single simplified gate Gs that has the same head bit and the same common tail bits (X), but the extra bit in the first gate Ga is included in the tail of Gs as the opposite logic type. FIG. 27C shows the two gates Ga and Gb are the same except for the logic type in one tail bit. In this circumstance, the collision (simplification) rule is that the two gates Ga and Gb are replaced by a single simplified gate Gs that has the same head bit and the same common tail bits (X), but no other tail bit. The tail bit with the conflicting logic type in the original two gates is removed from the tail of the simplified gate Gs.

In step 2651, it is determined whether the resulting gates have penetrated through the list of instruction far enough, e.g., J or K gates into an adjoining section for all gates to be moved, as described in more detail below. If not, then the next first gate Ga and second gate Gb are selected and control passes back to step 2601. If instead there has been sufficient penetration by enough gates, then control passes to step 2653, which, in some embodiments, sweeps through the resulting sequence of gates (aka, list of instructions or "circuit") for other simplifications. Then the process ends, and control passes back to step 313 or 315 in method 300 of FIG. 3.

Figure 29A:
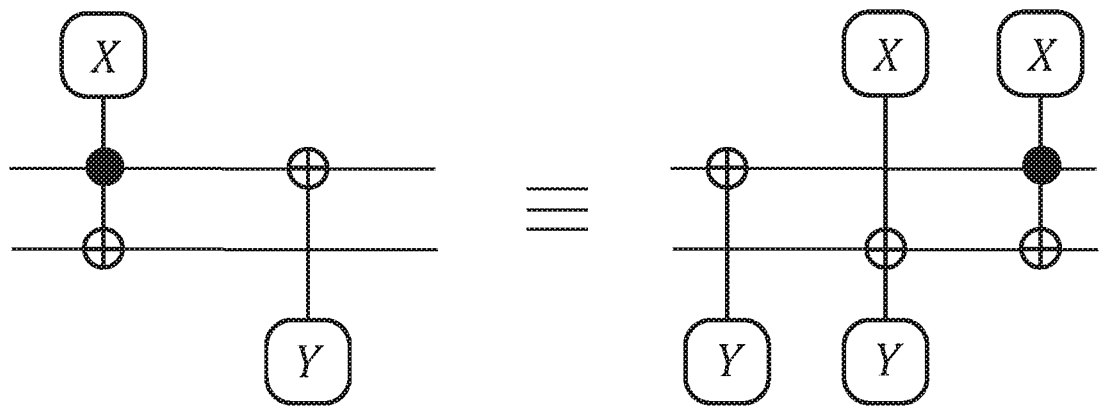
FIG. 29A through FIG. 29D are block diagrams that illustrate example collisions of control gates where one bit in head of one gate overlaps one bit in tail of other gate, according to an embodiment.
Figure 29B:
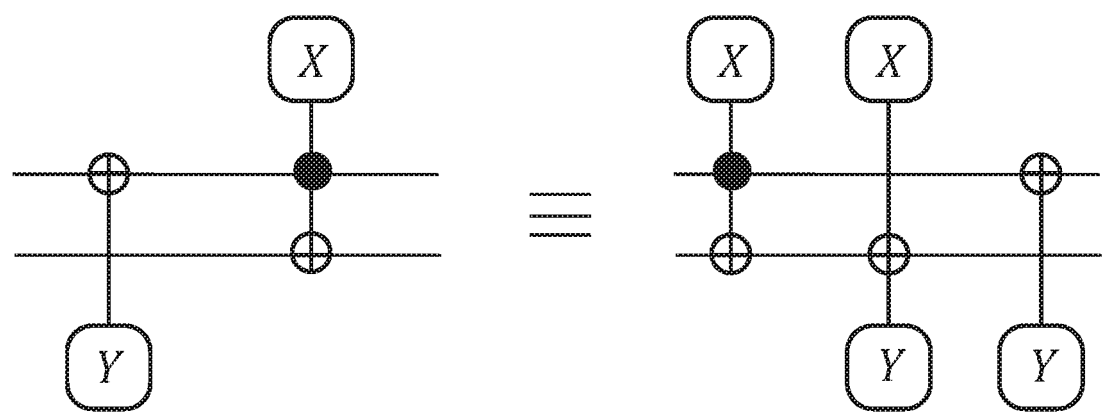
Figure 29C:
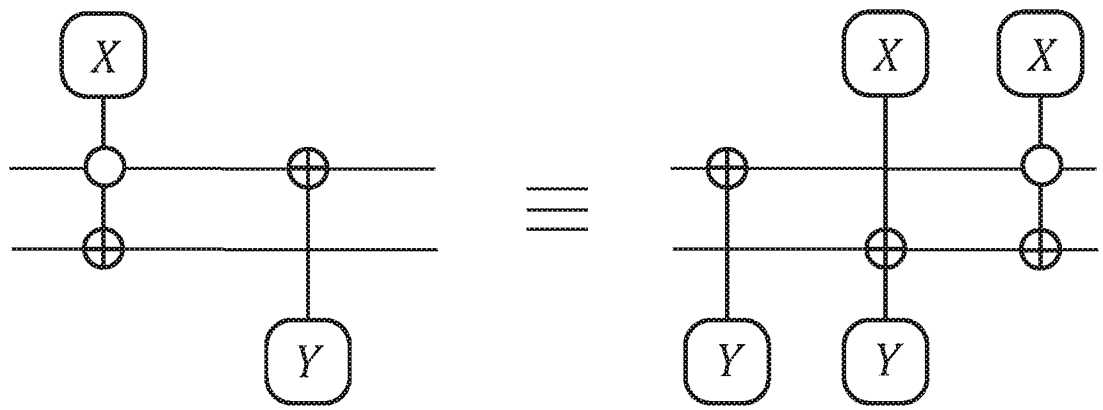
Figure 29D:
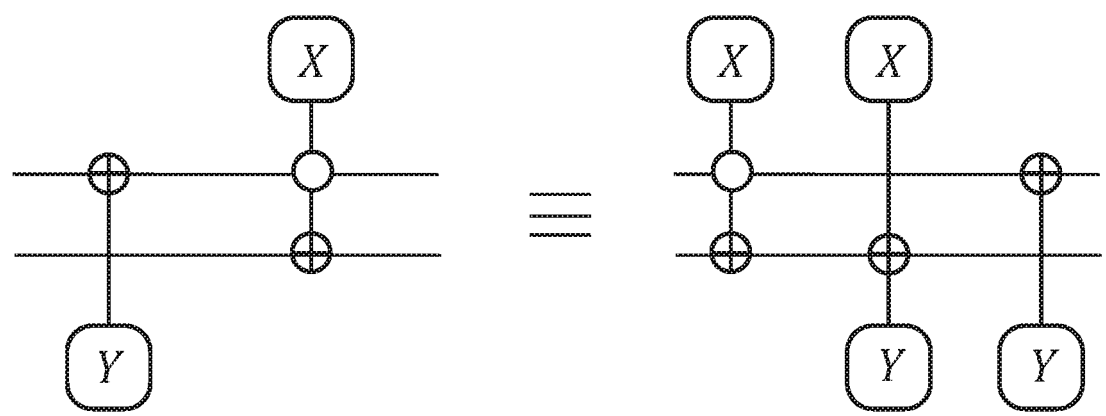

If it is determined in step 2601 that the two gates g1 and g2 (e.g., Ga and Gb) are not identical, then control passes to step 2611. In step 2611, it is determined whether there is any control bit of the second gate Gb that is shared with a target bit of the first gate Ga. Such a circumstance is depicted in FIG. 29B and FIG. 29D, representing at least a one-headed collision on a tail, and in FIG. 30A, FIG. 30B, FIG. 30C and FIG. 30, representing a two headed collisions on tails. If so, then, in step 2613, it is next determined whether there is any control bit in the first gate Ga that is shared with a target bit of the second gate. If not, as in FIG. 29B and FIG. 29 D, then there is only a one-headed collision on a tail and control passes to step 2621.

In step 2621, the gates are collided using rules for a one-headed collision on a tail with a head on the first gate. This produces one debris gate Gc as depicted in FIG. 29B for a true type logic (solid circle) in the colliding tail bit or as depicted in FIG. 29D for a false type logic in the colliding tail bit. In either case, the collision rules shows that the debris gate Gc has a combined tail excluding the colliding bit and a head of the second gate Gb for logic expressed by Equation 11. In step 2641, the original two gates Ga and Gb are replaced (substituted) with the three gates in the order of Gb, Gc, Ga. Control then passes to step 2651 and following, described above; and, results in the three-gate order of Gb, Gc, Ga.

Figure 30A:
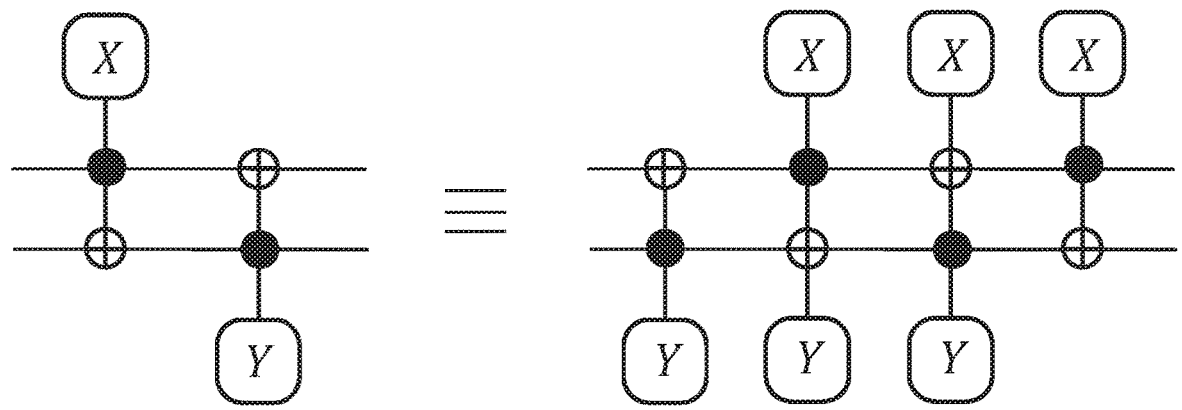
FIG. 30A through FIG. 30D are block diagrams that illustrate example collisions of control gates where one bit in head of both gates overlaps one bit in tail of other gates, according to an embodiment.
Figure 30B:
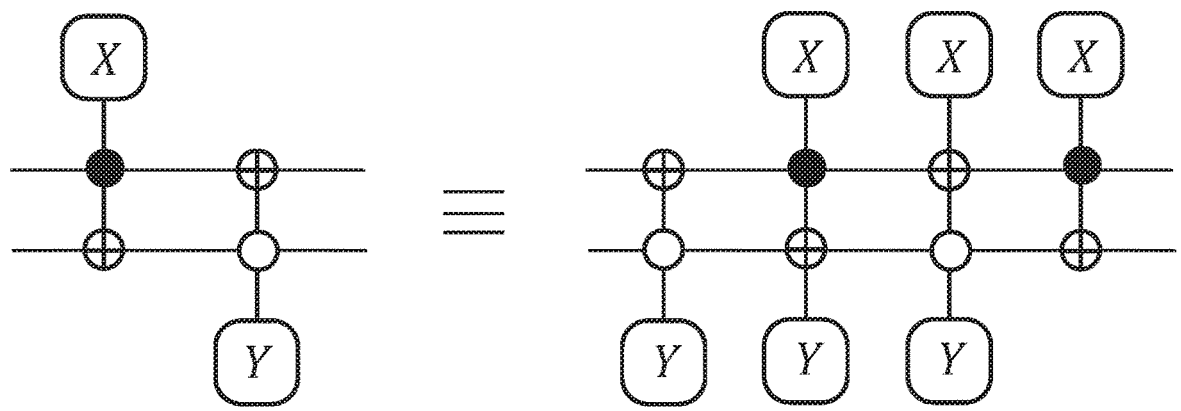
Figure 30C:
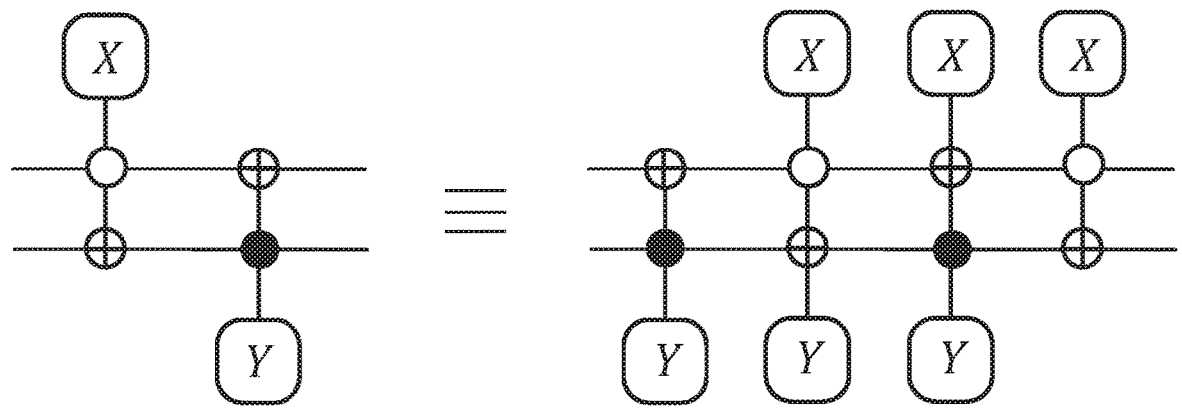
Figure 30D:
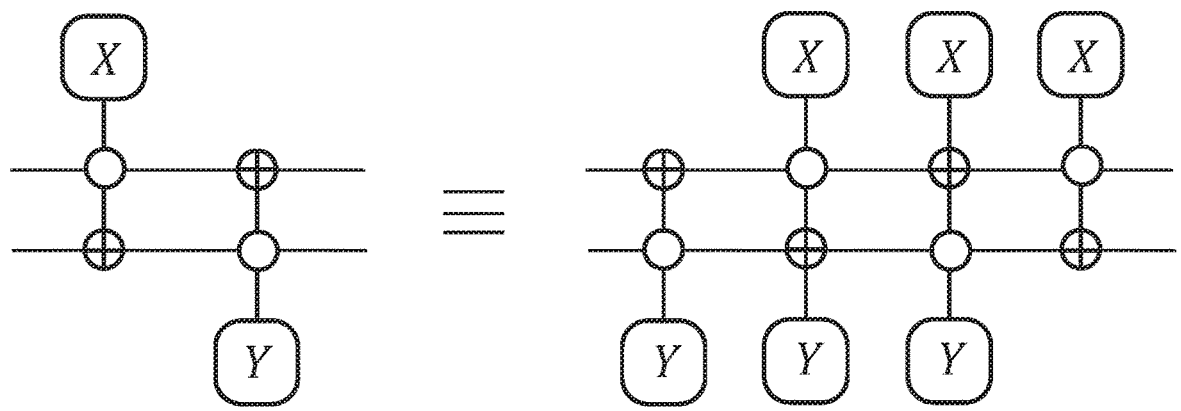

If it is determined in step 2613 that there is any control bit in the first gate Ga that is shared with a target bit of the second gate Gb, then there is a two-headed collision on tails. Such two-headed examples include FIG. 30A, FIG. 30B, FIG. 30C and FIG. 30D. Control passes to step 2615, where the gates are collided using rules for a two-headed collision. This produces two debris gates Gc and Gd as depicted in FIG. 30A for true type logic (solid circle) in both colliding tail bits; or as depicted in FIG. 30B for a true type logic and a false type logic in the colliding tail bits; or as depicted in FIG. 30C for a false type logic and a true type logic in the colliding tail bits; as depicted in FIG. 30D for false type logic (open circle) in both colliding tail bits. In any case, the collision rules shows for control gate logic expressed by Equation 11, that 1) the debris gate Gc has the head bit of the first gate Ga and tail bits combining the tail of the first gate Ga and the non-colliding tail bits of the second gate Gb; and 2) the debris gate Gd has the head bit of the second gate Gb and tail bits combining the tail of the second gate Gb and the non-colliding tail bits of the first gate Ga.

In step 2617, the original two gates Ga and Gb are replaced (substituted) with the four gates in the order of Gb, Gc, Gd, Ga. Control then passes to step 2651 and following, described above.

If it is determined, in step 2611, there is not any control bit of the second gate Gb that is shared with a target bit of the first gate Ga, then control passes to step 2631. Such a circumstance is depicted in FIG. 28A, FIG. 28B, representing no head collision with tail, and in FIG. 29A and FIG. 29C, representing at most a one-headed collision with tail. If so, then, control passes to step 2631.

In step 2631, it is determined whether any control bit of the first gate Ga is shared with a target bit of the second gate Gb. If not, then there is no collision of heads with tails; the gates commute; and control passes to step 2633. This circumstance is depicted in FIGS. 28A and 28B. In step 2633 the first gate is moved past the second gate because the two gates commute. Control then passes to step 2651 and following, described above.

If it is determined in step 2631 that any control bit of the first gate Ga is shared with a target bit of the second gate Gb, then control passes to step 2635. In this circumstance, there is a one-headed collision of the second gate Gb with the tail of the first gate Ga, as depicted In FIG. 29A and FIG. 29C. In step 2635 the gates are collided using rules for a one-headed collision on a tail with a head on the second gate Gb. This produces one debris gate Gc as depicted in FIG. 29A for a true type logic (solid circle) in the colliding tail bit or as depicted in FIG. 29C for a false type logic in the colliding tail bit. In either case, the collision rules shows that the debris gate Gc has a combined tail excluding the colliding bit and a head of the first gate Ga for logic expressed by Equation 11.

In step 2641, the original two gates Ga and Gb are replaced (substituted) with the three gates in the order of Gb, Gc, Ga. Control then passes to step 2651 and following, described above; and, results in the three-gate order of Gb, Gc, Ga.

The collision rules described above can be expressed mathematically as follows. Define $t_X$ and $t_Y$ as the set of tail beads making up the Boolean functions X and Y that do not take part in the collision of gates Ga and Gb. They can be expressed by Equation 12a and 12b.

$$X = \Pi_{b \in t_X}(x_{i(b)} \oplus \sigma(b)) \quad (12a)$$

$$Y = \Pi_{b \in t_Y}(x_{i(b)} \oplus \sigma(b)) \quad (12b)$$

The product can be written as Equation 13.

$$XY = \Pi_{b \in t_X \cup t_Y}(x_{i(b)} \oplus \sigma(b)) \quad (13)$$

but this expression can be simplified if it contains contradictions, i.e., if there are beads $b_1$, $b_2 \in t_X \cup t_Y$ such that $i(b_1) = i(b_2)$ (same bit line) but $\sigma(b_1) \neq \sigma(b_2)$ (opposite negation). In this case, there is a contradiction of the type x'x, which is always 0 (False). So, one can rewrite XY as in Equation 14.

$$XY = \begin{cases} \prod_{b \in t_X \cup t_Y}(x_{i(b)} \oplus \sigma(b)) & \text{without contraditions} \\ 0 & \text{with contradition} \end{cases} \quad (13)$$

By checking for cases where contradictions occur, one can remove the gates with XY in the tail when constructing the collisions, because in these cases debris gates disappear.

Another simplification is when one can combine two gates into one. Consider two gates with h(Ga)=h(Gb) (same bit line for the head) and tails t(Ga) and t(Gb). Let t(Ga, Gb)≡t(Ga)∩t(Gb) represent the intersection of the two tails; and, let t̲(Ga, Gb)≡(t(Ga)∪t(Gb))\(t(Ga)∩t(Gb)) represent the remaining bits outside the intersection of the two tails. The following simplifications are possible.

If |t̲(Ga, Gb)|=0 the two gates have all the same beads, and hence they multiply to the identity (all controlled gates with the same control lines are involutions or self-inverse). In this case, the two gates can be removed from the circuit. This simplification is depicted in FIG. 27A and implemented in steps 2601 and 2603.

If |t̲(Ga, Gb)|=1 the two gates have all the same beads but one. So there is one bead b*∈t̲(Ga, Gb) that appears in one gate and not in the other. The two gates can be combined into one, using Equation 15 through Equation 17.

$$x_{h(g)} \to x_{h(g)} \oplus \prod_{b \in t(Ga)}(x_{i(b)} \oplus \sigma(b)) \oplus \prod_{b \in t(Gb)}(x_{i(b)} \oplus \sigma(b)) \quad (15)$$

$$= x_{h(g)} \oplus \prod_{b \in t(Ga,Gb)}(x_{i(b)} \oplus \sigma(b))[1 \oplus x_{i(b*)} \oplus \sigma(b*)] \quad (16)$$

$$= x_{h(g)} \oplus \prod_{b \in t(Ga,Gb)}(x_{i(b)} \oplus \sigma(b))[x_{i(b*)} \oplus \sigma'(b*)] \quad (17)$$

In other words, the tail of the combined gate contains the common beads plus a bead b\$=(i(b*), σ'(b*)) with the same bit address but negated a of the bead b*. This simplification is depicted in FIG. 27B and FIG. 27D and implemented in step 2653, and, in some embodiments, in steps 2601 and 2603.

If |t̲(Ga, Gb)|=2 and the two beads $b_1$, $b_2 \in t̲(g1, g2)$ are in different gates and such that $i(b_1)=i(b_2)$, then the two gates can be combined. Notice that since the difference set contains two beads, if these beads act on the same bit line they must have $\sigma(b_1) \neq \sigma(b_2)$ (otherwise they would be the same bead and not be in the difference set). The two gates can be combined into one, using Equation 18 through Equation 20.

$$x_{h(g)} \to x_{h(g)} \oplus \prod_{b \in t(Ga)}(x_{i(b)} \oplus \sigma(b)) \oplus \prod_{b \in t(Gb)}(x_{i(b)} \oplus \sigma(b)) \quad (18)$$

$$= x_{h(g)} \oplus \prod_{b \in t(Ga,Gb)}(x_{i(b)} \oplus \sigma(b))[x_{i(b1)} \oplus \sigma(b_1) \oplus x_{i(b2)} \oplus \sigma(b_2)] \quad (19)$$

$$= x_{h(g)} \oplus \prod_{b \in t(Ga,Gb)}(x_{i(b)} \oplus \sigma(b)) \quad (20)$$

where it is noted that since $i(b_1)=i(b_2)$, and $\sigma(b_1) \neq \sigma(b_2)$, then $x_{1(b1)} \oplus x_{1(b2)} = 0$ and $\sigma(b_1) \oplus \sigma(b_1) = 1$. So the two gates can be combined into a single gate by removing the two beads $b_1$ and $b_2$. The single gate has a shorter tail t(Ga, Gb). This simplification is depicted in FIG. 27C.

Some collisions generate debris gates, including debris gates with longer tails. Of course, debris gates of size>3 can be recast as several control q-bit gates with size 3 bits or less. Consider a collision of two gates, one with $q_1$ and another with $q_2$ bits. When the two gates do not commute, their collision would leave behind debris. One can find the upper bound to the number of bits of the gate(s) making up the debris.

First consider the case when the head or target of one gate (Ga) hits a control of another (Gb), but not the other way around. In this case, the debris would have, obviously, the head of Ga (1 bit), plus the gates in the Boolean function XY, which excludes the control bit of Gb that was hit by the head of Ga. The maximum number of bits in XY is $q_1-1+q_2-2$. Hence the maximum number of bits in the debris is $q_{max}=q_1+q_2-2$. This is a one head collision on a tail and is depicted in FIG. 29A through FIG. 29D for various q-bit control gates.

When the collision is of the kind that the head of one gate hits a control of the other and vice versa, the number of bits in the debris is the sum of the number of bits in the Boolean function XY, which is $q_1-2+q_2-2$ (we subtracted the two bits involved in the collision from each gate), plus the two common bits. One thus obtains again $q_{max}=q_1+q_2-2$.

Note that, if a circuit only has 1- and 2-bit gates ($q_1$, $q_2 \leq 2$), then the debris will have at most $q_1+q_2-2 \leq 2$-bit gates.

So, collisions do not generate larger gates (although the number of gates can change). However, the moment one has more than one 3-bit gate, collisions can lead to 4-bit gates, and so on.

Using the above collision rules, one can obfuscate a set of instructions that have been converted to a list of q-bit control gates. Consider circuits made of three pieces, a LEFT or L part, a MIDDLE or M part, and a RIGHT or R part. For specific applications, such as homomorphic encryption, there is a natural way to partition the circuit in those three pieces: $L=E^{-1}$, the circuit that decrypts the binary string; M=f the circuit implementing the function one wants to apply; and R=E, the circuit re-encrypting the state (if one uses the same key). Another example is that where one wants to replace one encryption circuit with another, e.g., to change keys, in which case a natural choice is $L=E^{-1}$, M=∅ (no middle circuit, or an empty set of gates), and R=E', the new encryption scheme. Finally, for a given circuit that has no a priori structure like those in the two examples above, one can simple choose to partition the circuit with two cuts, and define the three resulting pieces as L,M, and R.

An example procedure to obfuscate a circuit is described relying on the control q-bit gate collision rules described above. In what follows, one can think of L, M, and R as lists of gates, and square brackets [ ] are used as the delimiters of a list (as in the Python programming language). 1. Take out the rightmost gate of L (call it gL), and define L' to be the list L without this gate; similarly, take out the leftmost gate of R (call it gR), and define R' to be the list R without this gate. 2. Choose randomly (with 50%/50% probability) whether to (i) push gL from the left to the right into M+[gR], or (ii) push gR from the right to the left into [gL]+M. Suppose in what follows that the choice selected is to push from the right to the left (the other case is analogous). 3. Initialize the lists sideA=[gL]+M and sideB=[gR]. 4. While the list sideA is not empty and the size of list sideB plus that of sideA is less than a prescribed size K in length (e.g., K gates), do as follows: Pop out the rightmost gate of sideA and the leftmost gate of sideB; collide them and, unless they annihilate, place the debris in the list sideB (appending the debris to its left). Repeat this step until one of the two conditions of the while-loop is violated. 5. Assemble M'=sideA+sideB, the new MIDDLE part of the circuit. 6. Repeat the above steps for the updated triplet L'→L,M'→M, R'→R as long as both L and R are not empty; if they are, return the circuit $C_{obf}$=L+M+R.

Use the obfuscated circuit $C_{obf}$ to generate obfuscated source or object code 250. This obfuscation procedure can be implemented using the pseudocode of algorithm 1 to obfuscate along with its subroutines algorithm 2 to push right and algorithm 3 to push left.

---

Algorithm 1 obfuscate

Input: L, M and R.
Output: $C_{obf}$
1:   while len(L) > 0 and 1en(R) > 0 do
2:       Pop out the rightmost gate of L (gate $g_L$) to get L'; pop the leftmost gate of R (gate $g_R$) to get R'
3:       Choose direction to be right or left with probability 1/2
4:       if direction equals right then
5:           set sideA = ($g_L$) + M and sideB = ($g_R$)
6:           M' = push right ( side A, side B )
7:       else
8:           set sideA = ($g_L$) and sideB = M + ($g_R$)
9:           M' = push_left ( side A, side B )
10:      end if
11:      L' → L, M' → M, R' → R

---

Algorithm 1 obfuscate -continued

12:  end while
13:  Return $C_{obf}$ = L + M + R
14:  Return M' = sideA + sideB

---

Algorithm 2 push_right

Input: sideA and sideB.
Output: M'
1:   while len(sideA) > 0 and 0 < len(sideA) + len(sideB) < k do
2:       Pop out the rightmost gate of sideA (gate $g_1$) and leftmost gate of sideB (gate $g_2$)
3:       Collide $g_1$ and $g_2$ and place the debris in gatelist
4:       if the debris list gatelist is not empty then
5:           append gatelist to (the left of) sideB
6:       else
7:           escape while loop
8:       end if
9:   end while
10:  Return M' = sideA + sideB

---

Algorithm 3 push_left

Input: sideA and sideB.
Output: M'
1:   while len(sideB) > 0 and o < len(sideA) + len(sideB) < k do
2:       Pop out the rightmost gate of sideA (gate $g_1$) and leftmost gate of sideB (gate $g_2$)
3:       Collide $g_1$ and $g_2$ and place the debris in gatelist
4:       if the debris list gatelist is not empty then
5:           append gatelist to (the right of) sideA
6:       else
7:           escape while loop
8:       end if
9:   and while
10:  Return M' = sideA + sideB

---

Figure 31:
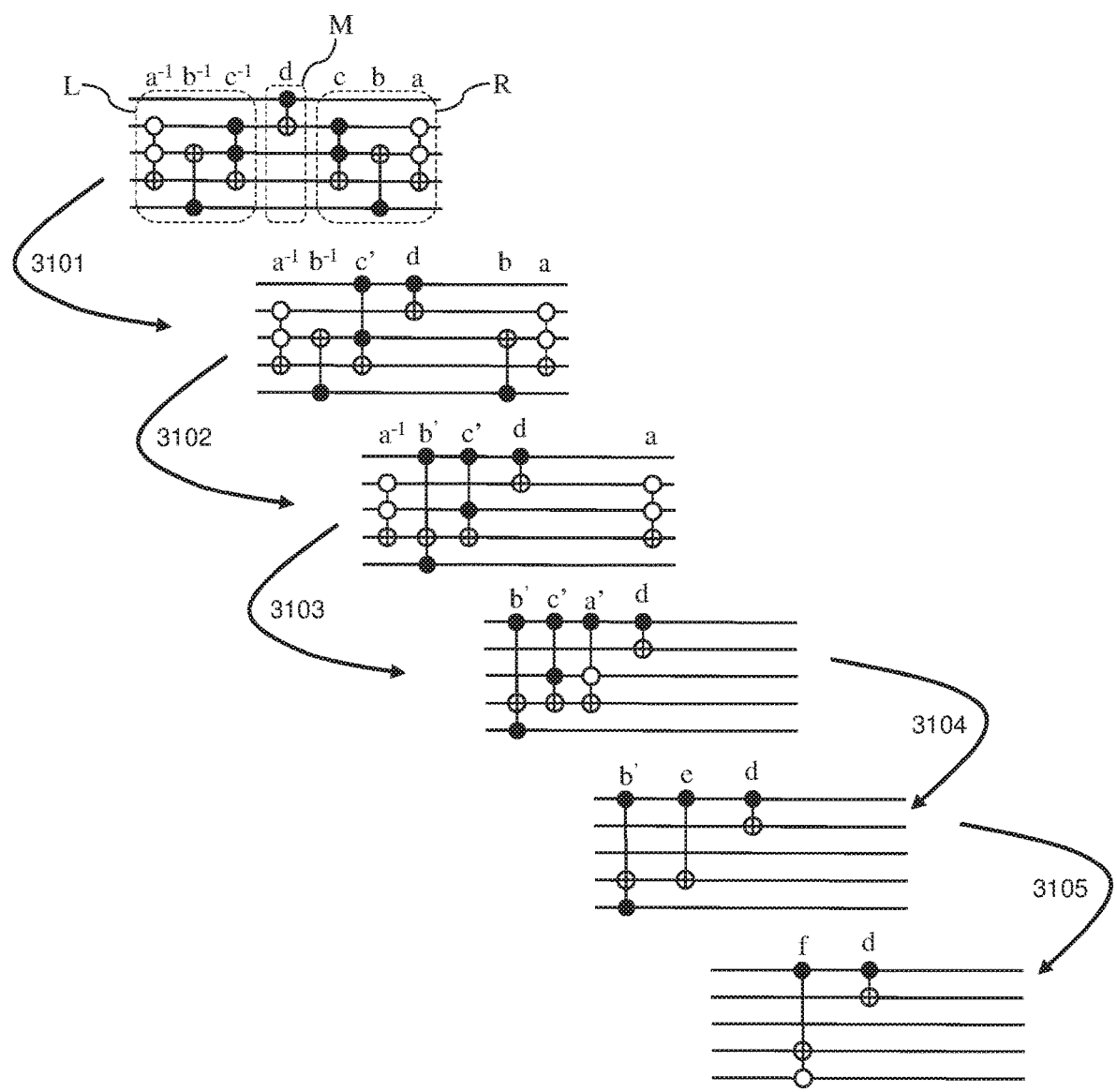
FIG. 31 is a block diagram that illustrates an example set of steps to produce an obfuscated program for a simple function, according to an embodiment.

FIG. 31 is a block diagram that illustrates an example set of steps to produce an obfuscated program for a simple function, according to an embodiment. In this example circuit, L and R are composed of three gates each, and M of one gate only. The word size is 5 bits (n=N=5). This simple example can be thought of a case where $L=E^{-1}$ is the decryption circuit, and R=E is the encryption circuit, and the function f corresponds to the single gate in M (a CNOT in this case). Note that the encryption circuit and decryption circuits are reverse images of each other.

In a first step (3101 of FIG. 31), Gate "c" collides with gate "d" (one-head collision, see FIG. 29B), moving to the left of gate "d" and leaving behind debris gate "c'". Gate "c'" collides with gate "c-1", cancelling both out, see FIG. 27A. In a second step (3102), Gate "b-1" collides with gate "c'" (one-headed collision, see FIG. 29B), moving to the right of gate "c" and leaving behind debris gate "b'". Gate "b-1" goes by gate "d" leaving no debris (see FIG. 28A), moving to the right of gate "d". Gate "b-1" collides with gate "b", cancelling both out, see FIG. 27A. In a third step (3103), Gate "a" goes by gate "b'" leaving no debris (FIG. 28A), moving to the right of gate "b'". Similarly, gate "a" goes by gate "c'" leaving no debris (FIG. 28A), moving to the right of gate "c'". Gate "a" collides with gate "d" (one-headed collision, see FIG. 29D), moving to the left of gate "d" and leaving behind debris gate "a'". In a fourth step (3104), Adjacent gates "c'" and "a'" simplify into a single gate "e" (see FIG. 27C). In a fifth step (3105), Adjacent gates "b'" and "e" simplify into a single gate "1" (see FIG. 27B).

In some embodiments, as mentioned for the generic reversible 3-bit gates, the obfuscated code that operates on encrypted data is part of an overall program that does not need to be obfuscated. In some of these embodiments, the obfuscated code is embedded among instructions that are not obfuscated.

3. Computational Hardware Overview

Figure 32:
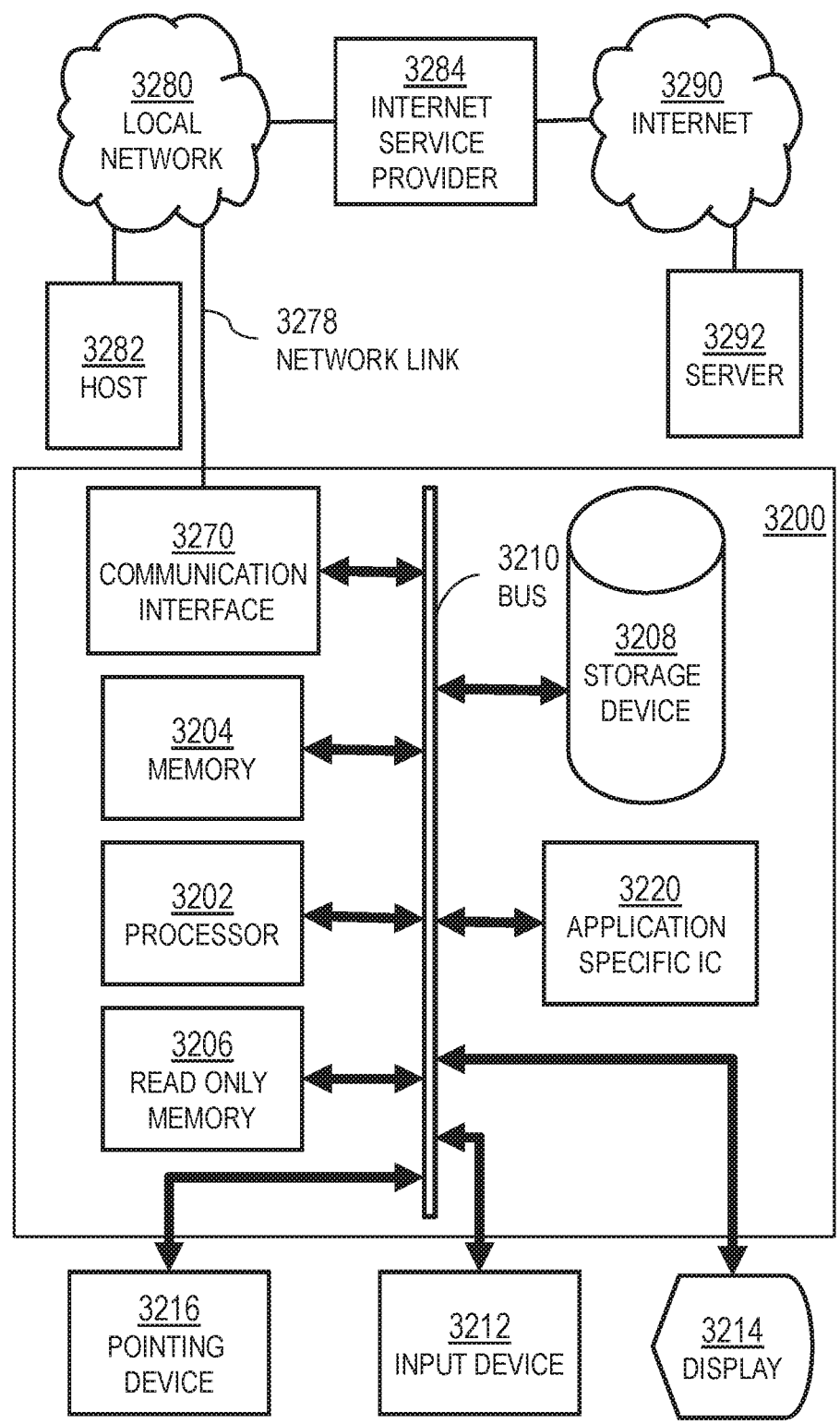
FIG. 32 is a block diagram that illustrates an example computer system upon which an embodiment of the invention may be implemented.

FIG. 32 is a block diagram that illustrates a computer system 3200 upon which an embodiment of the invention may be implemented. Computer system 3200 includes a communication mechanism such as a bus 3210 for passing information between other internal and external components of the computer system 3200. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 3200, or a portion thereof, constitutes a means for performing one or more steps of one or more methods described herein.

A sequence of binary digits constitutes digital data that is used to represent a number or code for a character. A bus 3210 includes many parallel conductors of information so that information is transferred quickly among devices coupled to the bus 3210. One or more processors 3202 for processing information are coupled with the bus 3210. A processor 3202 performs a set of operations on information. The set of operations include bringing information in from the bus 3210 and placing information on the bus 3210. The set of operations also typically include comparing two or more units of information, shifting positions of units of information, and combining two or more units of information, such as by addition or multiplication. A sequence of operations to be executed by the processor 3202 constitutes computer instructions.

Computer system 3200 also includes a memory 3204 coupled to bus 3210. The memory 3204, such as a random access memory (RAM) or other dynamic storage device, stores information including computer instructions. Dynamic memory allows information stored therein to be changed by the computer system 3200. RAM allows a unit of information stored at a location called a memory address to be stored and retrieved independently of information at neighboring addresses. The memory 3204 is also used by the processor 3202 to store temporary values during execution of computer instructions. The computer system 3200 also includes a read only memory (ROM) 3206 or other static storage device coupled to the bus 3210 for storing static information, including instructions, that is not changed by the computer system 3200. Also coupled to bus 3210 is a non-volatile (persistent) storage device 3208, such as a magnetic disk or optical disk, for storing information, including instructions, that persists even when the computer system 3200 is turned off or otherwise loses power.

Information, including instructions, is provided to the bus 3210 for use by the processor from an external input device 3212, such as a keyboard containing alphanumeric keys operated by a human user, or a sensor. A sensor detects conditions in its vicinity and transforms those detections into signals compatible with the signals used to represent information in computer system 3200. Other external devices coupled to bus 3210, used primarily for interacting with humans, include a display device 3214, such as a cathode ray tube (CRT) or a liquid crystal display (LCD), for presenting images, and a pointing device 3216, such as a mouse or a trackball or cursor direction keys, for controlling a position of a small cursor image presented on the display 3214 and issuing commands associated with graphical elements presented on the display 3214.

In the illustrated embodiment, special purpose hardware, such as an application specific integrated circuit (IC) 3220, is coupled to bus 3210. The special purpose hardware is configured to perform operations not performed by processor 3202 quickly enough for special purposes. Examples of application specific ICs include graphics accelerator cards for generating images for display 3214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 3200 also includes one or more instances of a communications interface 3270 coupled to bus 3210. Communication interface 3270 provides a two-way communication coupling to a variety of external devices that operate with their own processors, such as printers, scanners and external disks. In general the coupling is with a network link 3278 that is connected to a local network 3280 to which a variety of external devices with their own processors are connected. For example, communication interface 3270 may be a parallel port or a serial port or a universal serial bus (USB) port on a personal computer. In some embodiments, communications interface 3270 is an integrated services digital network (ISDN) card or a digital subscriber line (DSL) card or a telephone modem that provides an information communication connection to a corresponding type of telephone line. In some embodiments, a communication interface 3270 is a cable modem that converts signals on bus 3210 into signals for a communication connection over a coaxial cable or into optical signals for a communication connection over a fiber optic cable. As another example, communications interface 3270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 3270 sends and receives electrical, acoustic or electromagnetic signals, including infrared and optical signals, that carry information streams, such as digital data.

The term computer-readable medium is used herein to refer to any medium that participates in providing information to processor 3202, including instructions for execution. Such a medium may take many forms, including, but not limited to, non-volatile media, volatile media and transmission media. Non-volatile media include, for example, optical or magnetic disks, such as storage device 3208. Volatile media include, for example, dynamic memory 3204. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 3202, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, floating array flash memory, SDRAM, or any other memory chip or cartridge, a carrier wave, or any other medium from which a computer can read. The term non-transitory computer-readable storage medium is used herein to refer to any medium that participates in providing information to processor 3202, except for carrier waves and other signals.

Logic encoded in one or more tangible media includes one or both of processor instructions on a computer-readable storage media and special purpose hardware, such as ASIC 3220.

Network link 3278 typically provides information communication through one or more networks to other devices that use or process the information. For example, network link 3278 may provide a connection through local network 3280 to a host computer 3282 or to equipment 3284 operated by an Internet Service Provider (ISP). ISP equipment 3284 in turn provides data communication services through the public, world-wide packet-switching communication network of networks now commonly referred to as the Internet 3290. A computer called a server 3292 connected to the Internet provides a service in response to information received over the Internet. For example, server 3292 provides information representing video data for presentation at display 3214. In some circumstances the resources represented by some combination of host 3282, local network 3280, internet service provider 3284, internet 3290 and server 3292 are termed "the cloud."

The invention is related to the use of computer system 3200 for implementing the techniques described herein. According to one embodiment of the invention, those techniques are performed by computer system 3200 in response to processor 3202 executing one or more sequences of one or more instructions contained in memory 3204. Such instructions, also called software and program code, may be read into memory 3204 from another computer-readable medium such as storage device 3208. Execution of the sequences of instructions contained in memory 3204 causes processor 3202 to perform the method steps described herein. In alternative embodiments, hardware, such as application specific integrated circuit 3220, may be used in place of or in combination with software to implement the invention. Thus, embodiments of the invention are not limited to any specific combination of hardware and software.

The signals transmitted over network link 3278 and other networks through communications interface 3270, carry information to and from computer system 3200. Computer system 3200 can send and receive information, including program code, through the networks 3280, 3290 among others, through network link 3278 and communications interface 3270. In an example using the Internet 3290, a server 3292 transmits program code for a particular application, requested by a message sent from computer 3200, through Internet 3290, ISP equipment 3284, local network 3280 and communications interface 3270. The received code may be executed by processor 3202 as it is received, or may be stored in storage device 3208 or other non-volatile storage for later execution, or both. In this manner, computer system 3200 may obtain application program code in the form of a signal on a carrier wave.

Various forms of computer readable media may be involved in carrying one or more sequence of instructions or data or both to processor 3202 for execution. For example, instructions and data may initially be carried on a magnetic disk of a remote computer such as host 3282. The remote computer loads the instructions and data into its dynamic memory and sends the instructions and data over a telephone line using a modem. A modem local to the computer system 3200 receives the instructions and data on a telephone line and uses an infra-red transmitter to convert the instructions and data to a signal on an infra-red a carrier wave serving as the network link 3278. An infrared detector serving as communications interface 3270 receives the instructions and data carried in the infrared signal and places information representing the instructions and data onto bus 3210. Bus 3210 carries the information to memory 3204 from which processor 3202 retrieves and executes the instructions using some of the data sent with the instructions. The instructions and data received in memory 3204 may optionally be stored on storage device 3208, either before or after execution by the processor 3202.

Figure 33:
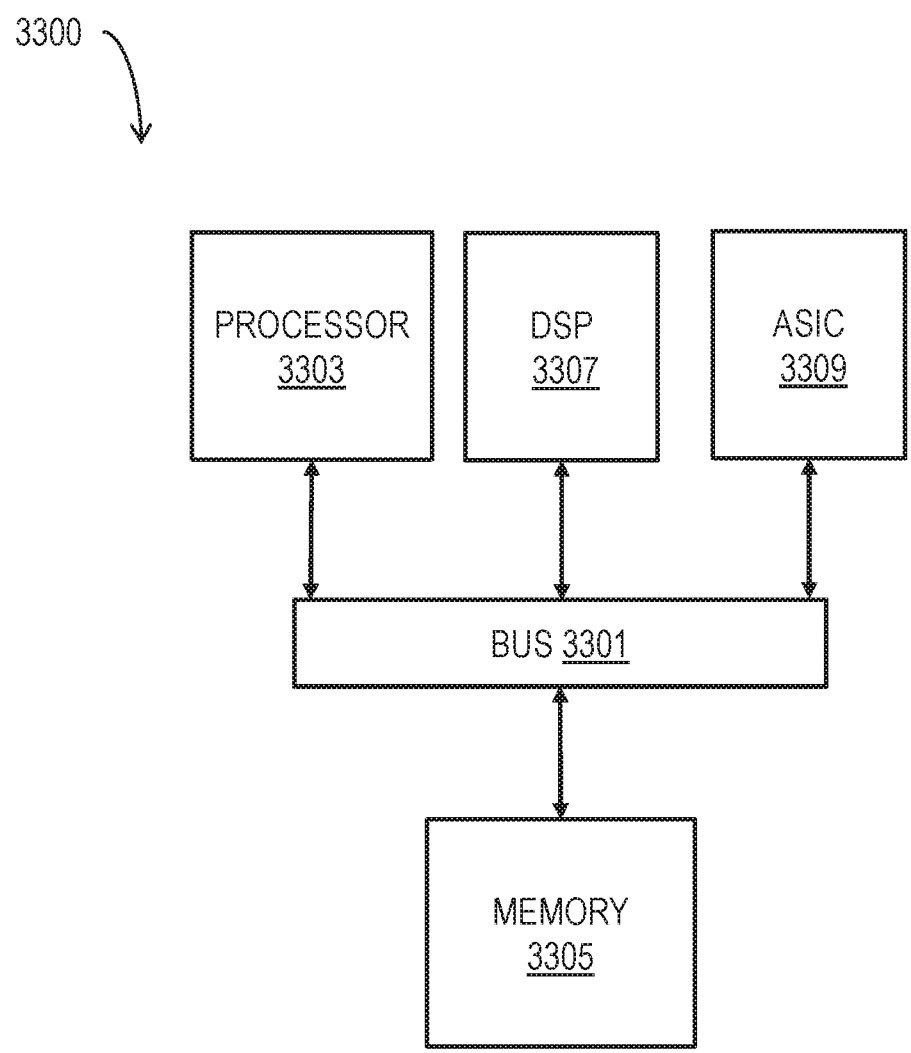
FIG. 33 is a block diagram that illustrates an example chip set upon which an embodiment of the invention may be implemented.

FIG. 33 illustrates a chip set 3300 upon which an embodiment of the invention may be implemented. Chip set 3300 is programmed to perform one or more steps of a method described herein and includes, for instance, the processor and memory components described with respect to FIG. 32 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 3300, or a portion thereof, constitutes a means for performing one or more steps of a method described herein.

In one embodiment, the chip set 3300 includes a communication mechanism such as a bus 3301 for passing information among the components of the chip set 3300. A processor 3303 has connectivity to the bus 3301 to execute instructions and process information stored in, for example, a memory 3305. The processor 3303 may include one or more processing cores with each core configured to perform independently. A multi-core processor enables multiprocessing within a single physical package. Examples of a multi-core processor include two, four, eight, or greater numbers of processing cores. Alternatively or in addition, the processor 3303 may include one or more microprocessors configured in tandem via the bus 3301 to enable independent execution of instructions, pipelining, and multithreading. The processor 3303 may also be accompanied with one or more specialized components to perform certain processing functions and tasks such as one or more digital signal processors (DSP) 3307, or one or more application-specific integrated circuits (ASIC) 3309. A DSP 3307 typically is configured to process real-world signals (e.g., sound) in real time independently of the processor 3303. Similarly, an ASIC 3309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 3303 and accompanying components have connectivity to the memory 3305 via the bus 3301. The memory 3305 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 3305 also stores the data associated with or generated by the execution of one or more steps of the methods described herein. 4. Alterations, deviations and modifications [0192] In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

5. REFERENCES

[1] R. L. Rivest, L. Adleman, and M. L. Dertouzos, On data bank and privacy homomorphisms (1978).

[2] E. F. Brickell and Y. Yacobi, On privacy homomorphisms, Workshop on Theory and Applications of Cryptographic Techniques, 117-25 (1987).

[3] C. Gentry, Fully homomorphic encryption using ideal lattices. ACM Symposium on Theory of Computation (STOC), 169-178 (2009).

[4] K. Lauter, Can homomorphic encryption be practical. Proceedings of the 3rd ACM workshop on cloud computing security, 113-124 (2011).

[5] C. B. Gentry, Bootstrappable Homomorphic Encryption Method, Computer Program and Apparatus. U.S. Pat. No. 8,515,058 B1 (Aug. 20, 2013).

[6] C. B. Gentry and S. Halevi, Efficient Implementation of Fully Homomorphic Encryption. U.S. Pat. No. 8,565,435 B2 (Oct. 22, 2013).

[7] C. B. Gentry, Fully Homomorphic Encryption Method Based on a Bootstrappable Encryption Scheme, Computer and Apparatus. U.S. Pat. No. 8,630,422 B2 (Jan. 14, 2014).

[8] C. B. Gentry, S. Halevi, N. P. Smart, Homomorphic Evaluation Including Key Switching, Modulus Switching, and Dynamical Noise Management. U.S. Pat. No. 9,281,941 B2 (Mar. 8, 2016).

[9] C. B. Gentry, S. Halevi, N. P. Smart, Homomorphic Evaluation Including Key Switching, Modulus Switching, and Dynamical Noise Management. U.S. Pat. No. 9,608,817 B2 (Mar. 28, 2017).

[10] C. B. Gentry, S. Halevi, N. P. Smart, Homomorphic Evaluation Including Key Switching, Modulus Switching, and Dynamical Noise Management. U.S. Pat. No. 9,621,346 B2 (Apr. 11, 2017).

[11] J. J. Loftus, M. Naehrig, J. W. Bos, K. E. Lauter, Managed Secure Computations on Encrypted Data. U.S. Pat. No. 9,306,738 B2 (Apr. 5, 2016).

[12] M. Tamayo-Rios, Method for Fully Homomorphic Encryption Using Multivariate Cryptography. U.S. Pat. No. 9,313,028 B2 (Apr. 12, 2016).

[13] A. Kipnis and E. Hibshoosh, Method and System for Homomorphicly Ramdomizing an Input. U.S. Pat. No. 9,350,543 B2 (May 24, 2016).

[14] G. Saldamli, Homomorphic Encryption in Computing Systems and Environments. U.S. Pat. No. 9,436,835 B1 (Sep. 16, 2016).

[15] D. Coppersmith and E. Grossman, Generators for certain alternating groups with applications to cryptography. SIAM J. Appl. Math. 29 (4), 624-627 (1975).

[16] A. Parent, M. Roeteller, and M. Mosca, Improved Reversible and Circuits for Karatsuba-Based Integer Multiplication. arXiv:1706.03419 (2017).

[17] S. Cuccaro, T. G. Drapper, S. A. Kutin, and D. P. Moulton, A New Quantum Ripple-Carry Addition Circuit. arXiv:quant-ph/0410184 (2004).

[18] K. Iwama, Y. Kambayashi, and S. Yamashita, Transformation Rules for Designing CNOT-based Quantum Circuits, DAC2002, pp 419-424 (New Orleans, La., USA, 2002).

What is claimed is:

1. A method operating on a first processor comprising:
receiving first data indicating a sequence of reversible q-bit gates acting on N-bit words including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data;
storing on a computer-readable medium second data that indicates rules for replacing a first sequence of two q-bit gates operating on at least one shared bit of an input N-bit word to produce an output N-bit word with a different second sequence of one or more q-bit gates that produce the output N-bit word given the input N-bit word;
using the second data to propagate at least one q-bit gate from the first segment to a number J of gates distance into the q-bit gates for the second segment or beyond and at least one q-bit gate from the third segment to a number K of gates distance into the q-bit gates for the second segment or before to produce an obfuscated sequence of reversible q-bit gates;
sending obfuscated instructions based on the obfuscated sequence to a second processor for execution.

2. The method as recited in claim 1, further comprising:
storing on a computer-readable medium third data relating each of one or more code instructions in a form executable by the different second processor to one or more reversible q-bit gates operating on an N-bit word; and
using the third data to convert the obfuscated sequence to one or more obfuscated code instructions in a form executable by the second processor,
wherein the sending obfuscated instructions further comprises sending the one or more obfuscated code instructions in a form executable by the second processor.

3. The method as recited in claim 1, wherein:
the method further comprises storing on a computer-readable medium third data relating each of one or more code instructions in a form executable by the second processor to one or more reversible q-bit gates operating on an N-bit word; and,
said receiving first data further comprises:

receiving second segment code instructions in a form executable by the second processor that is equivalent to the second segment; and, using the third data to convert the second segment code instructions to q-bit gates for the second segment.

4. The method as recited in claim 1, further comprising:

storing on a computer-readable medium fusion data that indicates rules for replacing each of one or more sequences of reversible q-bit gates operating on an input N-bit word to produce an output N-bit word, with one or more reversible k-bit gates (wherein 3<k≤N) that produce the output N-bit word given the input N-bit word; and using the fusion data to replace a particular sequence of one or more reversible q-bit gates of the obfuscated sequence of reversible q-bit gates with a k-bit gate that can replace the particular sequence.

5. The method as recited in claim 4, further comprising:

storing on a computer-readable medium third data relating each of one or more code instructions in a form executable by the different second processor to one or more reversible q-bit gates operating on an N-bit word;

storing on a computer-readable medium fusion code data relating each of the one or more reversible k-bit gates with the one or more code instructions for the different second processor;

using the fusion code data to convert the k-bit gate to at least part of one or more obfuscated code instructions; and using the third data to convert any remaining reversible q-bit gates of the obfuscated sequence of reversible q-bit gates to any remaining part of the one or more obfuscated code instructions, wherein the sending obfuscated instructions further comprises sending the one or more obfuscated code instructions in a form executable by the second processor.

6. The method as recited in claim 1, wherein J>N and K>N; wherein each reversible q-bit gate is a control gate comprising a single target bit and q−1 control bits that determine a value for the single target bit based on values at the q−1 control bits and values input to the q−1 control bits; or wherein q∈{1, 2, 3}).

7. The method as recited in claim 1, wherein the second processor is different from the first processor.

8. The method as recited in claim 1, wherein access to the second processor is different from access to the first processor.

9. A non-transitory computer-readable medium carrying one or more sequences of instructions, wherein execution of the one or more sequences of instructions by a first set of one or more processors causes the first set of one or more processors to perform the steps of:

receiving first data indicating a sequence of reversible q-bit gates acting on N-bit words including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data;

storing second data that indicates rules for replacing a first sequence of two reversible q-bit gates operating on at least one shared bit of an input N-bit word to produce an output N-bit word with a different second sequence of one or more reversible q-bit gates that produce the output N-bit word given the input N-bit word;

using the second data to propagate at least one q-bit gate from the first segment to a number J of gates distance into the q-bit gates for the second segment or beyond and at least one q-bit gate from the third segment to a number K of gates distance into the q-bit gates for the second segment or before to produce an obfuscated sequence of reversible q-bit gates;

sending obfuscated instructions based on the obfuscated sequence to a second set of one or more processors for execution.

10. The non-transitory computer-readable medium as recited in claim 9, further comprising:

storing on a computer-readable medium third data relating each of one or more code instructions in a form executable by the different second processor to one or more reversible q-bit gates operating on an N-bit word; and using the third data to convert the obfuscated sequence to one or more obfuscated code instructions in a form executable by the second processor, wherein the sending obfuscated instructions further comprises sending the one or more obfuscated code instructions in a form executable by the second set of one or more processors.

11. The non-transitory computer-readable medium as recited in claim 9, wherein:

the method further comprises storing on a computer-readable medium third data relating each of one or more code instructions in a form executable by the second set of one or more processors to one or more reversible q-bit gates operating on an N-bit word; and, said receiving first data further comprises:

receiving second segment code instructions in a form executable by the second set of one or more processors that is equivalent to the second segment; and, using the third data to convert the second segment code instructions to q-bit gates for the second segment.

12. The non-transitory computer-readable medium as recited in claim 9, further comprising:

storing on a computer-readable medium fusion data that indicates rules for replacing each of one or more sequences of reversible q-bit gates operating on an input N-bit word to produce an output N-bit word, with one or more k-bit gates (wherein 3<k≤N) that produce the output N-bit word given the input N-bit word; and using the fusion data to replace a particular sequence of one or more reversible q-bit gates of the obfuscated sequence of reversible q-bit gates with a k-bit gate that can replace the particular sequence.

13. The non-transitory computer-readable medium as recited in claim 12, further comprising:

storing on a computer-readable medium third data relating each of one or more code instructions in a form executable by the second set of one or more processors to one or more reversible q-bit gates operating on an N-bit word;

storing on a computer-readable medium fusion code data relating each of the one or more reversible k-bit gates with the one or more code instructions for the different second set of one or more processors;

using the fusion code data to convert the k-bit gate to at least part of one or more obfuscated code instructions; and using the third data to convert any remaining reversible q-bit gates of the obfuscated sequence of reversible q-bit gates to any remaining part of the one or more obfuscated code instructions, wherein the sending obfuscated instructions further comprises sending the one or more obfuscated code instructions in a form executable by the second set of one or more processors.

14. The non-transitory computer-readable medium as recited in claim 9, wherein J>N and K>N;
wherein each reversible q-bit gate is a control gate comprising a single target bit and q−1 control bits that determine a value for the single target bit based on values at the q−1 control bits and values input to the q−1 control bits;
wherein q∈{1, 2, 3});
wherein the second set of one or more processors is different from the first set of one or more processors; or
wherein access to the second set of one or more processors is different from access to the first set of one or more processors.

15. A system comprising:
a first set of at least one processor; and
at least one memory including one or more sequences of instructions,
the at least one memory and the one or more sequences of instructions configured to, with the at least one processor, cause an apparatus to perform at least the following,
receiving first data indicating a sequence of reversible q-bit gates acting on N-bit words including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data;
storing on the computer-readable medium second data that indicates rules for replacing a first sequence of two q-bit gates operating on at least one shared bit of an input N-bit word to produce an output N-bit word with a different second sequence of one or more q-bit gates that produce the same output N-bit word given the input N-bit word;
using the second data to propagate at least one q-bit gate from the first segment to a number J of gates distance into the q-bit gates for the second segment or beyond and at least one q-bit gate from the third segment to a number K of gates distance into the q-bit gates for the second segment or before to produce an obfuscated sequence of reversible q-bit gates;
sending obfuscated instructions based on the obfuscated sequence to a second set of at least one processor for execution.

16. The system as recited in claim 15, further comprising:
storing on a computer-readable medium third data relating each of one or more code instructions in a form executable by the second set of at least one processor to one or more reversible q-bit gates operating on an N-bit word; and
using the third data to convert the obfuscated sequence to one or more obfuscated code instructions in a form executable by the second set of at least one processor,
wherein the sending obfuscated instructions further comprises sending the one or more obfuscated code instructions in a form executable by the second set of at least one processor.

17. The system as recited in claim 15, wherein:
the method further comprises storing on a computer-readable medium third data relating each of one or more code instructions in a form executable by the second set of at least one processor to one or more reversible q-bit gates operating on an N-bit word; and,
said receiving first data further comprises:
receiving second segment code instructions in a form executable by the second set of at least one processor that is equivalent to the second segment; and,
using the third data to convert the second segment code instructions to q-bit gates for the second segment.

18. The system as recited in claim 15, further comprising:
storing on a computer-readable medium fusion data that indicates rules for replacing each of one or more sequences of reversible q-bit gates operating on an input N-bit word to produce an output N-bit word, with one or more k-bit gates (wherein 3<k≤N) that produce the output N-bit word given the input N-bit word; and
using the fusion data to replace a particular sequence of one or more q-bit gates of the obfuscated sequence of q-bit gates with a k-bit gate that can replace the particular sequence.

19. The system as recited in claim 18, further comprising:
storing on a computer-readable medium third data relating each of one or more code instructions in a form executable by the second set of at least one processor to one or more reversible q-bit gates operating on an N-bit word;
storing on a computer-readable medium fusion code data relating each of the one or more reversible k-bit gates with the one or more code instructions for the second set of at least one processor;
using the fusion code data to convert the k-bit gate to at least part of one or more obfuscated code instructions; and
using the third data to convert any remaining reversible q-bit gates of the obfuscated sequence of reversible q-bit gates to any remaining part of the one or more obfuscated code instructions,
wherein the sending obfuscated instructions further comprises sending the one or more obfuscated code instructions in a form executable by the second set of at least one processor.

20. The system as recited in claim 15, wherein J>N and K>N;
wherein each reversible q-bit gate is a control gate comprising a single target bit and q−1 control bits that determine a value for the single target bit based on values at the q−1 control bits and values input to the q−1 control bits;
wherein q∈{1, 2, 3}); wherein the second set of at least one processor is different from the first set of at least one processor; or
wherein access to the second set of at least one processor is different from access to the first set of at least one processor.

* * * * *